(12) United States Patent
Elshafie et al.

(10) Patent No.: US 11,916,634 B2
(45) Date of Patent: Feb. 27, 2024

(54) CHANNEL STATE INFORMATION (CSI) PREDICTION AND REPORTING

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 212 days.

(21) Appl. No.: 17/451,641

(22) Filed: Oct. 20, 2021

(65) Prior Publication Data
US 2022/0131588 A1 Apr. 28, 2022

Related U.S. Application Data

(60) Provisional application No. 63/104,392, filed on Oct. 22, 2020.

(51) Int. Cl.
*H04B 7/06* (2006.01)
*H04B 17/373* (2015.01)
*H04B 17/345* (2015.01)

(52) U.S. Cl.
CPC ......... *H04B 7/0626* (2013.01); *H04B 17/345* (2015.01); *H04B 17/373* (2015.01)

(58) Field of Classification Search
CPC .. H04B 7/0626; H04B 17/345; H04B 17/373; H04B 17/26; H04B 17/24
See application file for complete search history.

(56) References Cited

U.S. PATENT DOCUMENTS

| 2012/0164950 | A1 | 6/2012 | Nentwig |
| 2019/0261380 | A1 | 8/2019 | Iyer et al. |
| 2020/0020349 | A1* | 1/2020 | Disch .................. G10L 21/0224 |
| 2020/0028654 | A1* | 1/2020 | Chen .................... H04L 1/0026 |

FOREIGN PATENT DOCUMENTS

EP 3522403 A1 8/2019

OTHER PUBLICATIONS

International Search Report and Written Opinion—PCT/US2021/055928—ISA/EPO—dated Feb. 11, 2022.

* cited by examiner

*Primary Examiner* — Minh Trang T Nguyen
(74) *Attorney, Agent, or Firm* — Haynes and Boone, LLP/Qualcomm

(57) ABSTRACT

Wireless communication systems and methods related to interference prediction and reporting are provided. A user equipment (UE) obtains a sequence of interference measurements, where each interference measurement in the sequence is obtained at a different measurement time instant. The UE may determine, based on an interference predictor associated with the sequence of interference measurements, one or more predicted channel state information (CSI) values at one or more future time instants. The UE may transmit, to a base station (BS), a report including the one or more predicted CSI values.

30 Claims, 20 Drawing Sheets

CHANNEL STATE INFORMATION (CSI) PREDICTION AND REPORTING

CROSS-REFERENCE TO RELATED APPLICATIONS

The present application claims the benefit of U.S. Provisional Application No. 63/104,392, filed Oct. 22, 2020, titled "CHANNEL STATE INFORMATION (CSI) PREDICTION AND REPORTING," which is hereby incorporated by reference in its entirety as if fully set forth below and for all applicable purposes.

TECHNICAL FIELD

This application relates to wireless communication systems and methods, and more particularly to channel state information (CSI) prediction and reporting.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum. As use cases and diverse deployment scenarios continue to expand in wireless communication, further improvements in system performance and communication reliability may also yield benefits.

Brief Summary of Some Examples

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE), the method includes obtaining a sequence of interference measurements, where each interference measurement in the sequence is obtained at a different measurement time instant; determining, based on an interference predictor associated with the sequence of interference measurements, one or more predicted channel state information (CSI) values at one or more future time instants; and transmitting, to a base station (BS), a report including the one or more predicted CSI values.

In an additional aspect of the disclosure, a method of wireless communication performed by a base station (BS), the method includes transmitting, to a user equipment (UE), a configuration indicating a set of interference measurement resources spaced apart in time, the set of interference measurement resources associated with an interference prediction; transmitting, to the UE, a request for one or more predicted channel state information (CSI) values at one or more future time instants; and receiving, from the UE, a report including the one or more predicted CSI values for the one or more future time instants.

In an additional aspect of the disclosure, a user equipment (UE) includes a processor configured to obtain a sequence of interference measurements, where each interference measurement in the sequence is obtained at a different measurement time instant; determine, based on an interference predictor associated with the sequence of interference measurements, one or more predicted channel state information (CSI) values at one or more future time instants; and a transceiver in communication with the processor, the transceiver configured to transmit, to a base station (BS), a report including the one or more predicted CSI values.

In an additional aspect of the disclosure, a base station (BS) includes a transceiver configured to transmit, to a user equipment (UE), a configuration indicating a set of interference measurement resources spaced apart in time, the set of interference measurement resources associated with an interference prediction; transmit, to the UE, a request for one or more predicted channel state information (CSI) values at one or more future time instants; and receive, from the UE, a report including the one or more predicted CSI values for the one or more future time instants.

In an additional aspect of the disclosure, a user equipment (UE) includes means for obtaining a sequence of interference measurements, where each interference measurement in the sequence is obtained at a different measurement time instant; means for determining, based on an interference predictor associated with the sequence of interference measurements, one or more predicted channel state information (CSI) values at one or more future time instants; and means for transmitting, to a base station (BS), a report including the one or more predicted CSI values.

In an additional aspect of the disclosure, a base station (BS) includes means for transmitting, to a user equipment (UE), a configuration indicating a set of interference measurement resources spaced apart in time, the set of interference measurement resources associated with an interference prediction; means for transmitting, to the UE, a request for one or more predicted channel state information (CSI) values at one or more future time instants; and means for receiving, from the UE, a report including the one or more predicted CSI values for the one or more future time instants.

In an additional aspect of the disclosure, a non-transitory computer-readable medium having program code recorded thereon, the program code includes code for causing a user equipment (UE) to obtain a sequence of interference measurements, wherein each interference measurement in the sequence is obtained at a different measurement time instant; code for causing the UE to determine, based on an interference predictor associated with the sequence of interference measurements, one or more predicted channel state information (CSI) values at one or more future time instants; and code for causing the UE to transmit, to a base station (BS), a report including the one or more predicted CSI values.

In an additional aspect of the disclosure, a non-transitory computer-readable medium having program code recorded thereon, the program code includes code for causing a base station (BS) to transmit, to a user equipment (UE), a configuration indicating a set of interference measurement resources spaced apart in time, the set of interference measurement resources associated with an interference prediction; code for causing the BS to transmit, to the UE, a request for one or more predicted channel state information (CSI) values at one or more future time instants; and code for causing the BS to receive, from the UE, a report including the one or more predicted CSI values for the one or more future time instants.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
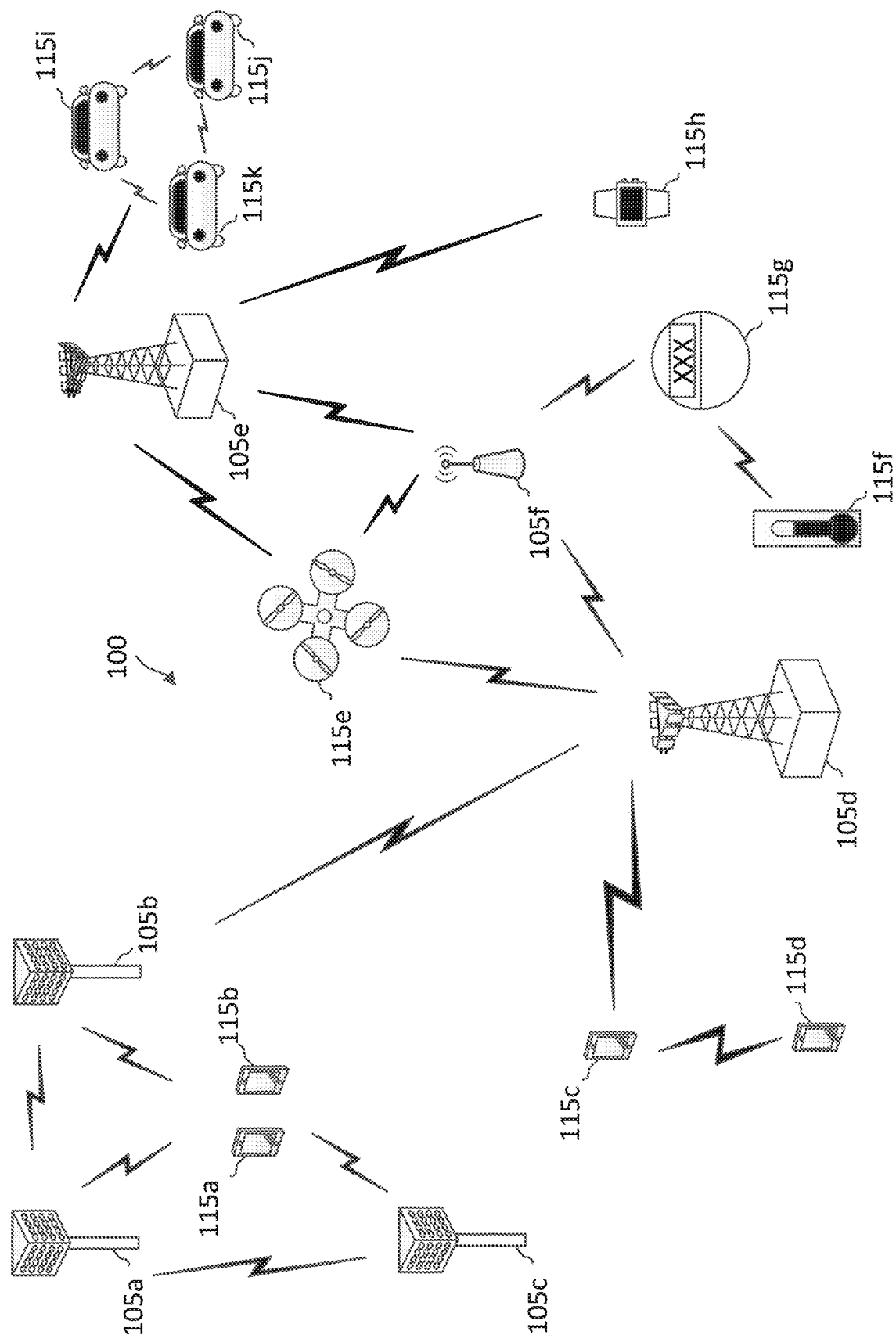
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A wireless communication network may provision for ultra-reliable and low-latency communication (URLLC) to accommodate emerging services and applications having stringent latency and reliability requirements. For instance, URLLC may have a target latency of about 1 ms and a packet transmission reliability or residual block error rate (BLER) of about 1e-5. URLLC communication can be in a downlink (DL) direction from a base station (BS) to a use equipment (UE) or in an uplink (UL) direction from a UE to a BS. Some examples of URLLC application may include, but not limited to industrial Internet of things (IIoT), smart grid, smart energy, remote surgery, remote diagnosis and monitoring, driver assistance applications, autonomous driving, and augmented reality (AR) and virtual reality (VR) applications.

One approach to achieving high-reliability for URLLC is to utilize hybrid automatic repeat request (HARQ) techniques. In a HARQ process, a transmitting node may receive a data packet (e.g., the URLLC data) in the form of a transport block (TB) from a higher network layer. The transmitting node may encode the data packet based on an FEC code (e.g., an LDPC code). The transmitting node may transmit a first coded version of the data packet (e.g., the URLLC data) to a receiving node. The receiving node may report the reception status for the data packet to the transmitting node. For example, the receiving node may transmit an acknowledgement (ACK) to the transmitting node when the data packet is received successfully without any error.

Alternatively, the receiving node may transmit a not-ACK (NACK) to the transmitting node when the data packet is received unsuccessfully (e.g., with errors). Upon receiving a NACK, the transmitting node may retransmit the data packet, for example, by transmitting a second coded version of the data packet. The second coded version may be the same as the first coded version or different from the first coded version. The receiving node may combine the received first coded version and the received second coded version for error correction when both the received first coded version and the received second coded version are erroneous. While HARQ can utilize retransmissions to improve communication reliability for URLLC, in some examples, a transmitting device (e.g., a BS) is expected to deliver data to a receiving device (e.g., a UE) within at most two transmission attempts (e.g., including an initial transmission and one retransmission).

When there is interference at the BS and/or at the UE, it may be challenging to meet the low BLER of 1e-5. As such, it may be difficult to enable URLLC applications and maintain the quality of service (QoS) requirements in the presence of interference.

The present disclosure describes mechanisms for interference prediction and reporting. For instance, a BS may configure a UE with a set of one or more interference measurement resources spaced apart in time, for example, according to a certain periodicity. The UE may determine interference measurements from the set of one or more interference measurement resources. The interference measurements may be represented as a random process, and the UE may train or determine an interference predictor based the interference measurements (e.g., autocorrelation values and/or cross-correlation values of the interference measurements). Subsequently, the UE may apply the interference predictor to an interference measurement obtained at a measurement time to predict interference at one or more future time instants (after the measurement time). The term "time instant" may refer to a particular time, such as a time associated with a particular symbol, time location in a slot, subframe, or frame, an absolute time or other time indication, and may not denote a highly precise time indication. In some aspects, the UE may modify a receive signal measurement at a measurement time by each predicted interference at the one or more future time instants to generate one or more predicted channel state information (CSI) values for the one or more future time instants. In some other aspects, the UE may also predict a channel response (e.g., a channel matrix) or an signal-to-noise ratio (SNR) at the one or more future time instants and generate one or more predicted CSI values for the one or more future time instants based on corresponding predicted channel response or SNR and corresponding predicted interference. Some examples of CSI values may include, but not limited to channel quality indicator (CQI), rank indicator (RI), precoding matrix indicator (PMI), spectral efficiency, and/or beam information. The UE may report the one or more predicted CSI values to the BS, for example, based on an on-demand or aperiodic CSI reporting request from the BS. The BS may receive the report and may utilize the one or more predicted CSI values to determine scheduling parameters for communicating DL communications with the UE, for example, at a time close to the one or more future time instants. Some examples of scheduling parameters may include, but not limited to modulation coding scheme (MCS), transmission rank, precoding parameters, and/or beam parameters.

Aspects of the present disclosure can provide several benefits. For example, reporting one or more predicted CSI values at one or more future time instants to a BS can provide the BS with a better or accurate view of interference that the UE may expect or experience at the one or more future time instants. Accordingly, the BS can determine more suitable scheduling parameters for communicating DL communications with the UE based on the predicted CSI value(s) reported by the UE. As such, the communication performance (e.g., reliability and/or latency) between the BS and the UE may improve.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various aspects, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (L) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (L) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105.

Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, a BS 105 may configure a UE 115 with an interference measurement resource (e.g., a channel state information-interference measurement (CSI-IM) resource) and/or a reference signal resource (e.g., a channel state information-reference signal (CSI-RS) resource). The BS 105 may not transmit any signal in the interference measurement resource to enable the UE 115 to measure interference measurement from the interference measurement resource, but may transmit a reference signal in the reference signal resource to enable the UE 115 to measure receive signal measurements. Accordingly, the UE 115 may determine interference measurements from the interference measurement resource and determine a receive signal measurement (e.g., receive signal power, receive signal quality, signal-to-noise ratio (SNR), signal-to-interference-plus-noise ratio (SINR)) from the reference signal. The UE 115 may determine channel properties or state information (CSI) from the measured interference measurements and/or from the receive signal measurement. The UE 115 may report the CSI to the BS 105 to assist the BS 105 in determining transmission parameters for communicating with the UE 115. In some instances, the BS 105 may configure the UE 115 to transmit CSI reports periodically at regular time instants. In some instances, the BS 105 may configure the UE 115 to transmit CSI reports according to a semi-persistent schedule, for example, at regular time instants until the schedule is deactivated. In some instances, the BS 105 may configure the UE 115 to transmit an aperiodic CSI report, for example, triggered on a need basis. In some instances, the BS 105 may request one or more CSI reports, either aperiodic or periodic, from the UE 115. The BS 105 may request the CSI report(s) via DCI. For example, the BS 105 may request the CSI report(s) based on a standalone DCI, a DCI scheduling a PDSCH, a DCI scheduling a periodic set of PDSCH transmissions (e.g., a PDSCH SPS activation/reactivation), or a combination thereof. The BS 105 may transmit the DCI via PDCCH.

A CSI report may include various channel information. For instance, a CSI report may include, but not limited to a channel quality indicator (CQI), a rank indicator (RI), precoding matrix indicator (PMI), and/or beam information. The CQI may be in the form of an index referencing a certain MCS and/or code-rate in a CQI lookup table. In this regard, the UE 115 may be configured with one or more CQI lookup tables associated with different code rates and/or different spectral efficiencies, and may select, from a certain CQI table, an index to the highest modulation coding scheme (MCS) that would result in a certain BLER (e.g., of about 1e-5 for URLLC) for a DL transmission from the BS 105. The RI may indicate or a recommendation of which transmission rank (e.g., number of spatial layers) the BS 105 may use in codebook-based precoding for a DL transmission. The PMI may indicate a preferred precoder among a set of precoder that the BS 105 may use in codebook-based transmission based on the indicated transmission rank. In some instances, the beam information may be in the form of a CSI-RS resource indicator (CRI). For instance, the BS 105 may configure the UE 115 with different CSI-RS resources or resource sets and may utilize different beams to transmit in the different CSI-RS resources or resource sets. The UE 115 may perform receive signal measurements from the different CSI-RS resources or resource sets and utilize the CRI to indicate the CSI-RS resource that provide the UE115 with the highest signal quality (e.g., highest signal power or highest SNR). Accordingly, the BS 105 may determine which beam is preferred by the UE 115 based on the CRI.

The BS 105 may utilize the CSI reported by the UE 115 to determine scheduling information and/or transmission parameters, such as MCS, spatial parameters, precoding parameters, and/or transmission power, for scheduling DL transmissions to the UE 115. Accordingly, the accuracy of CSI reporting may be important for scheduling and can impact performance.

According to aspects of the present disclosure, to achieve a high reliability in the presence of interference, a UE 115 may perform interference prediction and provide a BS 105 with predicted CSI in one or more future time instants instead of or in addition to reporting CSI for a current time instant. In this way, the BS 105 can have a more accurate view of interference and/or channel state that the UE 115 may experience at those future time instants. The BS 105 may utilize the predicted CSI to determine more suitable transmission parameters for communicating with the UE 115 at a time near those future time instants. Mechanisms for interference or CSI prediction and reporting are discussed in greater detail herein.

Figure 2:
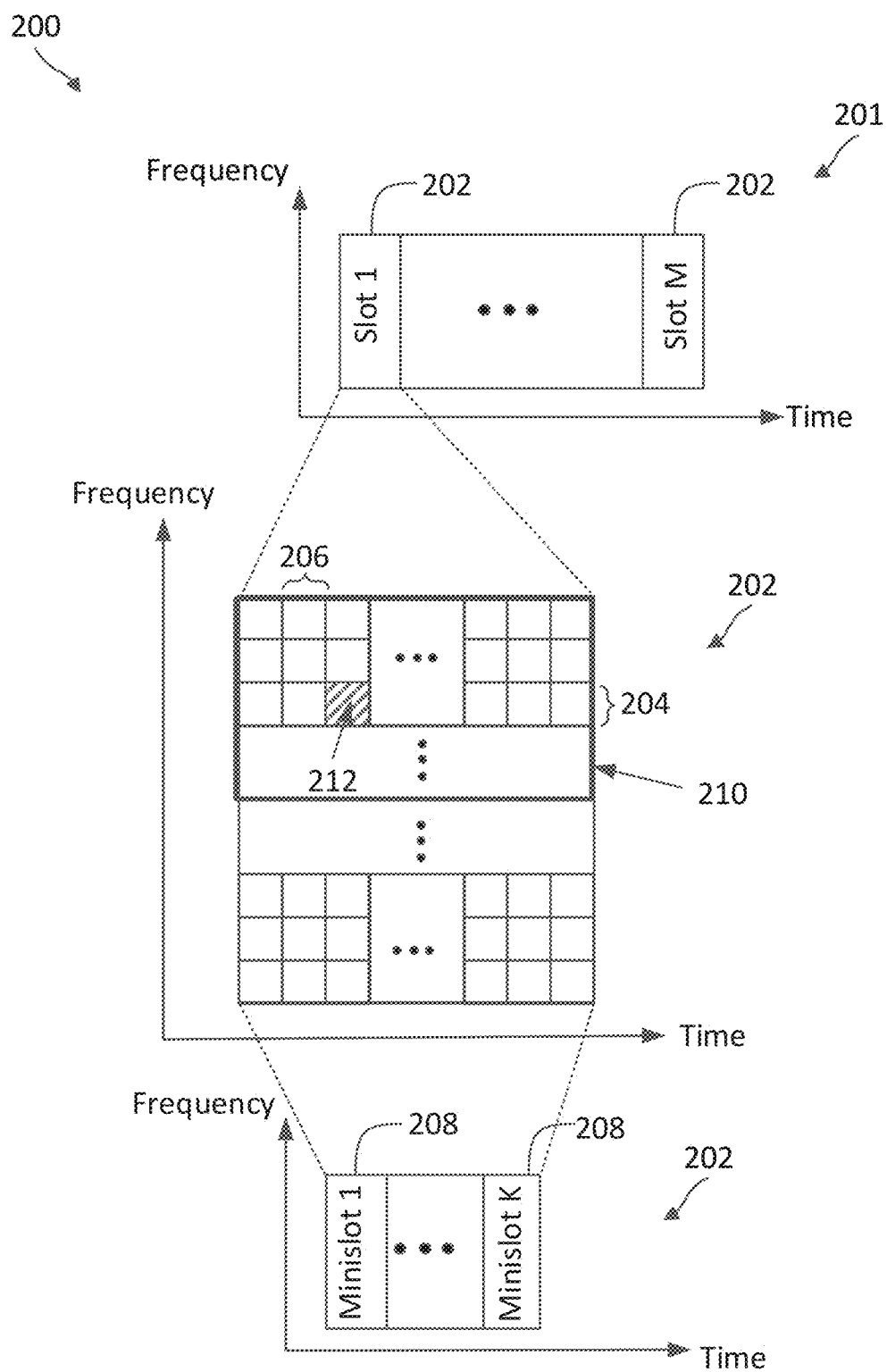
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

In some aspects, a UE 115 may experience interference from one or more interference sources. To mitigate the impact of interference, a UE 115 may model the interference as random processes, train an interference predictor based on the random processes, utilize the interference predictor to predict interference for future time instants, and take the predicted interference into account when reporting CSI to a BS 105. In some aspects, the BS 105 may facilitate interference predictor training at the UE 115 by configuring the UE 115 with interference measurement resources over a certain time period. FIGS. 3A-3D are discussed in relation to each other to illustrate interference predictor training mechanisms.

Figure 3A:
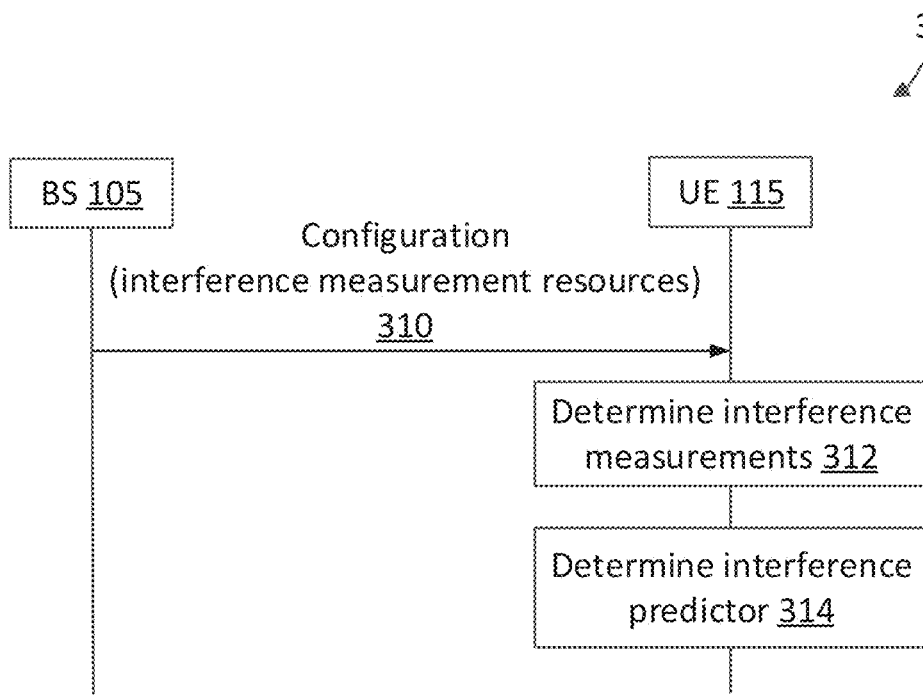
FIG. 3A is a signaling diagram illustrating an interference prediction method according to some aspects of the present disclosure.

FIG. 3A is a signaling diagram illustrating an interference predictor training method 300 according to some aspects of the present disclosure. The method 300 may be implemented between a UE 115 and a BS 105 in the network 100. The method 300 may be implemented after the BS 105 and the UE 115 and establishes a connection with each other, for example, as discussed above in relation to FIG. 1. In some aspects, the UE 115 may utilize one or more components, such as the processor 1902, the memory 1904, the channel state module 1908, the transceiver 1910, the modem 1912, and the one or more antennas 1916 of FIG. 19, to execute the steps of method 300. In some aspects, the BS 105 may utilize one or more components, such as the processor 1802, the memory 1804, the channel state module 1808, the transceiver 1810, the modem 1812, and the one or more antennas 1816 of FIG. 18, to execute the steps of method 300. As illustrated, the method 300 includes a number of enumerated actions, but aspects of the method 300 may include additional actions before, after, and in between the enumerated actions. In some aspects, one or more of the enumerated actions may be omitted or performed in a different order.

At action 310, the BS 105 transmits an interference measurement resource configuration to the UE 115, for example, via RRC signaling. The configuration may indicate one or more sets of interference measurement resources (e.g., time-frequency resources) where the UE 115 may perform interference measurements for training an interference predictor. The set of interference measurement resources may be as shown in FIG. 3B.

Figure 3B:
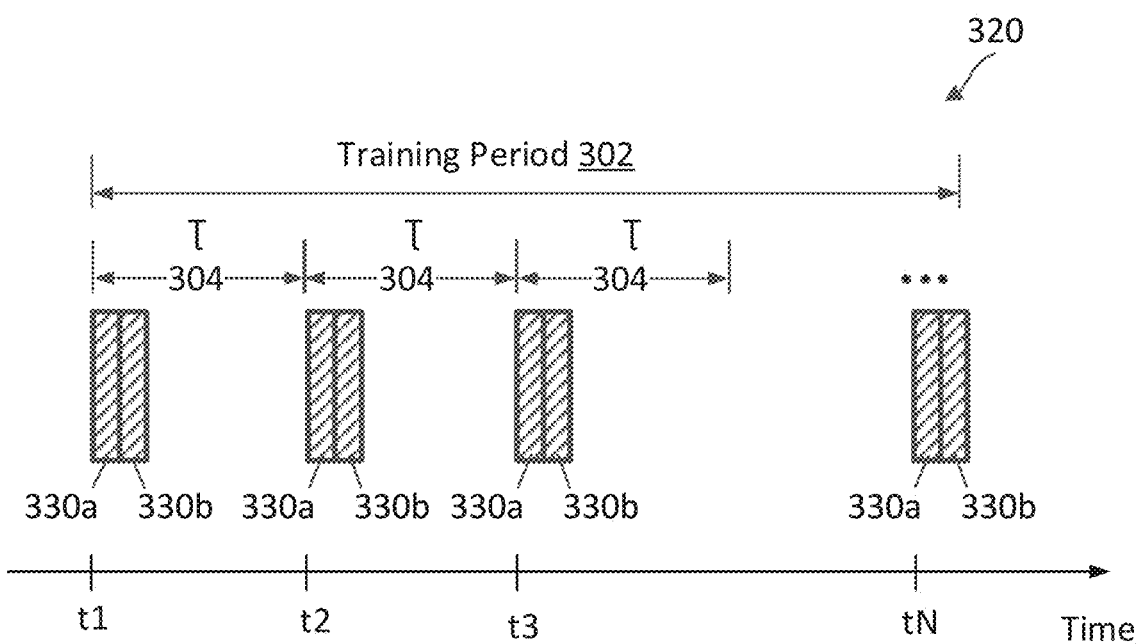
FIG. 3B is a timing diagram illustrating an interference resource configuration scheme according to some aspects of the present disclosure.
Figure 3C:
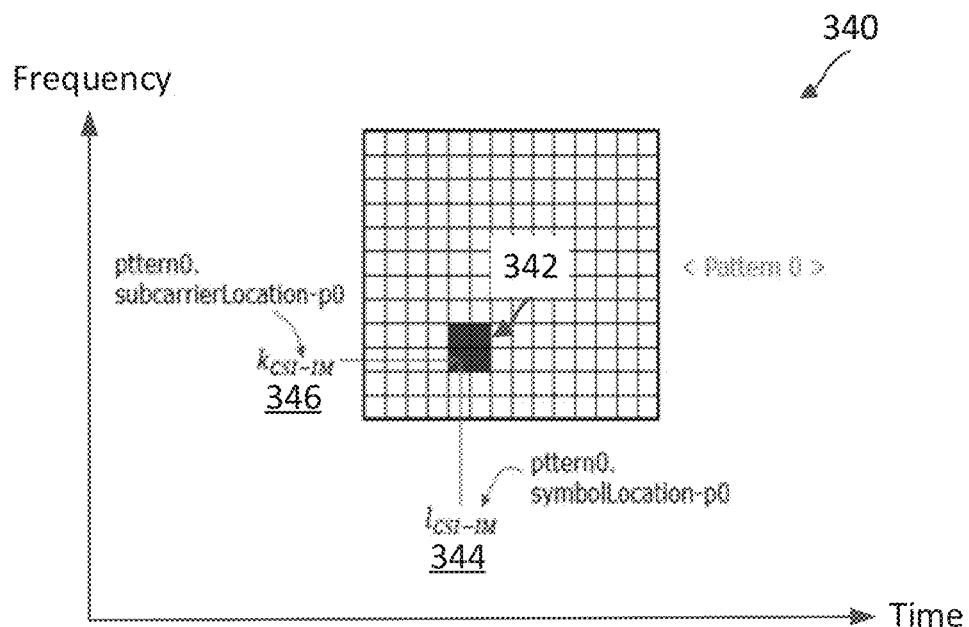
FIG. 3C illustrates an exemplary interference measurement resource configuration according to some aspects of the present disclosure.
Figure 3D:
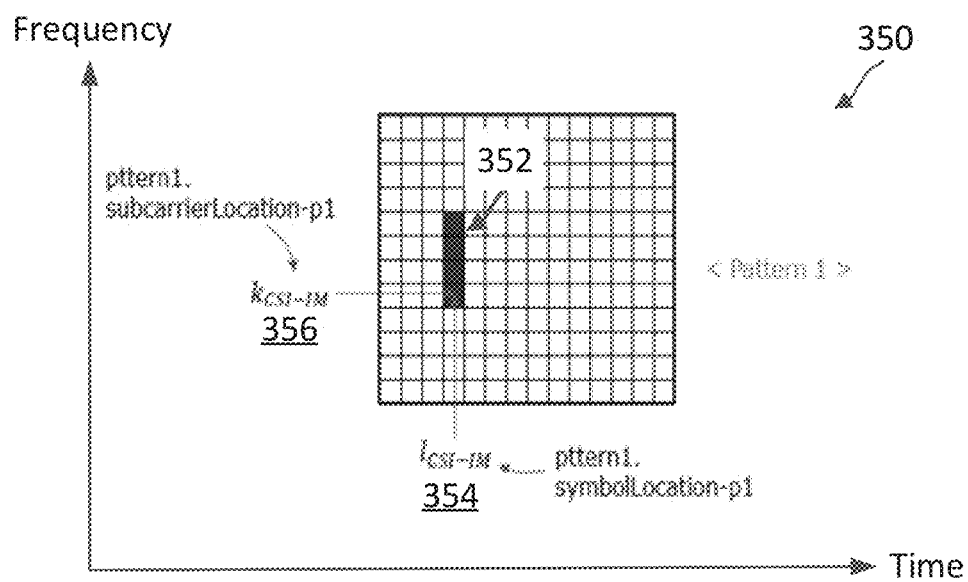
FIG. 3D illustrates an exemplary interference measurement resource configuration according to some aspects of the present disclosure.

FIG. 3B is a timing diagram illustrating an interference resource configuration scheme 320 according to some aspects of the present disclosure. The scheme 320 may be employed by BSs such as the BSs 105 to configure UEs such as the UEs 115 in a network such as the network 100 for interference measurements. In FIG. 3B, the x-axis represents time in some arbitrary units. The BS 105 may configure the UE 115 with one or more sets of interference measurement resource 330 (shown as 330a and 330b). The interference measurement resources 330 are time-frequency resources and may occupy a number of REs (e.g., the REs 212) over one or more symbols (e.g., the symbols 206). Some example interference measurement resource configurations are shown in FIGS. 3C and 3D. Each set of interference measurement resources 330a, 330b may have a certain periodicity. In other words, the interference measurement resources 330a or 330b in each set may be spaced apart from each other by the same amount of time (shown as a time period 304 and may be denoted as τ). As shown, the interference measurement resource set 330a are located at time t1, t2, . . . , tN over a training period 302. In other words, the UE 115 can sample or measure Although FIG. 3 illustrates the set of interference measurement resources 330a and 330b having the same periodicity, it should be understood that in other examples the BS 105 may configure different periodicities for different interference measurement resource sets.

FIG. 3C illustrates an exemplary interference measurement resource configuration 340 according to some aspects of the present disclosure. In FIG. 3C, the x-axis represents time in units of symbols (e.g., the symbols 206), and the y-axis represents frequency in units of subcarriers (e.g., the subcarriers 204). The configuration 340 illustrates an CSI-IM resource configuration for a CSI-IM resource 342 occupying two symbols 344 in time and two subcarriers 346 in frequency. CSI-IM resources are generally sparse in time or frequency. For instance, each CSI-IM resource may occupy a few subcarriers (e.g., 1, 2, 3, or 4) in frequency and/or a few symbols (e.g., 1, 2, 3, or 4) in time. Accordingly, in some aspects, the BS 105 may configure the interference measurement resources or resource sets 330 of FIG. 3B using multiple CSI-IM resource configurations similar to the configuration 340 to provide the UE 115 with interference measurement resources with a high frequency-density, for example, covering an entire frequency band or BWP in which the BS 105 communicates DL communications with the UE 115. In this way, the UE 115 may be able to obtain interference measurements across the entire frequency band or BWP used for DL communications. Additionally, the BS 105 may configure the UE 115 with multiple CSI-IM resource configurations similar to the configuration 340 to provide the UE 115 with interference measurement resources with a high time-density (e.g., occupying more than 2 symbols). In this way, the UE 115 may be able to obtain interference measurements over a longer time period to obtain a better view of the interference experienced at the UE 115.

FIG. 3D illustrates an exemplary interference measurement resource configuration 350 according to some aspects of the present disclosure. In FIG. 3D, the x-axis represents time in units of symbols (e.g., the symbols 206), and the y-axis represents frequency in units of subcarriers (e.g., the subcarriers 204). The configuration 350 illustrates another CSI-IM resource configuration for a CSI-IM resource 352 occupying one symbols 354 in time and four subcarriers 356 in frequency. Similar to FIG. 3C, in some aspects, the BS 105 may configure the interference measurement resources or resource sets 330 of FIG. 3B using multiple CSI-IM resource configurations similar to the configuration 350 to provide the UE 115 with interference measurement resources with a higher frequency-density and/or a higher time-density.

In some other aspects, the BS 105 may configure the interference measurement resources or resource sets 330 of FIG. 3B using zero power-channel state information-reference signal (Zp-CSI-RS or CSI-IM or combination thereof) resource configuration instead of CSI-IM resource configuration. Zp-CSI-RS or CSI-IM or combination thereof resources are generally configured for PDSCH rate match, and may have a higher frequency density (e.g., occupying more frequency subcarriers). As such, the BS 105 may utilize Zp-CSI-RS or CSI-IM or combination thereof resource configuration to configure the interference measurement resources or resource sets 330 (over the frequency band or BWP used for DL communications) instead of utilizing multiple CSI-IM resource configurations. Thus, Zp-CSI-RS or CSI-IM or combination thereof resource configuration can provide the BS 105 with more flexibility in configuring interference measurement resource resources for CSI prediction. The BS 105 may not transmit any signal in the Zp-CSI-RS or CSI-IM or combination thereof resources. In some instances, the Zp-CSI-RS or CSI-IM or combination thereof resources can be used by another UE for transmission. In general, the BS 105 may configure interference measurement resources in any suitable frequency and/or time pattern. In some instances, the BS 105 may configure an entire RB (occupying all REs within the RB) as an interference measurement resource.

Returning to FIG. 3A, at action 312, upon receiving the interference measurement resource configuration from the BS 105, the UE 115 may determine interference measurements from the interference measurement resources 330a and/or 330b. In some aspects, the UE 115 may receive an interference signal from each interference measurement resource 330 and measure a received interference signal power at each interference measurement resource 330. For simplicity of discussion, the UE 115 may utilize one set of interference measurement resources 330a to train an interference predictor. However, the UE 115 can utilize any suitable number of interference measurement resource sets (e.g., about 2, 3, 4, or more) to train an interference predictor.

At action 314, the UE 115 may determine an interference predictor based on the interference measurements. In some aspects, the UE 115 may have a single receive antenna. The UE 115 may receive interference signal from each of the interference measurement resources 330a, for example, at time t1, t2, tN. The interference signal may be represented by x(t). The interference signal may be modeled or represented as a random process and the autocorrelation and autocovariance functions of x(t) may be as shown below:

$$R(\tau) = E(x(t) \times X^*(t+\tau)),$$

$$R_c(r) = E((x(t) - E(x(t))) \times (x(t+\tau) - E(x(t+\tau)))^*),$$

$$R_c(\tau) = R(\tau) - E(x(t))(E(x(t+\tau))) = R(\tau) - \hat{x}\hat{x}^*, \quad (1)$$

where $R(\tau)$ represents the autocorrelation function of the wide-sense stationary (WSS) process x(t), $(\cdot)^*$ represents the conjugate of $(\cdot)$, $R_c(\tau)$ represents the autocovariance function, $E(\cdot)$ represents the expectation operator, $E(x(t)) = E(x(t+\tau)) = \hat{x}$ with $\hat{x}$ being independent of time index since the process is a wide-sense stationary process, and $x^*(t+\tau)$ represents the conjugate of $x(t+\tau)$. When the random process is Ergodic, the autocorrelation value $R(\tau)$ of x(t) at time shift T from t can be estimated as shown below:

$$R(\tau) = \frac{1}{N} \sum_{n=1}^{n=N} (x(t_n) \times x^*(t_n + \tau)), \quad (2)$$

where N represents the number of time instants where interference is sampled or measured, $t_n$ represents the measurement time instants, and $\tau$ represents the amount time (e.g., the period 304) between each consecutive measurement time instants. For instance, $t_1$ and $(t_1+\tau)$ may correspond to measurement time t1 and t2 shown in FIG. 3B, respectively. An ergodic process may refer to a process with the property that, given sufficient time, may include or impinge on all points in a given space and can be represented statistically by a reasonably large selection of data points. In some instances, N may be set to a sufficiently large number (e.g., about 20, 50, 100) to provide a sufficiently accurate estimation of the autocorrelation value $R(\tau)$ in equation (2).

In some aspects, the UE 115 may obtain a sequence of interference measurements x(t) from the interference measurement resource 330a of FIG. 3B at a series of measurement time instants t1, t2, . . . , tN. The UE 115 may compute an autocorrelation $R(\tau)$ for a first interference measurement x(t1), a second interference measurement x(t2), . . . , an $N^{th}$ interference measurement x(tN) as shown in Equation (2).

The UE 115 may utilize prediction techniques, such as maximum-a'posteriori-probability (MAP) or minimum mean square error (MMSE) to map a latest value (e.g., interference measurement) to a future value (e.g., a predicted interference). When a random process (e.g., the interference) is a Gaussian stationary random process, MAP and MMSE are equivalent and may be represented as a linear MMSE (LMMSE), which is a linear predictor. The linear predictor may be in the form of a linear prediction filter. The UE 115 may determine filter coefficients for the linear prediction filter from the autocovariance function. In some instances, the UE 115 may also determine a bias for the linear predictor. The bias may be associated with a mean value of the interference x(t), where the mean value may be time-independent since the interference process is stationary.

In some aspects, the UE 115 may have multiple receive antennas. For example, the UE 115 may have M number of receive antennas, and thus may receive M number of interference signals at each measurement time instant. The interference signal received at an $m^{th}$ receive antenna may be represented as $x_m(t)$, where t represents the measurement time instant (e.g., t1, t2, . . . , tN). Similar to the single receive antenna, the interference at the multiple receive antennas may be a Gaussian stationary random process. For multiple receive antennas, the UE 115 may determine the interference predictor based on an autocorrelation of interference for each receive antenna and a cross-correlation of interference for each pair of receive antennas. As an example, the UE 115 may have two receive antennas, denoted as r1 and r2. At each measurement time instant t1, t2, . . . , tN, the UE 115 may receive an interference signal $x_{r1}(t)$ at receive antenna r1 and an interference signal $x_{r2}(t)$ at receive antenna r2. The UE 115 may compute the mean and the autocorrelation function for the receive antenna r1 from $x_{r1}(t1), x_{r1}(t2), \ldots, X_{r1}(tN)$. Similarly, the UE 115 may compute the mean and the autocorrelation function for the receive antenna r2 from $x_{r2}(t1), x_{r2}(t2), \ldots, x_{r2}(tN)$. Additionally, the UE 115 may compute a cross-correlation between $x_{r1}(t1)$ and $x_{r2}(t1)$ at time instant t1, between $x_{r1}(t2)$ and $x_{r2}(t2)$ at time instant t2, and so on.

In some aspects, for multiple receive antennas (e.g., M number of antennas), the interference received at measurement time t1 may be represented as a vector Z(t1) or in a short-form as $Z_{t1}$. The vector $Z_{t1}$ may include M number of elements corresponding to the M received interference signals at the receive antennas of the UE 115. Referring to the example where the UE 115 has two receive antennas r1 and r2, $Z_{t1}$ may be represented as $[x_{r1}(t1) \ x_{r2}(t1)]$, $Z_{t2}$ may be represented as $[x_{r1}(t2) \ x_{r2}(t2)]$, and so on. In some instances, the vector $Z_{tn}$ at a measurement time instant tn may include interference signals received at all receive antennas. In some other instances, the vector $Z_{tn}$ at a measurement time instant tn may include interference signals received at a subset of the receive antennas.

The UE 115 may determine the interference value at time $t_2$ from the measured interference at time $t_1$ using the interference predictor as shown below:

$$Z_{t2} = W \times Z_{t1} + b = c_{Z_{t1}Z_{t2}} \times C_{Z_{t1}Z_{t1}}^{-1} \times (Z_{t1} - \mu) + \mu, \quad (3)$$

where W represents linear predictor coefficients matrix or linear filter coefficients matrix, b represents a bias vector, $C_{Z_{t1}Z_{t2}}$ represents the covariance matrix between the interference vectors $Z_{t1}$ and $Z_{t2}$ at times t1 and t2, respectively, $C_{Z_{t1}Z_{t1}}^{-1}$ represents the inverse of the autocovariance matrix for $Z_{t1}$, and µ is a vector representing the mean value of which is independent of time.

After determining the interference predictor, the UE 115 may apply the interference predictor to predict interference at one or more future time instants based on an interference measurement measured at a current time instant or a past time instant. The UE 115 may also modify an SNR or SINR measurement by the predicted interference to obtain predicted SINRs for the one or more future time instants. The UE 115 may determine predicted CSI based on the predicted interference and/or predicted SINR for reporting as will be discussed more fully below in FIGS. 4-8.

Figure 4:
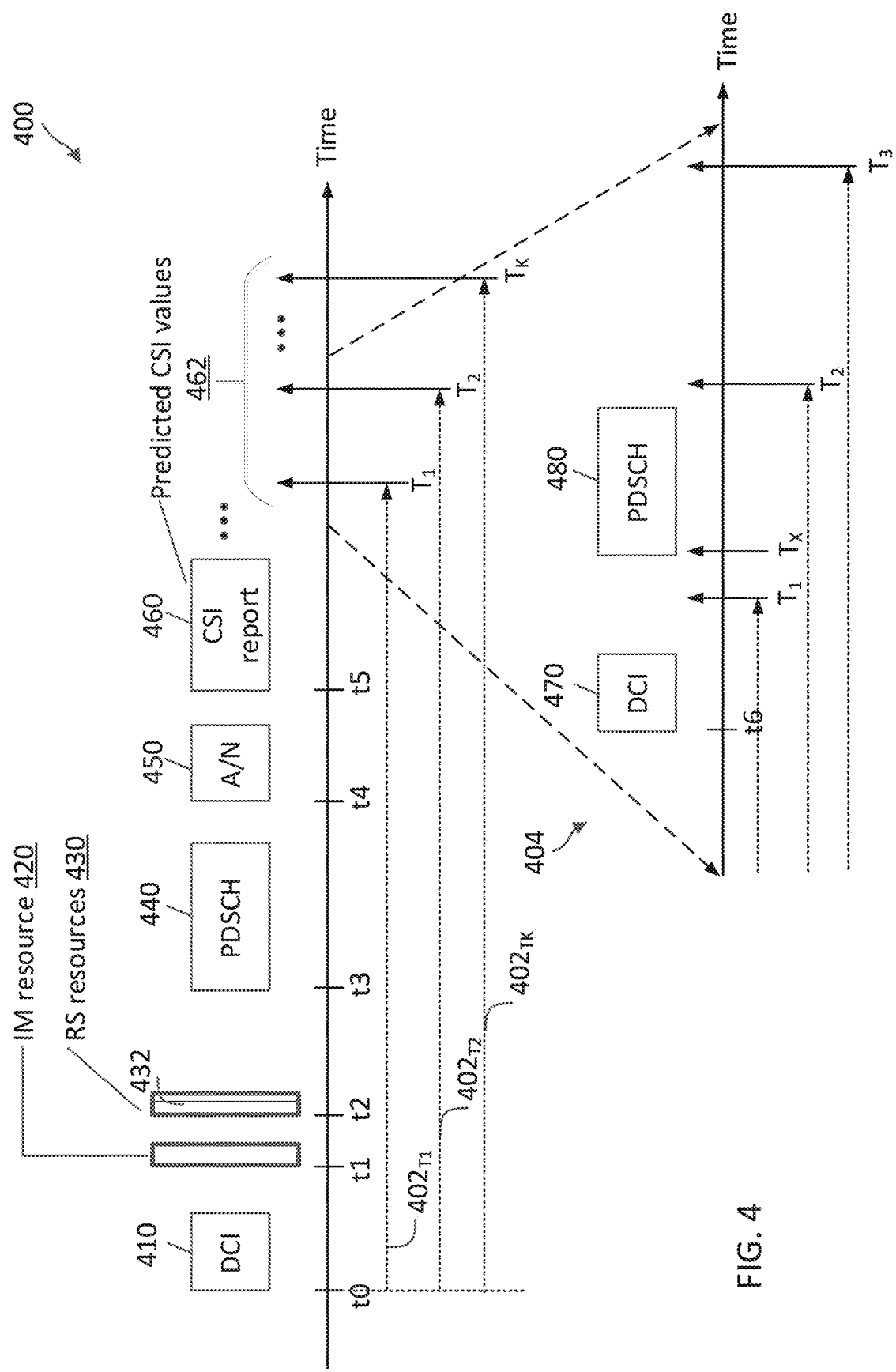
FIG. 4 is a timing diagram illustrating a channel state prediction and reporting scheme according to some aspects of the present disclosure.

FIG. 4 is a timing diagram illustrating a channel state prediction and reporting scheme 400 according to some aspects of the present disclosure. The scheme 400 may be employed by BSs such as the BSs 105 and/or UEs such as the UEs 115 in a network such as the network 100 for communications. In particular, the BS may request the UE to report predicted CSI at one or more future time instants as shown in the scheme 400. In FIG. 4, the x-axes represent time in some arbitrary units. In the scheme 400, the BS 105 may schedule UE 115 for a PDSCH communication by transmitting DCI to the UE 115, and may additionally include a request for a CSI report for one or more future time instants in the DCI.

As shown, at time t0, the BS 105 transmits DCI 410, for example, via a PDCCH. The DCI 410 may include a DL scheduling grant for a PDSCH communication 440 at time t3. The DCI 410 may include a trigger for an aperiodic CSI report 460. The trigger may request the UE 115 to provide predicted CSI at one or more future time instants, for example, at a set of future time instants $T_1, T_2, \ldots, T_K$ relative to a reference time. For instance, the set of future time instants $T_1, T_2, \ldots, T_K$ can be represented as time offsets with respect to the time (e.g., t0) when the DCI 410 is received as shown by the dotted arrows. For example, if time t0 is set to 0, then the set of future time instants $T_1, T_2, \ldots, T_K$ are at time $T_1, T_2, \ldots, T_K$. In general, the time offsets may be in any suitable time units (e.g., symbols, slots). In some other instances, the set of future time instants $T_1, T_2, \ldots, T_K$ may be relative to the time (e.g., t1) where the interference measurement resource 410 is located. In yet some other instances, the set of future time instants $T_1, T_2, \ldots, T_K$ may be relative to the time (e.g., t2) where the reference signal resource 420 is located. In general, the reference time can be any suitable point of time, for example, predetermined or indicated by the BS 105 to the UE 115. The DCI 410 may also include an indication of an interference measurement resource 420 (shown as IM resource) at time t1 and a reference signal resource 430 (shown as RS resource) at time t3. In some aspects, the interference measurement resource 420 is a CSI-IM resource or a Zp-CSI-RS or CSI-IM or combination thereof resource, and the reference signal resource 430 is a CSI-RS resource. In some aspects, the BS 105 may configure the UE 115 with the interference measurement resource 420 and the reference signal resource 430 via an RRC configuration and may include an activation for the interference measurement resource 420 and the reference signal resource 430 in the DCI 410.

At time t1, the BS 105 may not transmit any signal to the UE 115 in the interference measurement resource 420 so that the UE 115 can determine interference from other interference sources in the interference measurement resource 420. At time t2, the BS 105 may transmit a reference signal 432 (e.g., CSI-RS) in the reference signal resource 430 so that the UE 115 can determine a receive signal quality (e.g., reference signal received power (RSRP), reference signal received quality (RSRQ), SNR, SINR) from the BS 105. In some instances, the reference signal 432 may include a predetermined waveform sequence or pilot symbols known to the UE 115. At time t3, the BS 105 may transmit a PDSCH communication signal 440 (including DL data) to the UE 115 as scheduled.

Since the BS 105 schedules the PDSCH communication signal 440 at the time when the DCI 410 is transmitted, which is before receiving the CSI report 460, the scheduling and/or transmission parameters (e.g., MCS, transmission rank parameter, precoding parameter, and/or transmission power parameter) for the transmission of the PDSCH communication signal 440 are independent of the CSI report 460. Although FIG. 4 illustrates the DCI 410 including a scheduling grant for PDSCH communication signal 440, an indication of the interference measurement resource 420, and an indication of the reference signal resource 430, it should be understood that in other examples the BS 105 may request a CSI report from the UE 115 by transmitting DCI including a CSI report trigger and any suitably combinations of a scheduling grant, an indication of an interference measurement resource, and/or an indication of a reference signal resource as will be discussed more fully below in FIGS. 13-18.

Upon receiving the DCI 410, the UE 115 may determine an interference measurement from the interference measurement resource 420 at time t2. For instance, the UE 115 may receive an interference signal from the interference measurement resource 420 and determine a received interference power from the received interference signal. At time t3, the UE 115 may receive the reference signal 432 from the reference signal resource 430 and may determine a receive signal measurement (e.g., RSRP, RSRQ, SNR, SINR) from the received reference signal 432. The UE 115 may apply an interference predictor (e.g., determined using mechanisms as discussed above with reference to FIGS. 3A and 3B) to the interference measurement to determine a predicted interference at each of the future time instants $T_1, T_2, \ldots, T_K$. In some aspects, the UE 115 may include predicted interference information (e.g., predicted CSI values 462) for the future time instants $T_1, T_2, \ldots, T_K$ in the CSI report 460. In some aspects, the UE 115 may determine CSI for the future time instants $T_1, T_2, \ldots, T_K$ based on the predicted interference information and the measured receive signal measurements, and include the predicted CSI (e.g., predicted CSI values 462) in the CSI report 460. The UE 115 may determine the predicted CSI values 462 including, but not limited to predicted CQI, predicted RI, predicted PMI, predicted beam information using various techniques for CSI reporting as will be discussed more fully below in FIGS. 5-8.

As discussed above, the BS 105 and the UE 115 may utilize HARQ techniques to improve communication reliability. For instance, the BS 105 may apply HARQ for the transmission of the PDSCH communication signal 440. As such, the UE 115 may provide the BS 105 with a reception status feedback by transmitting an HARQ ACK-NACK feedback (shown as A/N signal 450) to the BS 105. For instance, if the UE 115 successfully decoded data from the PDSCH communication signal 440, the UE 115 may transmit a HARQ ACK in the A/N signal 450. Conversely, if the UE 115 fails to decode data from the PDSCH communication signal 440, the UE 115 may transmit a HARQ NACK in the A/N signal 450.

In some aspects, the BS 105 may include an indication of the set of future time instants $T_1, T_2, \ldots, T_K$ for CSI reporting in the DCI 410. In some aspects, the BS 105 may configure the UE 115 with multiple sets of future time instants, for example, via an RRC configuration, and may include an index, in the DCI, indicating which of the multiple sets of future time instants the UE 115 may use for the CSI reporting. As an example, the BS 105 may configure a list of four sets of future time instants, where a first set may be identified by an index 00, a second set may be identified by an index 01, a third set may be identified by an index 10, and a fourth set may be identified by an index 11. The BS may include an index 10 to indicate the third set of future time instants. In some aspects, the set of future time instants $T_1, T_2, \ldots, T_K$ may be in the form of time offsets (shown as $402T_1, 402T_2, \ldots, 402T_K$) relative to a reference time. The time offsets can be in units of slots, symbols, or any suitable time units. In some aspects, the reference time can be associated with a reception time (e.g., a first symbol or a last symbol) of the DCI 410 as shown. In some other aspects, the reference time can be associated with a reception time (e.g., a first symbol or a last symbol) of the interference measurement resource 420. In yet some other aspects, the reference time can be associated with a reception time (e.g., a first symbol or a last symbol) of the reference signal resource 430. In yet some other aspects, the reference time can be associated with a reception time (e.g., a first symbol or a last symbol) of the PDSCH communication signal 440. In yet some other aspects, the reference time can be associated with a transmission time (e.g., a first symbol or a last symbol) of the CSI report 460. In general, the reference time for determining the future time instants $T_1, T_2, \ldots, T_K$ can be any suitable point of time.

In some aspects, the BS 105 may configure the UE 115 with a certain error metric for determining the predicted CSI values 462. In some aspects, the BS 105 may configure the UE 115 with one error metric (e.g., a certain target BLER) for determining all the predicted CSI values 462 at the future time instants $T_1, T_2, \ldots, T_K$. In some other aspects, the BS 105 may configure the UE 115 with multiple different error metrics, for example, a first error metric (e.g., a target BLER X) for estimating a predicted CSI value at the future time instant $T_1$, and a second error metric (e.g., a target BLER Y) different from the first error metric for estimating a predicted CSI value at another future time instant, for example, at $T_2$. In general, the BS 105 has the flexibility to configure the UE 115 to provide different predicted CSI values at different future time instants with different error metrics or target BLERs, for example, depending on the types of DL traffic that the BS 105 is intended to schedule for the UE 115 around the corresponding future time instants. Accordingly, the UE 115 may determine the predicted CSI values 462 further based on corresponding error metrics (e.g., or a as a function of the error metrics) configured by the BS 105. In some aspects, the BS 105 may configure the UE 115 with the error metrics via an RRC configuration. In some aspects, the BS 105 may configure the UE 115 with the error metrics via a MAC-CE.

Further, in some aspects, the BS 105 may request the UE 115 for on-demand CSI reporting. For instance, the BS 105 may request for predicted CSI at one or more future time instants for one or more error metrics or BLERs. For instance, the BS 105 may configure the UE 115 with F number of sets of one or more future time instants (e.g., in the form of a list) via RRC signaling or MAC-CE signaling. Additionally, the BS 105 may configure the UE 115 with R number of error metrics or BLERs (e.g., in the form of a list) via RRC signaling or MAC-CE signaling. For on-demand CSI reporting, the BS 105 may transmit DCI to request the UE 115 to provide predicted CSI. The DCI may indicate a report trigger, an index referencing a certain future time instant set of the F future time instant sets, and an indication of one more error metrics of the R error metrics. In response to the on-demand CSI reporting, the UE 115 may report predicted CSI at time instant(s) of the requested certain future time instant set and for each requested error metric. As an example, the DCI may reference a future time instant set including time instants at $T_1, T_2, T_3$ and may indicate BLER X and BLER Y. Accordingly, the UE 115 may report $CSI(T_1), CSI(T_2), CSI(T_3)$ at time $T_1, T_2, T_3$ for BLER X and $CSI(T_1), CSI(T_2), CSI(T_3))$ at time $T_1, T_2, T_3$ for BLER Y.

In some aspects, the BS 105 may also request the UE 115 to report CSI at a measurement time. For instance, referring to the example illustrated at FIG. 4, if the UE 115 measures or computes CSI based on the reference signal 432 at time t2, the UE 115 may report the CSI (e.g., CSI(t2)) measured at time t2. Alternatively, if the UE 115 measures or computes CSI based on the PDSCH communication 440 at time t3, the UE 115 may report the measured CSI (e.g., CSI(t3)) measured at time t3.

In some aspects, the BS 105 may schedule the UE 115 for another PDSCH communication 480 based on the CSI report 460. As shown by an expanded view 404 of a portion of the timeline after the CSI report 460. For instance, at time t6, the BS 105 transmits DCI 470 to schedule the UE 115 for a PDSCH communication 480 at time $T_X$ relative to t0, where $T_X$ may be between $T_1$ and $T_2$. The BS 105 may determine scheduling parameters (e.g., MCS, transmission rank, precoding parameters) for the PDSCH communication 480 based at least in part on the predicted CSI values at $T_1$ and $T_2$. In some aspects, the BS 105 may determine predicted CSI for $T_X$ based on an interpolation over at least some of the predicted CSI values 462 as will be discussed more fully below in relation to FIG. 9.

Figure 5:
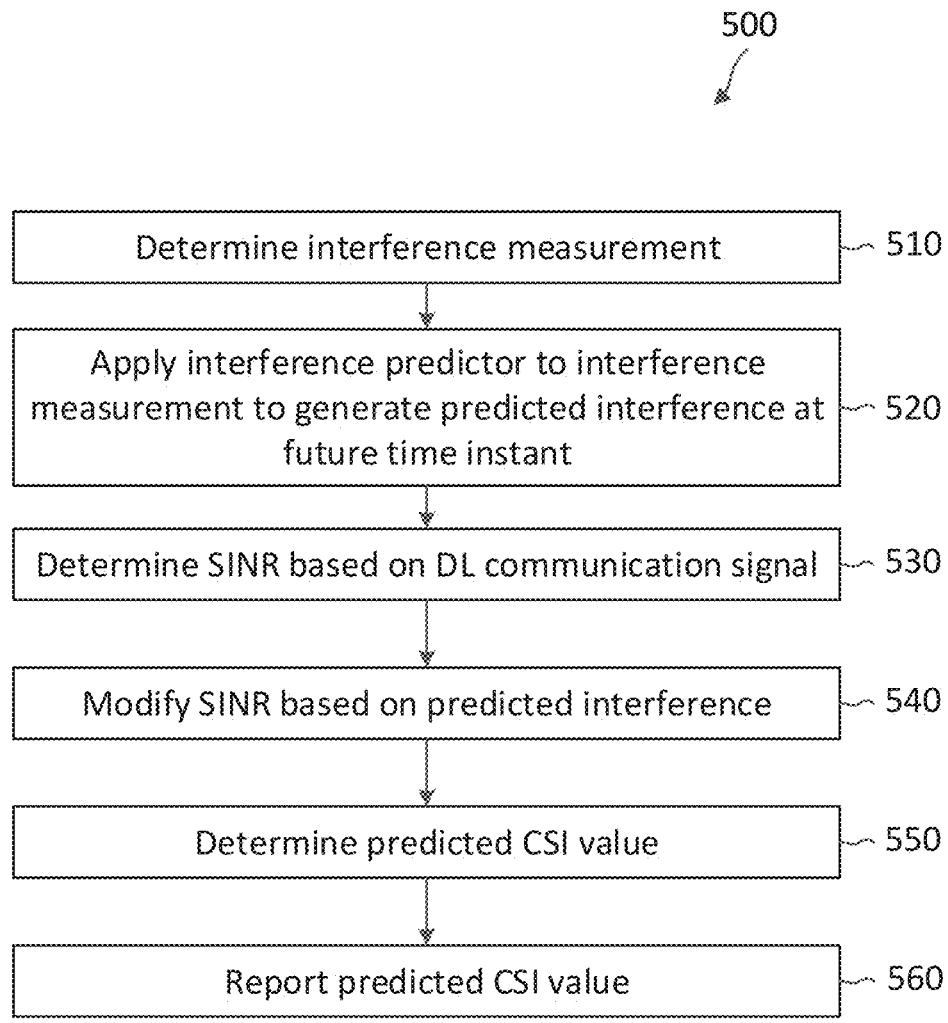
FIG. 5 is a flow diagram of a channel state prediction and reporting method according to some aspects of the present disclosure.

FIG. 5 is a flow diagram of a channel state prediction and reporting method 500 according to some aspects of the present disclosure. Aspects of the method 500 can be executed by a UE, such as the UEs 115 and/or 1900. A UE may comprise a processor, processing circuit, and/or any other suitable component or means for performing the steps. For example, a UE 1900 may utilize one or more components, such as the processor 1902, the memory 1904, the channel state module 1908, the transceiver 1910, the modem 1912, and the one or more antennas 1916, to execute the steps of method 500. The method 500 may be implemented after the UE had completed training an interference predictor as discussed above in relation to FIGS. 3A-3B. The method 500 may be employed as part of an interference prediction and CSI reporting process. For example, the UE may employ the method 500 to generate the CSI report 460 in the scheme 400 discussed above in relation to FIG. 4. Further, the method 500 may be used to improve the perform of URLLC between a BS and a UE. As illustrated, the method 500 includes a number of enumerated steps, but aspects of the method 500 may include additional steps before, after, and in between the enumerated steps. In some aspects, one or more of the enumerated steps may be omitted or performed in a different order.

At block 510, a UE (e.g., the UE 115 or UE 1900) determines an interference measurement. The UE may receive a configuration from a BS (e.g., the BS 105 or BS 1800) indicating an interference measurement resource, which is a time-frequency resource similar to the interference measurement resources 330 or 420. The interference measurement resource may occupy a number of REs (e.g., the REs 212) over one or more symbols (e.g., the symbols 206). The UE may receive an interference signal from the interference measurement resource. The UE may determine a measurement (e.g., an interference power) of the received interference signal.

At block 520, the UE applies an interference predictor to the interference measurement to generate a predicted interference for a future time instant. The interference predictor may be trained using mechanisms discussed above in relation to FIGS. 3A-3B. In some aspects, the interference predictor may include a set of one or more prediction filter coefficients and a bias value as shown in equation (3) above. The UE may filter the interference measurement by the prediction filter (e.g., by multiplying the filter coefficient matrix and the interference measurement) and add the bias value to the output of the prediction filter to generate the predicted interference.

At block 530, the UE determines an SINR based on a DL communication signal received from the BS. In some aspects, the DL communication signal may be a reference signal such as a CSI-RS, which is a predetermined waveform sequence known to the UE. For instance, the BS may configure the UE with a reference signal resource similar to the reference signal resource 430. The UE may receive the reference signal from the reference signal resource and determine the SINR from the received reference signal. In some other aspects, the DL communication signal may be a PDSCH communication signal similar to the PDSCH communication signal 440. The DL communication signal may include a demodulation reference signal (DMRS), which may include a set of predetermined pilot symbols known to the UE. The UE may determine the SINR from the DMRS.

As an example, assume a single layer transmission from the base station, the UE may receive the DL communication signal at time $t_c$. The UE may compute an SNR for time $t_c$ based on the following relationship:

$$SNR(t_c) = \frac{P\_data(t_c)}{Ns(t_c)}, \qquad (4)$$

where P_data ($t_c$) represents the receive signal power at time $t_c$ and Ns($t_c$) represents the noise thermal power measured at the UE's receive antenna at time $t_c$. The UE may determine the SINR at time $t_c$ based on the following relationship:

$$SINR(t0) = \frac{SNR(t_c)}{\left(1 + \frac{P\_interference(t_c)}{Ns(t_c)}\right)}, \qquad (5)$$

where P_interference ($t_c$) represents the interference measurement computed at block 510.

At block 540, when there is no channel prediction, the UE modifies the SINR based on the predicted interference to generate a predicted SINR for the future time instant. The UE may remove the impact of interference at the measurement time $t_c$ from SINR ($t_c$) and add the impact of the predicted interference. For instance, the UE may determine the predicted SINR at the future time instant, denoted as ti, based on the following relationship:

$$SINR(ti) = \frac{SNR(t_c)}{\left(1 + \frac{P\_interference(ti)}{Ns(t_c)}\right)}, \qquad (6)$$

where P_interference(ti) represents the predicted interference computed at block 520. In some aspects, the UE may apply channel prediction in addition to interference prediction. When channel prediction is also applied at UE side, the SINR at time ti is given by $$SINR(ti) = \frac{SNR(ti)}{\left(1 + \frac{P\_interference(ti)}{Ns(ti)}\right)}, \qquad (7)$$

At block 550, the UE determines a predicted CSI value (e.g., the predicted CSI values 462) based on the predicted SINR. In some aspects, the predicted CSI value may include a predicted CQI, and thus the UE may generate a predicted CQI from the predicted SINR. In this regard, the UE may be configured with a plurality of CQI lookup tables with various coding rates and/or MCS. Each CQI lookup table may include a mapping between CQI indices and MCSs. In this regard, the UE may be configured with one or more CQI lookup tables associated with different code rates and/or different spectral efficiencies, and may select, from a certain CQI table, an index to the highest MCS that would result in a certain BLER (e.g., of about 1e-5 for URLLC) for a DL transmission from the BS 105. In some aspects, the UE may select a lowest-code rate table from among the plurality of CQI lookup tables.

In some aspects, the predicted CSI value may include a predicted RI, and thus the UE may generate a predicted RI. In some aspects, the UE may generate the predicted RI based on a predicted channel matrix computed based on the predicted interference measurement and SINR. In some aspects, the UE may also generate a predicted precoding parameter (e.g., a predicted PMI) and/or a predicted beam direction to be included in the predicted CSI based on the predicted interference measurement and SINR. In general, the UE may determine predicted SINR, spectral efficiency, CQI, RI, and/or precoders based on the predicted interference and receive signal measurements.

In some aspects, the UE may include multiple receive antennas, and thus the UE may determine an interference measurement for each receive antenna at block 510, determine a predicted interference for each receive antenna at block 520, determine an SINR for each receive antenna at block 530, determine a predicted SINR for each receive antenna at block 540, and determine a predicted CSI value based on one or more predicted SINRs for one or more of the receive data layers.

At block 560, the UE reports the predicted CSI value. For instance, the UE may transmit a CSI report (e.g., the CSI report 460) including the CSI value to the BS. The predicted CSI value may assist the BS in determining scheduling parameters (e.g., MCS, transmission rank, precoding parameters, and/or beam information) for a next DL transmission to the UE, for example, at a time close to the future time instant ti.

In some aspects, the UE may determine predicted CSI for a wideband. In other words, the UE may determine the predicted CSI value for an entire frequency band or BWP in which the UE communicates DL communications with the BS.

In some other aspects, the UE may determine predicted CSI on a per-subband basis. For instance, the UE may determine the interference measurement (e.g., P_interference($t_c$)) for each $k^{th}$ subband of a plurality of subbands within the frequency band or BWP in which the UE communicates DL communications with the BS at block 510. The UE may determine the predicted interference measurement (e.g., P_interference(ti) for each $k^{th}$ subband at block 520, determine the measured SINR (e.g., SINR ($t_c$)) each $k^{th}$ subband at block 530, determine the predicted SINR (e.g., SINR (ti)) each $k^{th}$ subband at block 540, and determine the predicted CSI value each $k^{th}$ subband at block 550. The UE may include a predicted CSI value for each subband k in the CSI repot at block 560. In some aspects, the CSI report at block 560 may include a predicted CQI value for each subband k.

In some aspects, the UE may determine and report predicted CSI on a per-RB basis. For instance, the UE may determine the interference measurement (e.g., P_interference($t_c$)) for each RB within the frequency band or BWP in which the UE communicates DL communications with the BS at block 510. The UE may determine the predicted interference measurement (e.g., P_interference(ti) for each RB at block 520, determine the measured SINR (e.g., SINR ($t_c$)) for each RB at block 530, determine the predicted SINR (e.g., SINR(ti)) for each RB at block 540, and determine the predicted CSI value for each RB at block 550. The UE may include a predicted CSI value for each RB in the CSI repot at block 560.

In some aspects, the UE may determine and report predicted CSI on a per-RB group basis. For instance, the UE may determine the interference measurement (e.g., P_interference($t_c$)) for each RB group (e.g., a number of RBs) within the frequency band or BWP in which the UE communicates DL communications with the BS at block 510. The UE may determine the predicted interference measurement (e.g., P_interference(ti) for each RB group at block 520, determine the measured SINR (e.g., SINR ($t_c$)) for each RB group at block 530, determine the predicted SINR (e.g., SINR (ti)) for each RB group at block 540, and determine the predicted CSI value for each RB group at block 550. The UE may include a predicted CSI value for each RB group in the CSI repot at block 560.

In some aspects, the UE may determine a series of predicted CSI value for a series of future time instants. Referring to the example illustrated in FIG. 4 where the CSI report trigger is for a series of future time offsets $T_1$, $T_2$, ..., $T_K$ from a reference time (e.g., the DCI with the CSI report trigger). The UE may apply the interference predictor to determine a series of predicted interference at block 520 and determine as series of predicted SINRs at block 540. For instance, assuming t0=0 in FIG. 4, the UE may determine P_interference(ti) for ti=$T_1$, $T_2$, ..., $T_K$ and determine predicted SINR for ti=$T_1$, $T_2$, $T_K$ by substituting P_interference(ti) as shown in equation (6) above. Subsequently, the UE may convert the series of predicted SINRs into a series of predicted CSI values. In some aspects, the predicted CSI values may include predicted CQI values (e.g., CQI($T_1$), CQI($T_2$), CQI($T_K$)), predicted RI values (e.g., RI($T_1$), RI($T_2$), ..., RI($T_K$)), and/or any other suitable predicted CSI such as PMI and/or CRI.

In some aspects, the UE may report a predicted CSI value for each RB, each group of RBs, or each subband for a series of future time instants. For example, in some instances, the UE may report $CSI_m$(ti) predicted for each $m^{th}$ RB at each future time instant ti. In some other instances, the UE may report $CSI_m$(ti) predicted for each $m^{th}$ group of RBs at each future time instant ti. In yet some instances, the UE may report $CSI_m$(ti) predicted for each $m^{th}$ subband at each future time instant ti.

Figure 6:
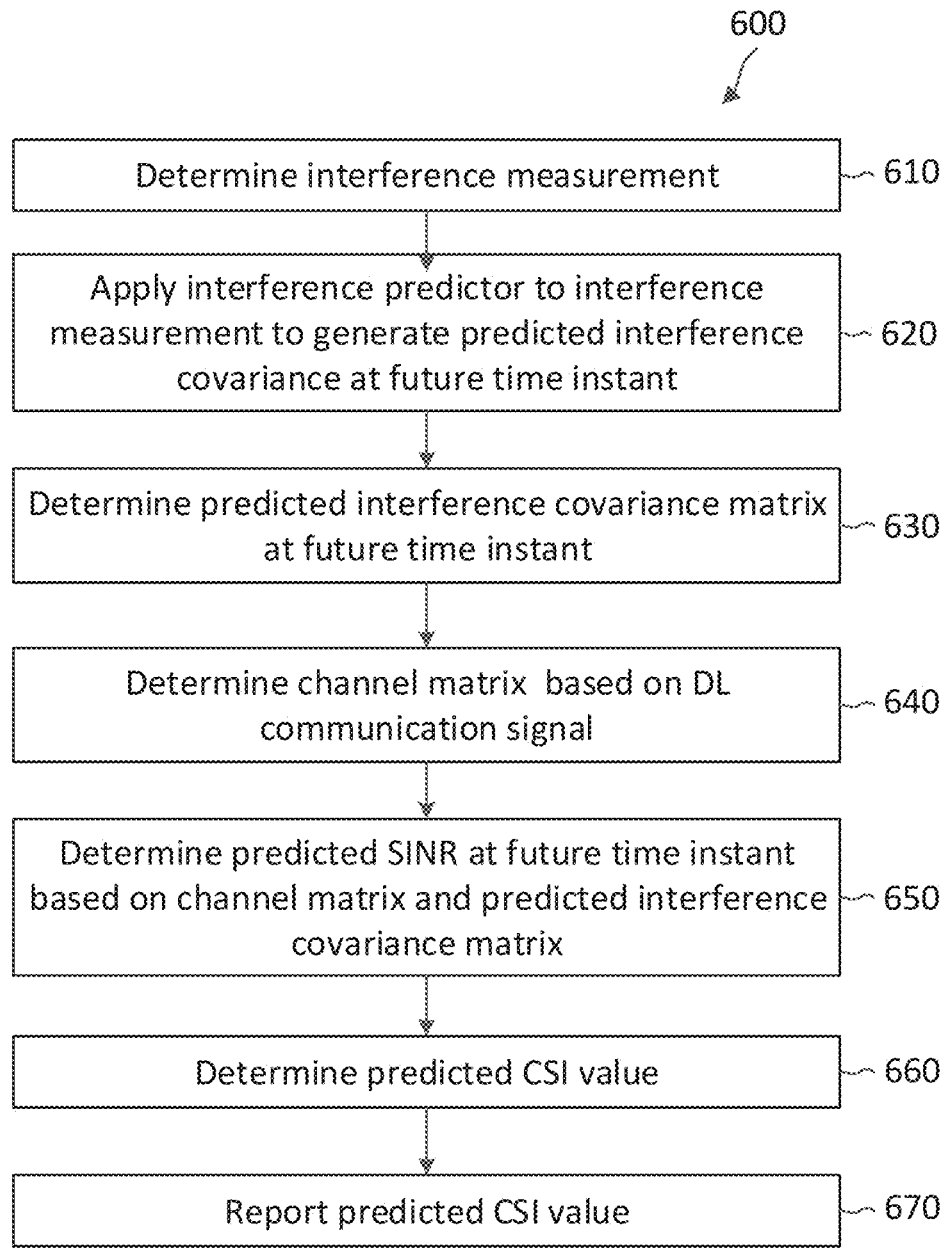
FIG. 6 is a flow diagram of a channel state prediction and reporting method according to some aspects of the present disclosure.

FIG. 6 is a flow diagram of a channel state prediction and reporting method 600 according to some aspects of the present disclosure. Aspects of the method 600 can be executed by a UE, such as the UEs 115 and/or 1900. A UE may comprise a processor, processing circuit, and/or any other suitable component or means for performing the steps. For example, a UE 1900 may utilize one or more components, such as the processor 1902, the memory 1904, the channel state module 1908, the transceiver 1910, the modem 1912, and the one or more antennas 1916, to execute the steps of method 600. The method 600 may be implemented after the UE had completed training an interference predictor as discussed above in relation to FIGS. 3A-3B. The method 600 may be employed as part of an interference prediction and CSI reporting process. For example, the UE may employ the method 600 to generate the CSI report 460 in the scheme 400 discussed above in relation to FIG. 4. Further, the method 600 may be used to improve the perform of URLLC between a BS and a UE. As illustrated, the method 600 includes a number of enumerated steps, but aspects of the method 600 may include additional steps before, after, and in between the enumerated steps. In some aspects, one or more of the enumerated steps may be omitted or performed in a different order.

Generally speaking, the method 600 includes features similar to method 500 in many respects. For example, blocks 610, 620, 660, and 670 are similar to blocks 510, 520, 550, and 560, respectively. Accordingly, for sake of brevity, details of those actions will not be repeated here and may be referred to the corresponding descriptions above. However, the method 600 may determine a predicted SINR at a future time instant based on a predicted interference covariance matrix or interference-plus-noise covariance matrix instead of a predicted interference power as in the method 500.

For instance, at block 610, a UE (e.g., the UE 115 or UE 1900) determines an interference measurement, for example, using similar mechanisms as discussed at block 510.

At block 620, the UE applies an interference predictor to the interference measurement to generate a predicted interference for a future time instant, for example, using similar mechanisms as discussed at block 520. In some aspects, the UE may include multiple receive antennas, and thus the UE may determine an interference measurement for each receive antenna at block 610, and may determine a predicted interference for each receive antenna at block 620.

At block 630, the UE determines a predicted interference covariance matrix based on the predicted interference for the future time instant. The covariance matrix is a measure of a predicted variation among the interference across the receive antennas at the future time instant.

At block 640, the UE determines a channel matrix H based on a DL communication signal received from the BS. The DL communication signal may be a CSI-RS or a DMRS in a PDSCH communication signal received from a BS (e.g., the BS 105 or the BS 1800) as discussed above in relation to block 530. As explained above, the CSI-RS or DMRS may be a predetermine waveform sequence or pilot symbols known to the UE. Thus, the UE may determine the channel matrix (or channel response) based on the DL communication received at each receive antenna and the known CSI-RS or known DMRS.

At block 650, the UE determines a predicted SINR at the future time instant, denoted as ti. In this regard, the UE may determine a predicted channel matrix $H_{ti}$ of RE/tone 1 for time ti and determine the predicted SINR based on the channel matrix $H_{ti}$ of RE/tone 1 and the predicted interference covariance matrix $C_1$ of tone for time ti (determined at block 630). The UE may compute a predicted data covariance matrix $C_d$ (ti) of tone 1, after interference-plus-noise whitening, at the future time instant ti based on the following relationship:

$$C_d(ti) = C_{ti}^{-\frac{1}{2}} H_{ti} P_x (C_{ti}^{-1/2} \times H_{ti})^*, \qquad (8)$$

where $C_{ti}^{-1/2}$ can whiten the impact of interference-plus-noise predicted at time instance ti, $P_x$ is the transmission data power matrix, and $(\cdot)^*$ is the conjugate and transpose operation on the underlying matrix $(\cdot)$. The UE may utilize the data covariance matrix $C_d$ (ti) of all REs per subband (where a subband is composed of a plurality of RBs and each RB is composed of a plurality of REs as discussed above in relation to FIG. 2) to generate per-layer SINR of each subband k and then generate per data layer spectral efficiency (SPEF) for each subband. The UE may average the per data layer, per subband SPEF across data layers and subbands to obtain an average SPEF that is used to obtain the predicted CQI and RI. The per subband CQI is obtained based on the per subband SPEF averaged across data layers/streams. In some other instances, the UE may utilize other techniques to obtain the same information of SPEF, CQI, RI, relying on the predicted channel and interference values.

In some aspects, the UE may determine or train a channel predictor to predict $H_{ti}$ using similar mechanisms as the training for the interference predictor. For instance, the BS 105 may configure the UE with multiple reference signal resources (e.g., spaced apart in time according to a certain periodicity) and may transmit reference signals (e.g., CSI-RSs or DMRSs) in the reference signal resources. The UE 115 may receive the reference signals from the reference signal resources and determine reference signal measurements from the received reference signals. In some case, the UE can create a channel predictor from previous transmissions from the base station (for example, from periodic, aperiodic or semi-persistent CSI-RS signals, PDSCH and the associated DMRS, other non-zero power reference signals including SSB and TRS, etc). The UE 115 may model the reference signal measurements as a Gaussian stationary random process and determine the channel predictor as a linear predictor. The UE 115 may compute prediction filter coefficients based on autocorrelation of the reference signal measurements of reference signal received at each receive antenna and cross-correlation of the reference signal measurements of reference signals received at each pair of receive antennas as discussed above in relation to FIG. 3A.

At block 660, the UE determines a predicted CSI value (e.g., the predicted CSI values 462) based on the predicted SINR. In some aspects, the predicted CSI value may include a predicted CQI, and thus the UE may generate a predicted CQI from the predicted SINR. In this regard, the UE may be configured with a plurality of CQI lookup tables with various coding rates and/or MCSs. Each CQI lookup table may include a mapping between CQI indices and MCSs. In this regard, the UE may be configured with one or more CQI lookup tables associated with different code rates and/or different spectral efficiencies, and may select, from a certain CQI table, an index to the highest MCS that would result in a certain BLER (e.g., of about 1e-5 for URLLC) for a DL transmission from the BS 105. In some aspects, the UE may select a lowest-code rate table from among the plurality of CQI lookup tables.

In some aspects, the predicted CSI value may include a predicted RI, and thus the UE may generate a predicted RI. In some aspects, the UE may generate the predicted RI based on a predicted channel matrix computed based on the predicted interference measurement and SINR. In some aspects, the UE may also generate a predicted precoding parameter (e.g., a predicted PMI) and/or a predicted beam direction to be included in the predicted CSI based on the predicted interference measurement and SINR. In general, the UE may determine predicted SINR, spectral efficiency, CQI, RI, and/or precoders based on the predicted interference and receive signal measurements.

At block 670, the UE reports the predicted CSI value. For instance, the UE may transmit a CSI report (e.g., the CSI report 460) including the CSI value to the BS. The predicted CSI value may assist the BS in determining scheduling parameters (e.g., MCS, transmission rank, precoding parameters, and/or beam information) for a next DL transmission to the UE, for example, at a time close to the future time instant ti.

Similar to the method 500, the predicted CSI value can be a wideband CSI value and the UE may determine the predicted CSI values for a series of future time instants $T_1$, $T_2, \ldots, T_K$. In some aspects, the predicted CSI values may include predicted CQI values (e.g., CQI ($T_1$), CQI ($T_2$), . . . , CQI ($T_K$)), predicted RI values (e.g., RI($T_1$), RI($T_2$), . . . , RI($T_K$)), and/or any other suitable predicted CSI such as PMI for the series of future time instants.

In some aspects, the UE may perform the method 600 on a per-RB basis, per-RB group basis, or a per-subband basis. For instance, the UE may determine the interference measurements at block 610, the predicted interference measurement at block 620, the predicted interference covariance matrix at block 630, the measured SINR or channel matrix H at block 640, the predicted SINR (e.g., SINR (ti)) at block 650, and the predicted CSI value at block 660 for each RB, each RB group, or each subband in a frequency or BWP in which the UE communicates DL communications with the BS. The UE may include a predicted CSI value for each subband k in the CSI repot at block 670. In some aspects, the CSI report at block 670 may include a predicted CSI value for each RB. In some aspects, the CSI report at block 670 may include a predicted CSI value for each RB group.

In some aspects, the UE may report a predicted CSI value for each RB, each group of RBs, or each subband n a frequency or BWP in which the UE communicates DL communications with the BS for a series of future time instants. For example, in some instances, the UE may report $CSI_m$(ti) predicted for each $m^{th}$ RB at each future time instant ti. In some other instances, the UE may report $CSI_m$(ti) predicted for each $m^{th}$ group of RBs at each future time instant ti. In yet some instances, the UE may report $CSI_m$(ti) predicted for each $m^{th}$ subband at each future time instant ti.

Figure 7:
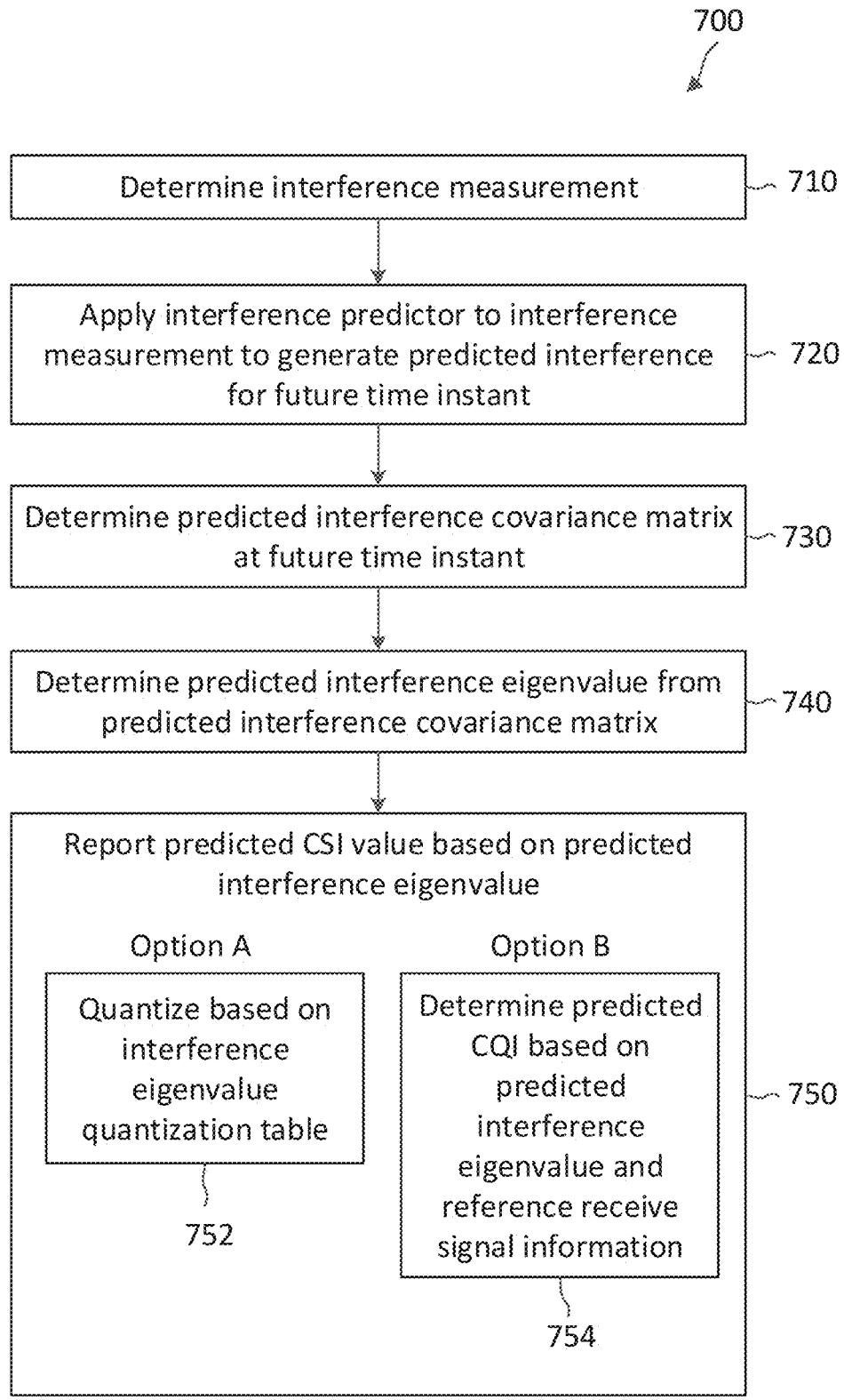
FIG. 7 is a flow diagram of a channel state prediction and reporting method according to some aspects of the present disclosure.

FIG. 7 is a flow diagram of a channel state prediction and reporting method 700 according to some aspects of the present disclosure. Aspects of the method 700 can be executed by a UE, such as the UEs 115 and/or 1900. A UE may comprise a processor, processing circuit, and/or any other suitable component or means for performing the steps. For example, a UE 1900 may utilize one or more components, such as the processor 1902, the memory 1904, the channel state module 1908, the transceiver 1910, the modem 1912, and the one or more antennas 1916, to execute the steps of method 700. The method 700 may be implemented after the UE had completed training an interference predictor as discussed above in relation to FIGS. 3A-3B. The method 700 may be employed as part of an interference prediction and CSI reporting process. For example, the UE may employ the method 700 to generate the CSI report 460 in the scheme 400 discussed above in relation to FIG. 4. Further, the method 700 may be used to improve the perform of URLLC between a BS and a UE. As illustrated, the method 700 includes a number of enumerated steps, but aspects of the method 700 may include additional steps before, after, and in between the enumerated steps. In some aspects, one or more of the enumerated steps may be omitted or performed in a different order.

Generally speaking, the method 700 includes features similar to method 600 in many respects. For example, blocks 710, 720, and 730 are similar to blocks 610, 620, and 630, respectively. Accordingly, for sake of brevity, details of those actions will not be repeated here and may be referred to the corresponding descriptions above. However, the method 700 may determine a predicted maximum interference eigenvalue and report the predicted maximum interference eigenvalue directly or report a predicted CQI determined from the predicted maximum interference eigenvalue.

For instance, at block 710, a UE (e.g., the UE 115 or UE 1900) determines an interference measurement, for example, using similar mechanisms as discussed at block 610.

At block 720, the UE applies an interference predictor to the interference measurement to generate a predicted interference for a future time instant, for example, using similar mechanisms as discussed at block 620.

At block 730, the UE determines a predicted interference covariance matrix based on the predicted interference for the future time instant, for example, using similar mechanisms as discussed at block 630.

At block 740, the UE determines a predicted interference eigenvalue from the predicted interference covariance matrix, for example, using standard matrix computation techniques. The UE may determine the maximum eigenvalue, denoted as $\lambda_{max}$, of the predicted interference covariance matrix as the predicted interference eigenvalue. The maximum eigenvalue $\lambda_{max}$ may provide an upper bound for the amount of interference that may be present at the future time instant.

At block 750, the UE reports a predicted CSI value based on the predicted interference eigenvalue to the BS. The predicted CSI value may assist the BS in determining scheduling parameters (e.g., MCS, transmission rank, precoding parameters, and/or beam information) for a next DL transmission to the UE, for example, at a time close to the future time instant ti.

In some aspects, the UE may determine an interference measurement for each RB in a frequency band or BWP in which the UE communicates DL communications with the BS at block 710. The UE may determine a predicted interference measurement for each RB at block 720, determine an interference covariance matrix for each RB at block 730, and a maximum interference eigenvalue across all covariance matrices (across all RBs) at block 740.

In some other aspects, the UE may determine an interference measurement for each subband in a frequency band or BWP in which the UE communicates DL communications with the BS at block 710. The UE may determine a predicted interference measurement for each subband at block 720, determine an interference covariance matrix for each subband at block 730, and a maximum interference eigenvalue across all covariance matrices (across all the subbands) at block 740.

In some aspects, the UE may determine a series of predicted interference eigenvalue values for a series of future time instants, for example, at time offset $T_1$, $T_2$, ..., $T_K$ from a reference time (e.g., a reception time of the DCI that triggers the CSI reporting). The UE may determine a predicted interference for each future time instant at block 720, determine a predicted interference covariance matrix for each future time instant based on a corresponding predicted interference at block 730, and determine a predicted interference eigenvalue for each future time instant from a corresponding interference covariance matrix. For instance, the UE may report a CSI report including $\lambda_{max}(T_1)$, $\lambda_{max}(T_2)$, ..., $\lambda_{max}(T_K)$ in the CSI report. In some instances, the UE may report an interference eigenvalue at a measurement time in addition to the interference eigenvalues at the future time instants. For instance, referring to the example illustrated in FIG. 4, the UE may also report $\lambda_{max}(t1)$ for time t1 when the UE determines an interference measurement from the interference measurement resource 420.

In some aspects, the UE may have two options, option A or option B, for reporting interference eigenvalue(s). For purposes of explanations and brevity of discussion, options A and B are discussed for reporting a predicted CSI at one future time instant, but may be scaled to report predicted CSI at any suitable number of future time instants (e.g., about 2, 3, 4, 5, 6 or more). For option A, the UE may quantize a predicted interference eigenvalue based on an interference eigenvalue quantization table at block 752 and report the quantized predicted interference eigenvalue. For instance, the BS may configure the UE with an interference eigenvalue quantization table, for example, via an RRC configuration or a MAC-CE. In some aspects, the interference eigenvalue quantization table may include a set of indices each representing a certain interference eigenvalue range (e.g., based on a certain quantization step size). Thus, the UE may look up an index in the interference eigenvalue quantization table based on the predicted interference eigenvalue and the table index in a CSI report. The option A may be suitable for use when the UE is triggered to report CSI without an activated CSI-RS resource or a PDSCH schedule. For example, the DCI 410 in FIG. 4 may include the CSI report trigger, but no indication for the reference signal resource 430 or a scheduling grant for the PDSCH communication signal 440.

For option B, the UE may determine a predicted CQI value for future time instant from a predicted interference eigenvalue at determined for the future time instant based on reference receive signal information at block 754. In this regard, the BS may configure the UE with reference receive signal information (e.g., a reference SINR, a reference SNR, a reference signal power) for computing a predicted CQI from a predicted interference eigenvalue. In some aspects, the BS may configure the UE with the reference signal information via an RRC configuration. In some aspects, the BS may configure the UE with the reference signal information via a MAC-CE. The UE may modify the reference receive signal information based on the predicted interference eigenvalue to generate a predicted SINR for the future time instant. For instance, the reference signal information may include a reference SNR or a reference SINR, and the UE may generate a predicted SNR or SINR by backing off the reference SNR or the reference SINR, respectively, by an amount corresponding to the predicted interference eigenvalue (e.g., in a logarithmic or decibel domain). The UE may convert the predicted SINR to a predicted CQI value based a CQI lookup table as discussed above at block 550 of the method 500 and block 660 of the method 600. In this way, the UE may report predicted CQI value without having to utilize an additional interference eigenvalue quantization table as in option A.

In some aspects, the UE may also employ option B when the UE is provided with a reference signal resource or a PDSCH scheduling grant when the BS triggers the UE to report CSI. For instance, the UE may receive a DL communication signal (e.g., a CSI-RS from the reference signal resource or a DMRS in a scheduled PDSCH communication signal) from the BS. The UE may determine an SINR from the DL communication signal and modify the measured SINR by a predicted interference eigenvalue at the future time instant to generate a predicted SINR for the future time instant. The UE may convert the predicted SINR to a predicted CQI based a CQI lookup table as discussed above at block 550 of the method 500 and block 660 of the method 600 and report the predicted CQI.

Figure 8:
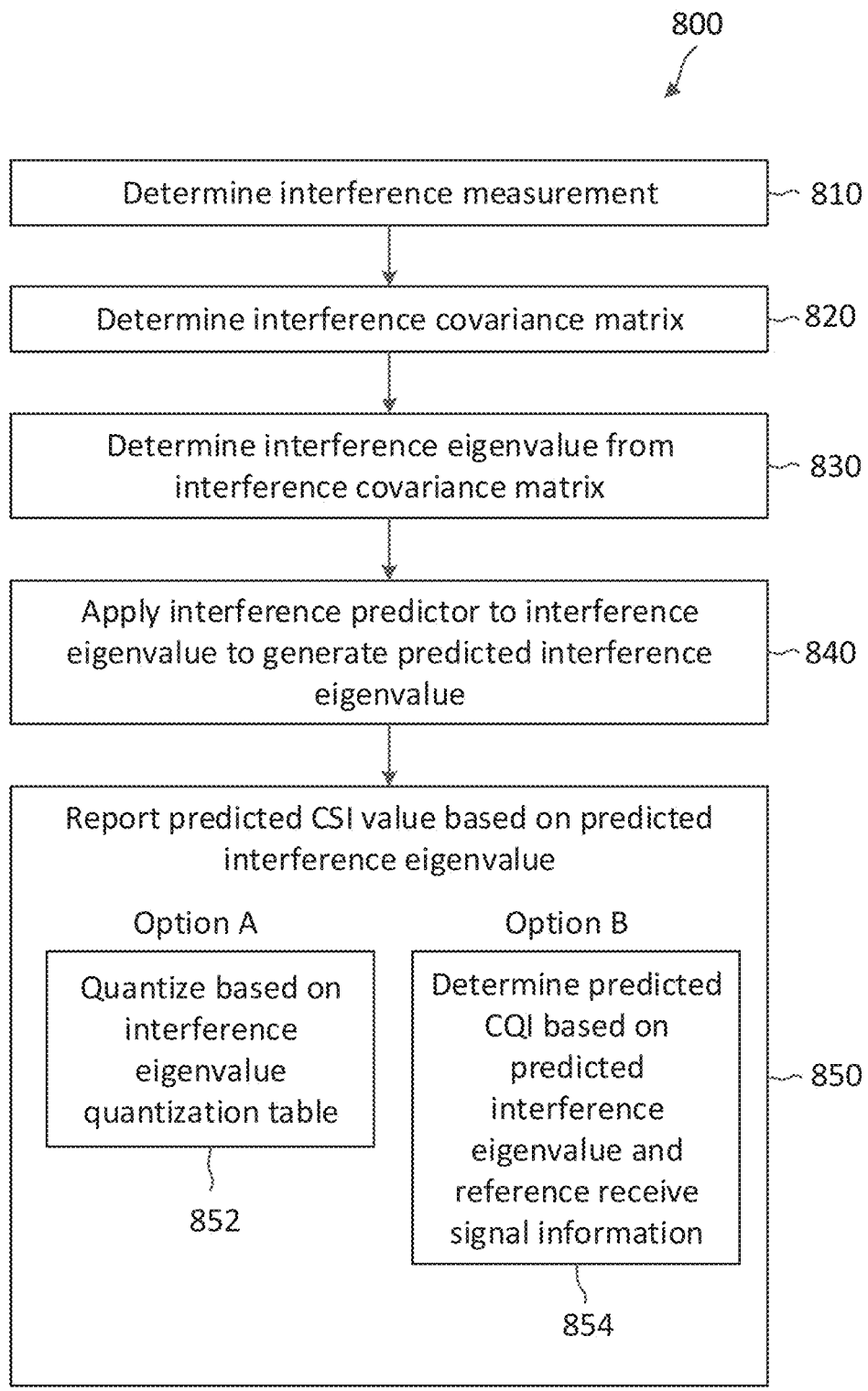
FIG. 8 is a flow diagram of a channel state prediction and reporting method according to some aspects of the present disclosure.

FIG. 8 is a flow diagram of a channel state prediction and reporting method 800 according to some aspects of the present disclosure. Aspects of the method 800 can be executed by a UE, such as the UEs 115 and/or 1900. A UE may comprise a processor, processing circuit, and/or any other suitable component or means for performing the steps. For example, a UE 1900 may utilize one or more components, such as the processor 1902, the memory 1904, the channel state module 1908, the transceiver 1910, the modem 1912, and the one or more antennas 1916, to execute the steps of method 800. The method 800 may be implemented after the UE had completed training an interference predictor as discussed above in relation to FIGS. 3A-3B. The method 800 may be employed as part of an interference prediction and CSI reporting process. For example, the UE may employ the method 800 to generate the CSI report 460 in the scheme 400 discussed above in relation to FIG. 4. Further, the method 800 may be used to improve the perform of URLLC between a BS and a UE. As illustrated, the method 800 includes a number of enumerated steps, but aspects of the method 800 may include additional steps before, after, and in between the enumerated steps. In some aspects, one or more of the enumerated steps may be omitted or performed in a different order.

Generally speaking, the method 800 includes features similar to method 700 in many respects. For example, blocks 710, 730, 750, 752, and 754 are similar to blocks 810, 820, 850, 852, and 854, respectively. Accordingly, for sake of brevity, details of those actions will not be repeated here and may be referred to the corresponding descriptions above. However, the method 800 may apply an interference predictor to an interference eigenvalue instead of to an interference power measurement as in the method 700.

For instance, at block 810, a UE (e.g., the UE 115 or UE 1900) determines an interference measurement, for example, using similar mechanisms as discussed at block 710.

At block 820, the UE determines an interference covariance matrix based on the interference measurements, for example, using similar mechanisms as discussed at block 730.

At block 830, the UE determines an interference eigenvalue from the interference covariance matrix, for example, using standard matrix computation techniques. The UE may determine the maximum eigenvalue, denoted as $\lambda_{max}$, of the interference covariance matrix as the predicted interference eigenvalue.

At block 840, the UE applies an interference predictor to the interference eigenvalue to generate a predicted interference eigenvalue for a future time instant. The interference predictor may be determined using substantially similar mechanisms as discussed above in relation to FIGS. 3A-3B. For instance, the UE may compute the signal mean/average and autocorrelation values for a sequence of interference eigenvalues (e.g., $\lambda_{max}$) determined from interference received in a set of interference measurement resources (e.g., the interference measurement resources 330a and/or 330b) in a training period.

At block 850, the UE reports a predicted CSI value based on the predicted interference eigenvalue to the BS. The predicted CSI value may assist the BS in determining scheduling parameters (e.g., MCS, transmission rank, precoding parameters, and/or beam information) for a next DL transmission to the UE, for example, at a time close to the future time instant ti. In some instances, the UE may utilize option A (at block 852) to quantize the predicted interference eigenvalue and report the quantized predicted interference eigenvalue, for example, using mechanism as discussed above at block 752. In some other instances, the UE may utilize option B (at block 854) to determine a predicted CQI from the predicted interference eigenvalue based on reference signal information (e.g., reference SNR, SINR, or receive signal power), for example, configured by the BS. The UE may also report per-RB, per-RB group, or per-subband maximum interference eigenvalue(s) for one or more future time instants as discussed above in relation to block 750.

In some aspects, when a UE 115 utilizes any of the methods 500, 600, 700, or 800 to determine and report predicted CSI values, the UE 115 may apply a certain error metric (e.g., target BLER) for each predicted CSI value. In some aspects, the UE 115 may receive an indication of the error metric to be used for determining a predicted CSI value at a certain future time instant from the BS as discussed above in relation to FIG. 4.

Figure 9:
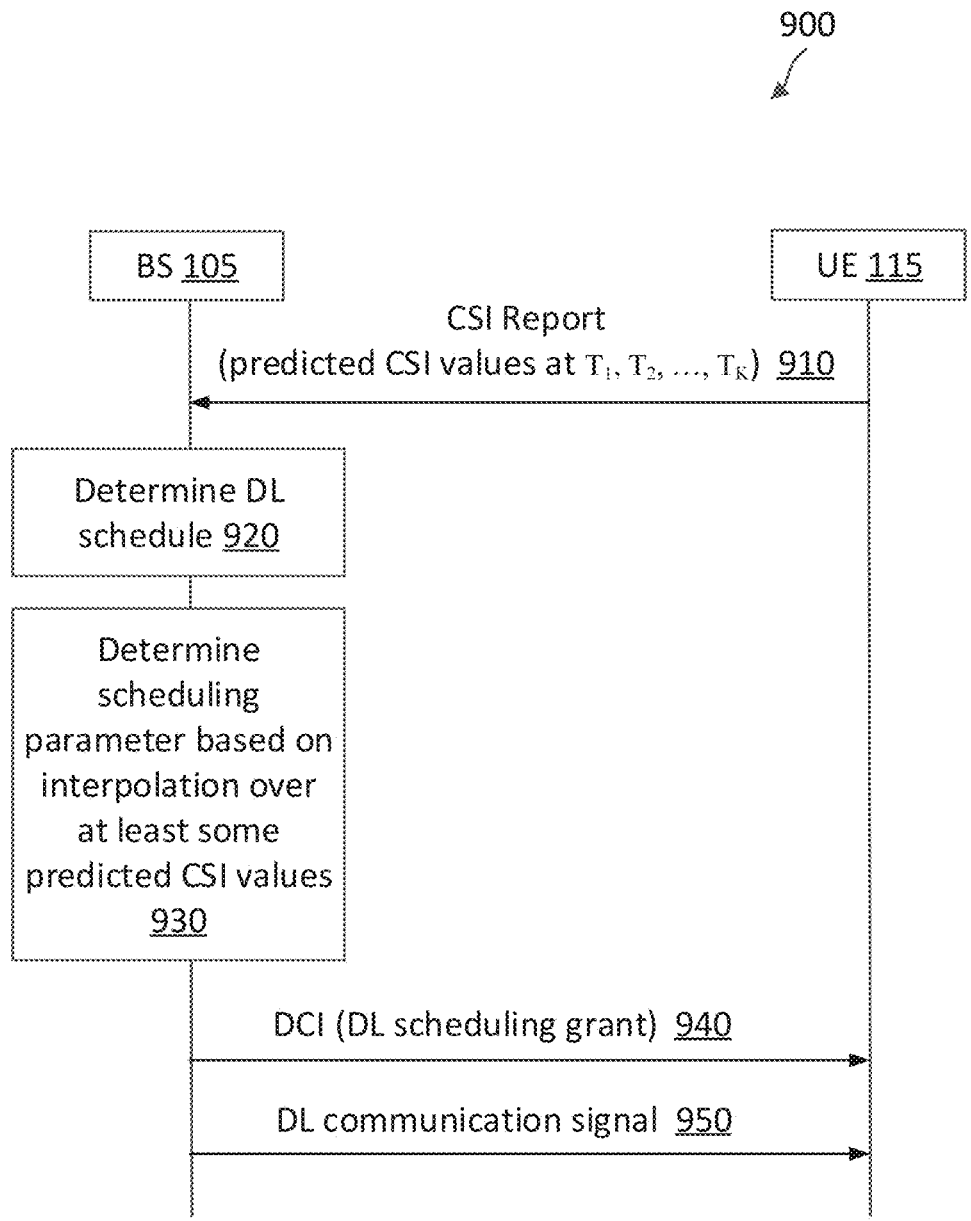
FIG. 9 is a signaling diagram illustrating a channel state prediction-based scheduling and communication method according to some aspects of the present disclosure.

FIG. 9 is a signaling diagram illustrating a channel state prediction-based scheduling and communication method 900 according to some aspects of the present disclosure. The method 900 may be implemented between a UE 115 and a BS 105 in the network 100. The method 900 may be implemented in conjunction with the channel state prediction and reporting discussed above in relation to FIGS. 3A-3B and 4-8. In some aspects, the method 900 may be implemented after the UE 115 determines an interference predictor, for example, using the method 300 as discussed above in relation to FIG. 3A. In some aspects, the method 900 may be implemented as part of the scheme 400 discussed above in relation to FIG. 4. In some aspects, the UE 115 may utilize one or more components, such as the processor 1902, the memory 1904, the channel state module 1908, the transceiver 1910, the modem 1912, and the one or more antennas 1916 of FIG. 19, to execute the steps of method 900. In some aspects, the BS 105 may utilize one or more components, such as the processor 1802, the memory 1804, the channel state module 1808, the transceiver 1810, the modem 1812, and the one or more antennas 1816 of FIG. 18, to execute the steps of method 900. As illustrated, the method 900 includes a number of enumerated actions, but aspects of the method 900 may include additional actions before, after, and in between the enumerated actions. In some aspects, one or more of the enumerated actions may be omitted or performed in a different order.

At action 910, the UE 115 transmits a CSI report including a series of predicted CSI values for a series of future time instants, from example, at $T_1, T_2, \ldots, T_K$. The predicted CSI values may be represented as $CSI(T_1), CSI(T_2), \ldots, CSI(T_K)$. In some aspects, the predicted CSI values may be predicted CQI values. In some other aspects, the predicted CSI values may be predicted RI values, predicted precoding parameters (e.g., a predicted PMI), predicted beam information, or any other suitable CSI parameters. In some aspects, the UE 115 may transmit the CSI report in response to a DCI (e.g., the DCI 410) including a CSI report trigger. In some aspects, the BS 105 may include an indication of the series of future time instants $T_1, T_2, \ldots, T_K$ for CSI reporting in the DCI. In some aspects, the BS 105 may configure the UE 115 with multiple sets of future time instants, for example, via an RRC configuration, and may include an index, in the DCI, indicating which of the multiple sets of future time instants the UE 115 may use for the CSI reporting. In some aspects, the set of future time instants $T_1, T_2, \ldots, T_K$ may be in the form of time offsets (shown as $402_{T1}, 402_{T2}, \ldots, 402_{TK}$) relative to a reference time. The time offsets can be in units of slots, symbols, or any suitable time units. The reference time can be based on a reception time of the DCI, an interference measurement resource if the DCI includes an interference measurement resource activation, a reference signal resource if the DCI includes a reference signal resource activation, or a PDSCH signal if the DCI includes a PDSCH scheduling grant.

In some aspects, the DCI may include an activation or indication of an interference measurement resource (e.g., the interference measurement resource 420) and a reference signal resource (e.g., the reference signal resource 430). Accordingly, the UE 115 may determine an interference measurement from the interference measurement resource and an SINR from the reference signal resource, apply the interference predictor to determine a predicted interference for each of the K future time instants $T_1, T_2, \ldots, T_K$, determine a predicted SINR for each of the K future time instants $T_1, T_2, \ldots, T_K$ by modifying the SINR by a corresponding predicted interference, for example, using the method 500, 600, 700, or 800 discussed above in relation to FIG. 5, 6, 7, or 8, respectively.

In some aspects, the DCI may include a scheduling grant for a PDSCH communication signal (e.g., the PDSCH communication signal 440) and an activation of an interference measurement resource. Accordingly, the UE may determine an interference measurement from the interference measurement resource and an SINR from a DMRS in the PDSCH communication signal, apply the interference predictor to the interference measurement to determine a predicted interference for each of the K future time instants $T_1, T_2, \ldots, T_K$, determine a predicted SINR for each of the K future time instants $T_1, T_2, \ldots, T_K$ by modifying the SINR by a corresponding predicted interference, for example, using the method 500, 600, 700, or 800 discussed above in relation to FIG. 5, 6, 7, or 8, respectively.

In some aspects, the DCI may include an activation of an interference measurement resource with no reference signal resource activation or PDSCH scheduling grant. Accordingly, the UE may determine an interference measurement from the interference measurement resource, apply the interference predictor to interference measurement to determine a predicted interference for each of the K future time instants $T_1, T_2, \ldots, T_K$. The UE may determine a predicted SINR for each of the K future time instants $T_1, T_2, \ldots, T_K$ by modifying a most recently (latest) measured or computed SINR by a corresponding predicted interference, for example, using the method 500, 600, 700, or 800 discussed above in relation to FIG. 5, 6, 7, or 8, respectively.

In some aspects, the DCI may include no interference measurement resource activation, reference signal resource activation, nor PDSCH scheduling grant. Accordingly, the UE may apply the interference predictor to the most a most recently (lately) measured or determined interference measurement to determine a predicted interference for each of the K future time instants $T_1, T_2, \ldots, T_K$. The UE may determine a predicted SINR for each of the K future time instants $T_1, T_2, \ldots, T_K$ by modifying a most recently measured or computed SINR by a corresponding predicted interference, for example, using the method 500, 600, 700, or 800 discussed above in relation to FIG. 5, 6, 7, or 8, respectively.

At action 920, the BS 105 determines a DL schedule for communicating with the UE 115. For instance, the scheduled time, denoted as $T_x$, may be between two future time instants (e.g., between $T_1$ and $T_2$ as shown in the expanded view 404 of FIG. 4).

At action 930, the BS 105 determines one or more scheduling parameters for the DL communication based on an interpolation over at least some predicted CSI values. In this regard, the BS 105 may determine a predicted CSI value at the scheduled time $T_x$ (e.g., $CSI(T_x)$) by interpolating the $CSI(T_1)$ and $CSI(T_2)$ as shown below:

$$CSI(T_x)=f(CSI(T_1),CSI(T_2)), \quad (9)$$

where $f(\cdot)$ can be a linear function, a polynomial (e.g., a non-linear function), or a combination thereof. In general, the BS 105 may determine $CSI(T_x)$ from interpolating a subset or a full set of predicted CSI values, for example, based on $f(CSI(T_1), CSI(T_2), \ldots, CSI(T_K))$. The BS 105 may determine a scheduling parameter (e.g., MCS, a transmission rank, or precoding parameter) based on $CSI(T_x)$.

In some other aspects, the BS 105 may convert the $CSI(T_1)$ and $CSI(T_2)$ to the SINR domain and perform the interpolation in the SINR domain. For instance, the $CSI(T_1)$ and $CSI(T_3)$ may be CQI values corresponding to $CQI(T_1)$ and $CQI(T_2)$, respectively, and the BS 105 may convert $CQI(T_2)$ and $CQI(T_3)$ to $SINR(T_2)$ and $SINR(T_3)$, respectively, based on a CQI to SINR mapping table. After converting the $CQI(T_2)$ and $CQI(T_3)$ to $SINR(T_2)$ and $SINR(T_3)$, respectively, the BS 105 may interpolate SINR $(T_2)$ and $SINR(T_3)$ (e.g., based on $f(SINR(T_1), SINR(T_2))$) to obtain $SINR(T_x)$ for the scheduled time $T_x$. Alternatively, the BS 105 may convert $CQI(T_1), CQI(T_2), \ldots, CQI(T_K)$ to $SINR(T_1), SINR(T_2), \ldots, SINR(T_K)$, respectively, and determine $SINR(T_x)$ from $f(SINR(T_1), SINR(T_2), \ldots, SINR(T_K))$. Subsequently, the BS 105 may then convert $SINR(T_x)$ to a CQI value, $CQI(T_x)$, and determine a scheduling parameter (e.g., MCS, a transmission rank, a precoding parameter(s)) based on $CQI(T_x)$.

At action 940, the BS 105 transmits a DCI (e.g., via a PDCCH) including a DL scheduling grant. The DL scheduling grant may include transmission parameters (e.g., MCS, a transmission rank, a precoding parameter(s)) determine from the predicted CSI values.

At action 950, the BS 105 may transmit a DL communication signal to the UE 115 based on the DL scheduling grant. The DL communication signal may include DL data. In some aspects, the DL data may be URLLC data. The scheduling of the URLLC data transmission based on UE predicted CSI or CQI values (with consideration for predicted interference) can enable the BS 105 to determine more suitable transmission parameters for the URLLC data transmission. Accordingly, URLLC communication performance may improve (e.g., achieving a target residual BLER of 1e-5 in the presence of interference at the UE 115).

Figure 10:
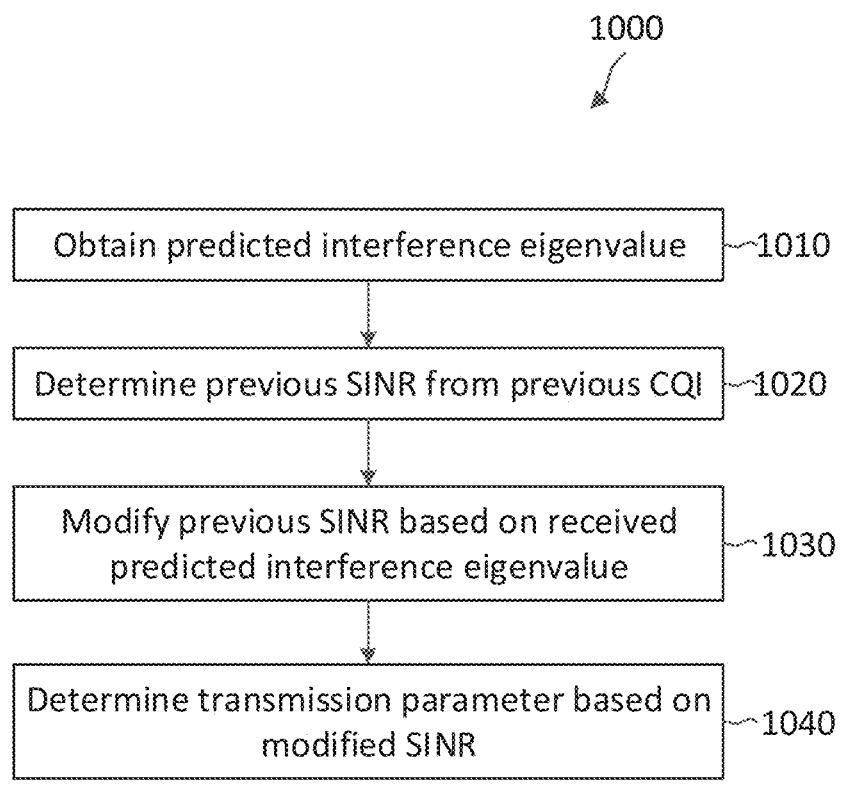
FIG. 10 is a flow diagram of a channel state prediction-based scheduling method according to some aspects of the present disclosure.
Figure 11:
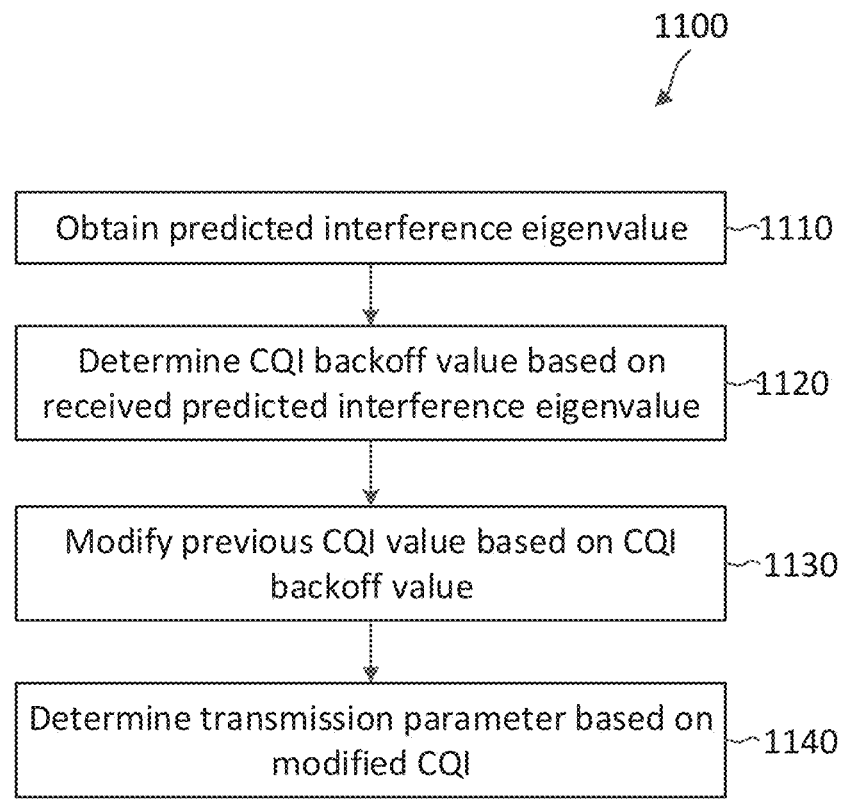
FIG. 11 is a flow diagram of a channel state prediction-based scheduling method according to some aspects of the present disclosure.
Figure 12:
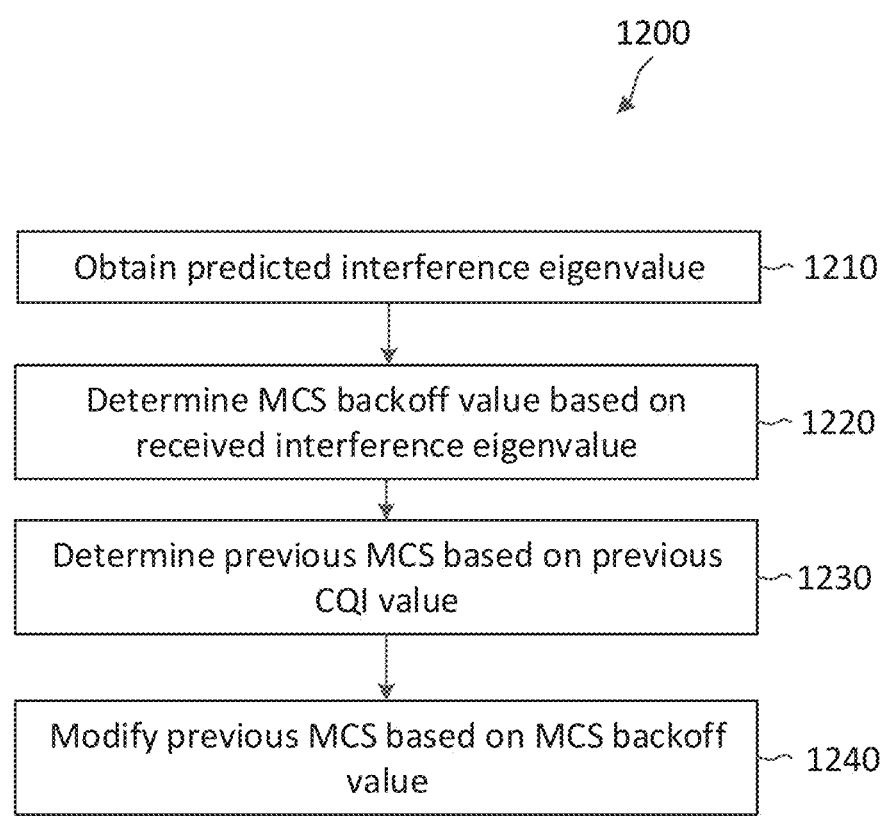
FIG. 12 is a flow diagram of a channel state prediction-based scheduling method according to some aspects of the present disclosure.

As discussed above, in some aspects, a UE 115 may report predicted interference eigenvalue(s) (e.g., $\lambda_{max}$) for future time instant(s) instead of reporting predicted CQI(s). FIGS. 10-12 illustrate various mechanisms for a BS 105 to determine transmission parameters based on predicted interference eigenvalue(s).

FIG. 10 is a flow diagram of a channel state prediction-based scheduling method 1000 according to some aspects of the present disclosure. Aspects of the method 1000 can be executed by a BS, such as the BSs 105 and/or 1800. A BS may comprise a processor, processing circuit, and/or any other suitable component or means for performing the steps of the method 1000. For example, a BS 1800 may utilize one or more components, such as the processor 1802, the memory 1804, the channel state module 1808, the transceiver 1810, the modem 1812, and the one or more antennas 1816, to execute the steps of method 1000. The method 1000 may be implemented after the UE had completed training an interference predictor as discussed above in relation to FIGS. 3A-3B. The method 1000 may be employed as part of a scheduling process. For example, the BS may employ the method 1000 to determine scheduling or transmission parameters when the UE reports interference eigenvalues, for example, using the method 700 or 800 discussed above in relation to FIG. 7 or 8, respectively. The method 1000 can be employed in conjunction with the method 900. Further, the method 1000 may be used to improve the perform of URLLC between a BS and a UE. As illustrated, the method 1000 includes a number of enumerated steps, but aspects of the method 1000 may include additional steps before, after, and in between the enumerated steps. In some aspects, one or more of the enumerated steps may be omitted or performed in a different order.

At a high level, in the method 1000, a BS (e.g., the BS 105 or 1800) may determine a scheduling or transmission parameter by performing a backoff in an SINR domain based on one or more predicted interference eigenvalues (e.g., $\lambda_{max}$) reported by a UE (e.g., a UE 115 or a UE 1900).

At block 1010, the BS obtains a predicted interference eigenvalue, denoted as $\lambda_{max}(T_x)$, for a future time instant $T_x$. The BS may obtain the predicted interference eigenvalue based at least in part on a predicted interference eigenvalue received from the UE. In some instances, the UE may report the predicted interference eigenvalue for the future time instant $T_x$. In some other instances, the UE may report a series of predicted interference eigenvalues for a series of future time instants (e.g., $T_1, T_2, \ldots, T_K$). The series of predicted interference eigenvalue may be represented by A max($T_1$) $\lambda_{max}(T_2), \ldots, \lambda_{max}(T_K)$. The future time instant $T_x$ may between two time instants of the series of future time instants. The BS may interpolate the series of received predicted interference eigenvalues to obtain the predicted interference eigenvalue $\lambda_{max}(T_x)$, for example, using an interpolation function (e.g., f ($\lambda_{max}(T_1)$) $\lambda_{max}(T_2)$) ... $\lambda_{max}(T_K)$)) as discussed above at action 930 of the method 900.

At block 1020, the BS determines a previous SINR from a previous CQI (a latest CQI) reported by the UE. For instance, the BS may look up an SINR in a CQI table that is mapped to the previous reported CQI.

At block 1030, the BS modifies the previous SINR based on the predicted interference eigenvalue $\lambda_{max}(T_x)$. In some instances, the BS may subtract the predicted interference eigenvalue $\lambda_{max}(T_x)$ from the previous SINR in a logarithmic or decibel (dB) domain.

At block 1040, the BS determines a transmission parameter (e.g., MCS) based on the modified SINR. In some instances, the BS may determine or map the modified SINR to a modified CQI value and utilize a lowest code rate CQI table to determine the MCS from the modified CQI value.

FIG. 11 is a flow diagram of a channel state prediction-based scheduling method 1100 according to some aspects of the present disclosure. Aspects of the method 1100 can be executed by a BS, such as the BSs 105 and/or 1800. A BS may comprise a processor, processing circuit, and/or any other suitable component or means for performing the steps of the method 1100. For example, a BS 1800 may utilize one or more components, such as the processor 1802, the memory 1804, the channel state module 1808, the transceiver 1810, the modem 1812, and the one or more antennas 1816, to execute the steps of method 1100. The method 1100 may be implemented after the UE had completed training an interference predictor as discussed above in relation to FIGS. 3A-3B. The method 1100 may be employed as part of a scheduling process. For example, the BS may employ the method 1100 to determine scheduling or transmission parameters when the UE reports interference eigenvalues, for example, using the method 700 or 800 discussed above in relation to FIG. 7 or 8, respectively. The method 1100 can be employed in conjunction with the method 900. Further, the method 1100 may be used to improve the perform of URLLC between a BS and a UE. As illustrated, the method 1100 includes a number of enumerated steps, but aspects of the method 1100 may include additional steps before, after, and in between the enumerated steps. In some aspects, one or more of the enumerated steps may be omitted or performed in a different order.

At a high level, in the method 1100, a BS (e.g., the BS 105 or 1800) may determine a scheduling or transmission parameter by performing a backoff in a CQI domain based on one or more predicted interference eigenvalues (e.g., $\lambda_{max}$) reported by a UE (e.g., a UE 115 or a UE 1900).

At block 1110, the BS obtains a predicted interference eigenvalue, denoted as $\lambda_{max}(T_x)$, for a future time instant $T_x$. The BS may obtain the predicted interference eigenvalue based at least in part on a predicted interference eigenvalue received from the UE. In some instances, the UE may report the predicted interference eigenvalue for the future time instant $T_x$. In some other instances, the UE may report a series of predicted interference eigenvalues for a series of future time instants (e.g., $T_1, T_2, \ldots, T_K$). The series of predicted interference eigenvalue may be represented by $\lambda_{max}(T_1), \lambda_{max}(T_2), \ldots, \lambda_{max}(T_K)$. The future time instant $T_x$ may between two time instants of the series of future time instants. The BS may interpolate the series of received predicted interference eigenvalues to obtain the predicted interference eigenvalue $\lambda_{max}(T_x)$, for example, using an interpolation function (e.g., f ($\lambda_{max}(T_1), \ldots, \lambda_{max}(T_2) \ldots )\lambda_{max}(T_K)$)) as discussed above at action 930 of the method 900.

At block 1120, the BS determines a CQI backoff value based on the predicted interference eigenvalue $\lambda_{max}(T_x)$. For instance, the BS may utilize a mapping table that maps interference eigenvalues to CQI backoff values and may look up the amount of CQI backoff (e.g., from a CQI index 10 to a CQI index 4) based on the predicted interference eigenvalue $\lambda_{max}(T_x)$.

At block 1130, the BS modifies a previous CQI (e.g., a latest CQI) reported by the UE based on the CQI backoff value. In some instances, the BS may subtract the CQI backoff value from the previous reported CQI.

At block 1140, the BS determines a transmission parameter (e.g., MCS) based on the modified CQI value (the backed off CQI). In some instances, the BS may use a lowest code rate CQI table to determine the MCS from the modified CQI value.

FIG. 12 is a flow diagram of a channel state prediction-based scheduling method 1200 according to some aspects of the present disclosure. Aspects of the method 1200 can be executed by a BS, such as the BSs 105 and/or 1800. A BS may comprise a processor, processing circuit, and/or any other suitable component or means for performing the steps of the method 1200. For example, a BS 1800 may utilize one or more components, such as the processor 1802, the memory 1804, the channel state module 1808, the transceiver 1810, the modem 1812, and the one or more antennas 1816, to execute the steps of method 1200. The method 1200 may be implemented after the UE had completed training an interference predictor as discussed above in relation to FIGS. 3A-3B. The method 1200 may be employed as part of a scheduling process. For example, the BS may employ the method 1200 to determine scheduling or transmission parameters when the UE reports interference eigenvalues, for example, using the method 700 or 800 discussed above in relation to FIG. 7 or 8, respectively. The method 1200 can be employed in conjunction with the method 900. Further, the method 1200 may be used to improve the perform of URLLC between a BS and a UE. As illustrated, the method 1200 includes a number of enumerated steps, but aspects of the method 1100 may include additional steps before, after, and in between the enumerated steps. In some aspects, one or more of the enumerated steps may be omitted or performed in a different order.

At a high level, in the method 1200, a BS (e.g., the BS 105 or 1800) may determine a scheduling or transmission parameter by performing a backoff in an MCS domain based on one or more predicted interference eigenvalues (e.g., $\lambda_{max}$) reported by a UE (e.g., a UE 115 or a UE 1900).

At block 1210, the BS obtains a predicted interference eigenvalue, denoted as $\lambda_{max}(T_x)$, for a future time instant $T_x$. The BS may obtain the predicted interference eigenvalue based at least in part on a predicted interference eigenvalue received from the UE. In some instances, the UE may report the predicted interference eigenvalue for the future time instant $T_x$. In some other instances, the UE may report a series of predicted interference eigenvalues for a series of future time instants (e.g., $T_1, T_2, \ldots, T_K$). The series of predicted interference eigenvalue may be represented by $\lambda_{max}(T_1), \lambda_{max}(T_2), \ldots, \lambda_{max}(T_K)$. The future time instant $T_x$ may between two time instants of the series of future time instants. The BS may interpolate the series of received predicted interference eigenvalues to obtain the predicted interference eigenvalue $\lambda_{max}(T_x)$, for example, using an interpolation function (e.g., $f(\lambda_{max}(T_1), \lambda_{max}(T_2), \ldots, \lambda_{max}(T_K))$) as discussed above at action 930 of the method 900.

At block 1220, the BS determines an MCS backoff value based on the predicted interference eigenvalue $\lambda_{max}(T_x)$. For instance, the BS may utilize a mapping table that maps interference eigenvalues to MCS backoffs and may look up the amount of MCS backoff (e.g., number of MCS steps) based on the predicted interference eigenvalue $\lambda_{max}(T_x)$.

At block 1230, the BS modifies a previous MCS (e.g., a latest CQI used for transmitting a DL communication to the UE) based on the MCS backoff value. In some instances, the BS may subtract the MCS backoff value from the previous MCS. For example, the previous MCS may be 16-quadrature amplitude modulation (16-QAM) with code rate ¾, and the MCS backoff may result in a MCS of QAM with code rate ½.

At block 1240, the BS determines a transmission parameter (e.g., MCS) based on the modified MCS value (the backed off MCS).

FIGS. 13-18 illustrate various mechanisms for on-demand predicted CSI reporting. In some aspects, a BS 105 may trigger a UE 115 to report predicted CSI by transmitting DCI including a request or trigger for predicted CSI. In some instances, the BS 105 may include one or more of an activation or indication of an interference measurement resource, an activation or indication of a reference signal resource, and/or a PDSCH scheduling grant along with the CSI reporting trigger in the DCI.

Figure 13:
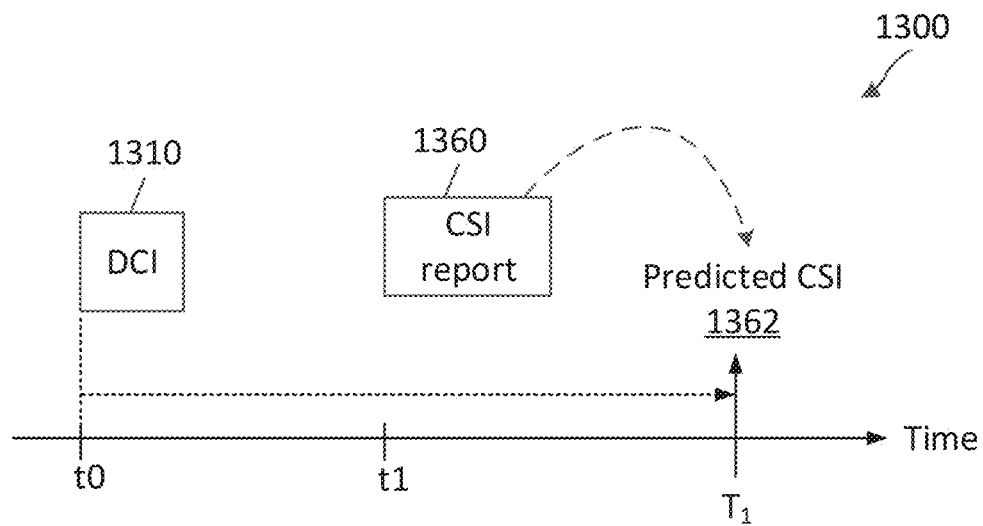
FIG. 13 is a timing diagram illustrating a channel state prediction and reporting scheme according to some aspects of the present disclosure.

FIG. 13 is a timing diagram illustrating a channel state prediction and reporting scheme 1300 according to some aspects of the present disclosure. The scheme 1300 may be employed by BSs such as the BSs 105 to configure UEs such as the UEs 115 in a network such as the network 100 for communication. In particular, the BS may request the UE to report predicted CSI as shown in the scheme 1300. In FIG. 13, the x-axis represents time in some arbitrary units. In the scheme 1300, the BS 105 may request the UE 115 to report predicted CSI without providing the UE 115 with an interference measurement resource or a reference signal resource for measurements.

As shown, at time t0, the BS 105 transmits DCI 1310, for example, via a PDCCH. The DCI 1310 may include a trigger for a CSI report 1360. The trigger may request the UE 115 to provide predicted CSI at a future time instant $T_1$ relative to a reference time. Although FIG. 13 illustrates the BS 105 requesting a predicted CSI for one future time instant, it should be understood that in other examples the BS 105 may request for predicted CSI for any suitable number of future time instants (e.g., about 2, 3, 4, 5 or more). In some aspects, the DCI 1310 may include an indication of the future time instant $T_1$. In some aspects, the future time instant $T_1$ may be relative to a reference time, for example, a reception time of the DCI 1310 as shown by the dotted arrow.

Upon receiving the DCI 1310, the UE 115 may determine a predicted interference based on a latest interference measurement (measured from an interference measurement resource similar to the interference measurement resource 330 or 420) and an interference predictor. In an aspect, the interference predictor may be trained or determined, for example, utilizing mechanisms in the method 300 and the scheme 320 as discussed above in relation to FIGS. 3A-3B. In some aspects, the UE 115 may apply the interference predictor to the latest interference measurement to generate a predicted interference for the future time instant $T_1$. The UE 115 may determine predicted CSI 1362 for the future time instant $T_1$ by modifying a latest reference signal measurement (e.g., based on a latest CSI-RS or a latest PDSCH or DMRS received from the BS 105) based on the predicted interference, for example, utilizing mechanisms in the method 500 as discussed above in relation to FIG. 5. The predicted CSI can include a predicted CQI, a predicted RI, predicted precoding information (e.g., a predicted PMI), and/or predicted beam information for the future time instant $T_1$.

In another aspect, the UE 115 may apply the interference predictor to the latest interference measurement to generate a predicted interference for the future time instant $T_1$ and determine a predicted interference covariance matrix from the predicted interference. The UE 115 may determine a channel matrix from a latest reference signal measurement (e.g., based on a latest CSI-RS or a latest PDSCH or DMRS received from the BS 105). The UE 115 may determine predicted CSI 1362 by modifying the channel matrix based on the predicted covariance matrix, for example, as discussed above in relation to FIG. 6. The predicted CSI can include a predicted CQI, a predicted RI, predicted precoding information (e.g., a predicted PMI), and/or predicted beam information for the future time instant $T_1$.

In yet another aspect, the UE 115 may apply the interference predictor to the latest interference measurement to generate a predicted interference for the future time instant $T_1$ and determine a predicted interference covariance matrix from the predicted interference. The UE 115 may determine a predicted interference eigenvalue (e.g., a maximum interference eigenvalue) from the predicted interference covariance matrix, for example, for example, as discussed above in relation to FIG. 7. The UE 115 may include the predicted interference eigenvalue in the predicted CSI 1362. In some aspects, the UE 115 may further determine predicted CSI 1362 for the future time instant $T_1$ by modifying reference signal information (e.g., configured by the BS 105) or a latest reference signal measurement based on the predicted interference eigenvalue.

In a further aspect, the UE 115 may determine an interference covariance matrix based on the latest interference measurement and determine an interference eigenvalue (e.g., a maximum interference eigenvalue) from the interference covariance matrix. The UE 115 may apply the interference predictor to the interference eigenvalue to generate a predicted interference eigenvalue for the future time instant $T_1$, for example, as discussed above in relation to FIG. 8. The UE 115 may include the predicted interference eigenvalue in the predicted CSI 1362. In some aspects, the UE 115 may further determine predicted CSI 1362 for the future time instant $T_1$ by modifying reference signal information (e.g., configured by the BS 105) or a latest reference signal measurement based on the predicted interference eigenvalue.

At time t1, the UE 115 transmits a CSI report 1360 including the predicted CSI 1362. The CSI report may include a predicted CQI, a predicted RI, a predicted interference eigenvalue, predicted precoding information (e.g., a predicted PMI), and/or predicted beam information for the future time instant $T_1$.

Figure 14:
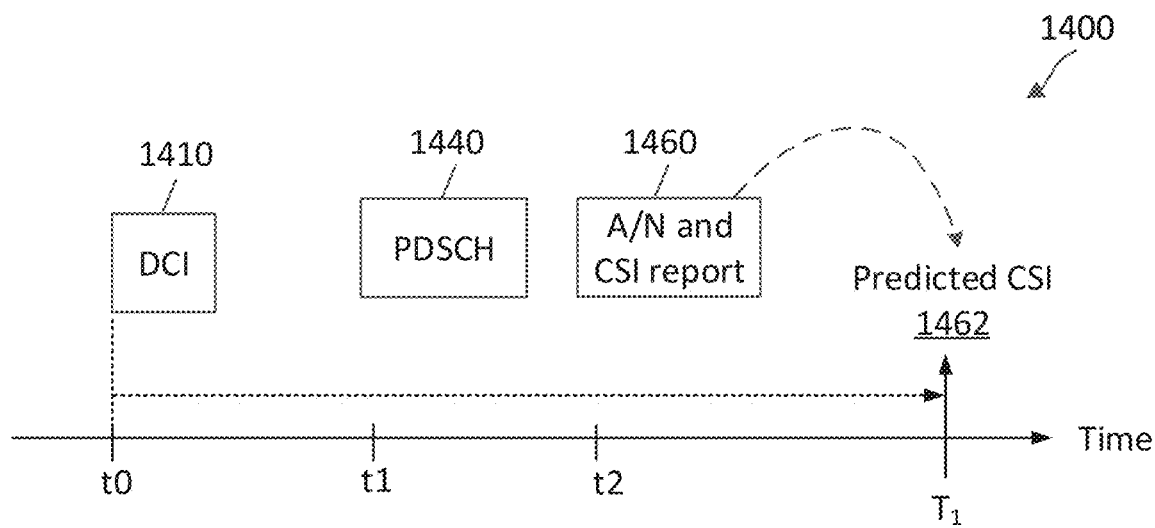
FIG. 14 is a timing diagram illustrating a channel state prediction and reporting scheme according to some aspects of the present disclosure.

FIG. 14 is a timing diagram illustrating a channel state prediction and reporting scheme 1400 according to some aspects of the present disclosure. The scheme 1400 may be employed by BSs such as the BSs 105 to configure UEs such as the UEs 115 in a network such as the network 100 for communication. In particular, the BS may request the UE to report predicted CSI as shown in the scheme 1400. In FIG. 14, the x-axis represents time in some arbitrary units. In the scheme 1400, the BS 105 may request the UE 115 to report predicted CSI along with a PDSCH schedule, but without providing an interference measurement resource or a reference signal resource for measurements.

As shown, at time t0, the BS 105 transmits DCI 1410, for example, via a PDCCH. The DCI 1410 may include a trigger for a CSI report (multiplexed in a UL control signal 1460). The trigger may request the UE 115 to provide predicted CSI at a future time instant $T_1$ relative to a reference time. Although FIG. 14 illustrates the BS 105 requesting a predicted CSI for one future time instant, it should be understood that in other examples the BS 105 may request for predicted CSI for any suitable number of future time instants (e.g., about 2, 3, 4, 5 or more). The DCI 1410 may also include a scheduling grant for a PDSCH communication signal 1440. In some aspects, the DCI 1410 may include an indication of the future time instant $T_1$. In some aspects, the future time instant $T_1$ may be relative to a reference time, for example, a reception time of the DCI 1410 as shown by the dotted arrow or a reception of the PDSCH communication signal 1440.

Upon receiving the DCI 1410, at time t1, the UE 115 may receive the PDSCH communication signal 1440 according to the scheduling grant. The UE 115 may decode data from the PDSCH communication signal 1440. The PDSCH communication signal 1440 may be associated with an HARQ process. If the decoding is successful, the UE 115 may generate a HARQ-ACK. If the decoding is unsuccessful, the UE 115 may generate a HARQ-NACK.

Additionally, the UE 115 may determine a predicted interference in response to the CSI report trigger. For instance, the UE 115 may determine the predicted interference based on a latest interference measurement (measured from an interference measurement resource similar to the interference measurement resource 330 or 420) and an interference predictor. In an aspect, the interference predictor may be trained or determined, for example, utilizing mechanisms in the method 300 and the scheme 320 as discussed above in relation to FIGS. 3A-3B. In some aspects, the UE 115 may apply the interference predictor to the latest interference measurement to generate a predicted interference for the future time instant $T_1$. The UE 115 may determine predicted CSI 1462 for the future time instant $T_1$ by modifying a latest reference signal measurement (e.g., determined from a DMRS in the PDSCH communication signal 1440) based on the predicted interference, for example, utilizing mechanisms in the method 500 as discussed above in relation to FIG. 5. The predicted CSI can include a predicted CQI, a predicted RI, predicted precoding information (e.g., a predicted PMI), and/or predicted beam information for the future time instant $T_1$.

In another aspect, the UE 115 may apply the interference predictor to the latest interference measurement to generate a predicted interference for the future time instant $T_1$ and determine a predicted interference covariance matrix from the predicted interference. The UE 115 may determine a channel matrix from a latest reference signal measurement (e.g., determined from a DMRS in the PDSCH communication signal 1440). The UE 115 may determine predicted CSI 1462 by modifying the channel matrix based on the predicted covariance matrix, for example, as discussed above in relation to FIG. 6. The predicted CSI can include a predicted CQI, a predicted RI, predicted precoding information (e.g., a predicted PMI), and/or predicted beam information for the future time instant $T_1$.

In yet another aspect, the UE 115 may apply the interference predictor to the latest interference measurement to generate a predicted interference for the future time instant $T_1$ and determine a predicted interference covariance matrix from the predicted interference. The UE 115 may determine a predicted interference eigenvalue (e.g., a maximum interference eigenvalue) from the predicted interference covariance matrix, for example, for example, as discussed above in relation to FIG. 7. The UE 115 may include the predicted interference eigenvalue in the predicted CSI 1462. In some aspects, the UE 115 may further determine predicted CSI 1462 for the future time instant $T_1$ by modifying a reference signal measurement (e.g., determined from a DMRS in the PDSCH communication signal 1440) or a latest reference signal measurement based on the predicted interference eigenvalue.

In a further aspect, the UE 115 may determine an interference covariance matrix based on the interference measurement and determine an interference eigenvalue (e.g., a maximum interference eigenvalue) from the interference covariance matrix. The UE 115 may apply the interference predictor to the interference eigenvalue to generate a predicted interference eigenvalue for the future time instant $T_1$, for example, as discussed above in relation to FIG. 8. The UE 115 may include the predicted interference eigenvalue in the predicted CSI 1462. In some aspects, the UE 115 may further determine predicted CSI 1462 for the future time instant $T_1$ by modifying a reference signal measurement (e.g., determined from a DMRS in the PDSCH communication signal 1440) or a latest reference signal measurement based on the predicted interference eigenvalue.

At time t2, the UE 115 transmits an UL control signal 1460 including a HARQ feedback including an HARQ-ACK or an HARQ-NACK (shown as A/N) and with a CSI report (e.g., via a PUCCH). The CSI report may include the predicted CSI 1462 including for the future time instant $T_1$. The predicted CSI may include a predicted CQI, a predicted RI, a predicted interference eigenvalue, predicted precoding information (e.g., a predicted PMI), and/or predicted beam information.

Figure 15:
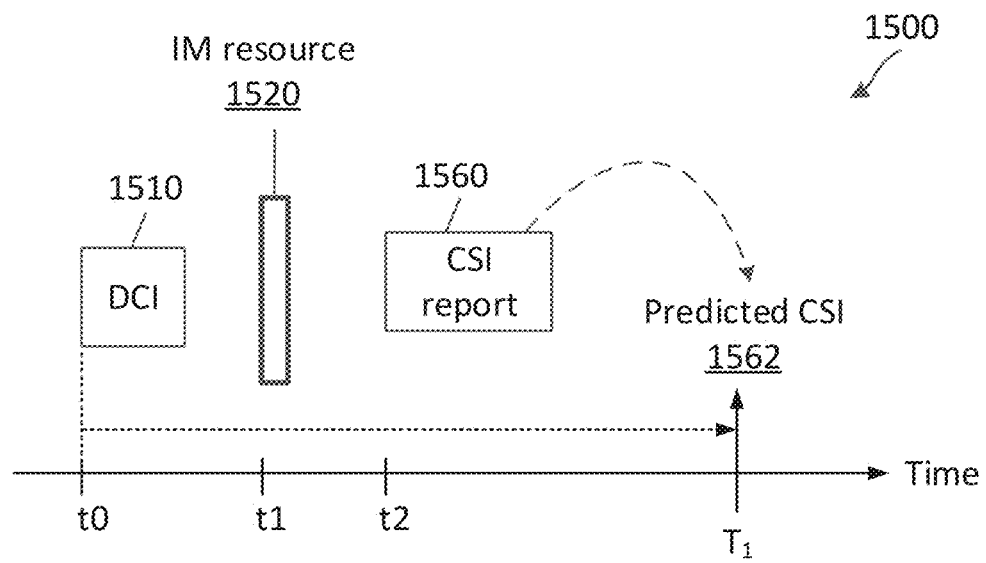
FIG. 15 is a timing diagram illustrating a channel state prediction and reporting scheme according to some aspects of the present disclosure.

FIG. 15 is a timing diagram illustrating a channel state prediction and reporting scheme 1500 according to some aspects of the present disclosure. The scheme 1500 may be employed by BSs such as the BSs 105 to configure UEs such as the UEs 115 in a network such as the network 100 for communication. In particular, the BS may request the UE to report predicted CSI as shown in the scheme 1500. In FIG. 15, the x-axis represents time in some arbitrary units. In the scheme 1500, the BS 105 may request the UE 115 to report predicted CSI and may provide the UE 115 with an interference measurement resource 1520 for an updated interference measurement, but without providing a reference signal resource for measurement.

As shown, at time t0, the BS 105 transmits DCI 1510, for example, via a PDCCH. The DCI 1510 may include a trigger for a CSI report 1560. The trigger may request the UE 115 to provide predicted CSI at a future time instant $T_1$ relative to a reference time. Although FIG. 15 illustrates the BS 105 requesting a predicted CSI for one future time instant, it should be understood that in other examples the BS 105 may request for predicted CSI for any suitable number of future time instants (e.g., about 2, 3, 4, 5 or more). The DCI 1510 may include an indication or activation for an interference measurement (IM) resource 1520 (e.g., the interference measurement resources 330 and/or 420). In some aspects, the interference measurement resource 1520 can be a CSI-IM resource. In some aspects, the interference measurement resource 1520 can be a Zp-CSI-RS or CSI-IM or combination thereof resource. In some aspects, the DCI 1510 may include an indication of the future time instant $T_1$. In some aspects, the future time instant $T_1$ may be relative to a reference time, for example, a reception time of the DCI 1510 as shown by the dotted arrow or a time location of the interference measurement resource 1520.

Upon receiving the DCI 1510, at time t1, the UE 115 may determine an interference measurement from the interference measurement resource 1520. For instance, the UE 115 may receive an interference signal from the interference measurement resource 1520 and determine an interference power from the received interference signal. The UE 115 may determine a predicted interference based on the interference measurement and an interference predictor. In an aspect, the interference predictor may be trained or determined, for example, utilizing mechanisms in the method 300 and the scheme 320 as discussed above in relation to FIGS. 3A-3B. In some aspects, the UE 115 may apply the interference predictor to the interference measurement to generate a predicted interference for the future time instant $T_1$. The UE 115 may determine predicted CSI 1562 for the future time instant $T_1$ by modifying a latest reference signal measurement (e.g., based on a latest CSI-RS or a latest PDSCH or DMRS received from the BS 105) based on the predicted interference, for example, utilizing mechanisms in the method 500 as discussed above in relation to FIG. 5. The predicted CSI can include a predicted CQI, a predicted RI, predicted precoding information (e.g., predicted PMI), and/or predicted beam information for the future time instant $T_1$.

In another aspect, the UE 115 may apply the interference predictor to the interference measurement to generate a predicted interference for the future time instant $T_1$ and determine a predicted interference covariance matrix from the predicted interference. The UE 115 may determine a channel matrix from a latest reference signal measurement (e.g., based on a latest CSI-RS or a latest PDSCH or DMRS received from the BS 105). The UE 115 may determine predicted CSI 1562 by modifying the channel matrix based on the predicted covariance matrix, for example, as discussed above in relation to FIG. 6. The predicted CSI can include a predicted CQI, a predicted RI, predicted precoding information (e.g., predicted PMI), and/or predicted beam information for the future time instant $T_1$.

In yet another aspect, the UE 115 may apply the interference predictor to the interference measurement to generate a predicted interference for the future time instant $T_1$ and determine a predicted interference covariance matrix from the predicted interference. The UE 115 may determine a predicted interference eigenvalue (e.g., a maximum interference eigenvalue) from the predicted interference covariance matrix, for example, for example, as discussed above in relation to FIG. 7. The UE 115 may include the predicted interference eigenvalue in the predicted CSI 1562. In some aspects, the UE 115 may further determine predicted CSI 1562 for the future time instant $T_1$ by modifying reference signal information (e.g., configured by the BS 105) or a latest reference signal measurement based on the predicted interference eigenvalue.

In a further aspect, the UE 115 may determine an interference covariance matrix based on the interference measurement and determine an interference eigenvalue (e.g., a maximum interference eigenvalue) from the interference covariance matrix. The UE 115 may apply the interference predictor to the interference eigenvalue to generate a predicted interference eigenvalue for the future time instant $T_1$, for example, as discussed above in relation to FIG. 8. The UE 115 may include the predicted interference eigenvalue in the predicted CSI 1562. In some aspects, the UE 115 may further determine predicted CSI 1562 for the future time instant $T_1$ by modifying reference signal information (e.g., configured by the BS 105) or a latest reference signal measurement based on the predicted interference eigenvalue.

At time t2, the UE 115 transmits a CSI report 1560 including the predicted CSI 1562. The CSI report may include a predicted CQI, a predicted RI, a predicted interference eigenvalue, predicted precoding information (e.g., predicted PMI), and/or predicted beam information for the future time instant $T_1$.

Figure 16:
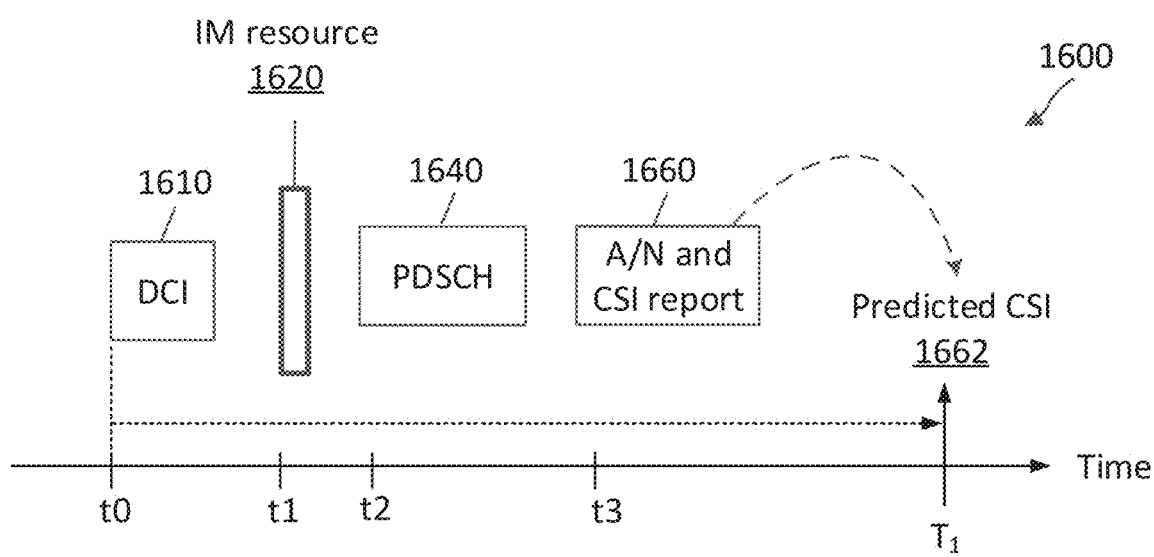
FIG. 16 is a timing diagram illustrating a channel state prediction and reporting scheme according to some aspects of the present disclosure.

FIG. 16 is a timing diagram illustrating a channel state prediction and reporting scheme 1600 according to some aspects of the present disclosure. The scheme 1600 may be employed by BSs such as the BSs 105 to configure UEs such as the UEs 115 in a network such as the network 100 for communication. In particular, the BS may request the UE to report predicted CSI as shown in the scheme 1600. In FIG.

16, the x-axis represents time in some arbitrary units. In the scheme 1600, the BS 105 may request the UE 115 to report predicted CSI along with a PDSCH schedule and may provide the UE 115 with an interference measurement resource 1620 for an updated interference measurement, but without providing a reference signal resource for measurement.

As shown, at time t0, the BS 105 transmits DCI 1610, for example, via a PDCCH. The DCI 1610 may include a trigger for a CSI report (multiplexed in a UL control signal 1660). The trigger may request the UE 115 to provide predicted CSI at a future time instant $T_1$ relative to a reference time. Although FIG. 16 illustrates the BS 105 requesting a predicted CSI for one future time instant, it should be understood that in other examples the BS 105 may request for predicted CSI for any suitable number of future time instants (e.g., about 2, 3, 4, 5 or more). The DCI 1610 may also include an indication or activation for an interference measurement (IM) resource 1620 (e.g., the interference measurement resources 330, 420, and/or 1520) and a scheduling grant for a PDSCH communication signal 1640. In some aspects, the interference measurement resource 1620 can be a CSI-IM resource. In some aspects, the interference measurement resource 1620 can be a Zp-CSI-RS or CSI-IM or combination thereof resource. In some aspects, the DCI 1610 may include an indication of the future time instant $T_1$. In some aspects, the future time instant $T_1$ may be relative to a reference time, for example, a reception time of the DCI 1610 as shown by the dotted arrow, a time location of the interference measurement resource 1620, or a reception time of the PDSCH communication signal 1640.

Upon receiving the DCI 1610, at time t1, the UE 115 may determine an interference measurement from the interference measurement resource 1620. For instance, the UE 115 may receive an interference signal from the interference measurement resource 1620 and determine an interference power from the received interference signal.

Additionally, at time t2, the UE 115 may receive the PDSCH communication signal 1640 according to the scheduling grant. The UE 115 may decode data from the PDSCH communication signal 1640. The PDSCH communication signal 1640 may be associated with an HARQ process. If the decoding is successful, the UE 115 may generate a HARQ-ACK. If the decoding is unsuccessful, the UE 115 may generate a HARQ-NACK.

Further, in response to the CSI report trigger, the UE 115 may generate predicted CSI based on the interference measurement determined from the interference measurement resource 1620, an interference predictor, and a reference signal measurement determined from a DMRS in the PDSCH communication signal 1640. In an aspect, the interference predictor may be trained or determined, for example, utilizing mechanisms in the method 300 and the scheme 320 as discussed above in relation to FIGS. 3A-3B. In some aspects, the UE 115 may apply the interference predictor to the interference measurement to generate a predicted interference for the future time instant $T_1$. The UE 115 may determine predicted CSI 1662 for the future time instant $T_1$ by modifying the reference signal measurement (e.g., determined from a DMRS in the PDSCH communication signal 1640) based on the predicted interference, for example, utilizing mechanisms in the method 500 as discussed above in relation to FIG. 5. The predicted CSI can include a predicted CQI, a predicted RI, predicted precoding information (e.g., predicted PMI), and/or predicted beam information for the future time instant $T_1$.

In another aspect, the UE 115 may apply the interference predictor to the interference measurement to generate a predicted interference for the future time instant $T_1$ and determine a predicted interference covariance matrix from the predicted interference. The UE 115 may determine a channel matrix from the reference signal. The UE 115 may determine predicted CSI 1662 by modifying the channel matrix based on the predicted covariance matrix, for example, as discussed above in relation to FIG. 6. The predicted CSI can include a predicted CQI, a predicted RI, predicted precoding information (e.g., predicted PMI), and/or predicted beam information for the future time instant $T_1$.

In yet another aspect, the UE 115 may apply the interference predictor to the interference measurement to generate a predicted interference for the future time instant $T_1$ and determine a predicted interference covariance matrix from the predicted interference. The UE 115 may determine a predicted interference eigenvalue (e.g., a maximum interference eigenvalue) from the predicted interference covariance matrix, for example, for example, as discussed above in relation to FIG. 7. The UE 115 may include the predicted interference eigenvalue in the predicted CSI 1662. In some aspects, the UE 115 may further determine predicted CSI 1662 for the future time instant $T_1$ by modifying the reference signal measurement or reference signal information configured by the BS 105 based on the predicted interference eigenvalue.

In a further aspect, the UE 115 may determine an interference covariance matrix based on the interference measurement and determine an interference eigenvalue (e.g., a maximum interference eigenvalue) from the interference covariance matrix. The UE 115 may apply the interference predictor to the interference eigenvalue to generate a predicted interference eigenvalue for the future time instant $T_1$, for example, as discussed above in relation to FIG. 8. The UE 115 may include the predicted interference eigenvalue in the predicted CSI 1662. In some aspects, the UE 115 may further determine predicted CSI 1662 for the future time instant $T_1$ by modifying the reference signal measurement or reference signal information configured by the BS 105 based on the predicted interference eigenvalue.

At time t2, the UE 115 transmits an UL control signal 1660 including a HARQ feedback including an HARQ-ACK or an HARQ-NACK (shown as A/N) and with a CSI report (e.g., via a PUCCH). The CSI report may include the predicted CSI 1662 including for the future time instant $T_1$. The predicted CSI may include a predicted CQI, a predicted RI, a predicted interference eigenvalue, predicted precoding information (e.g., predicted PMI), and/or predicted beam information.

Figure 17:
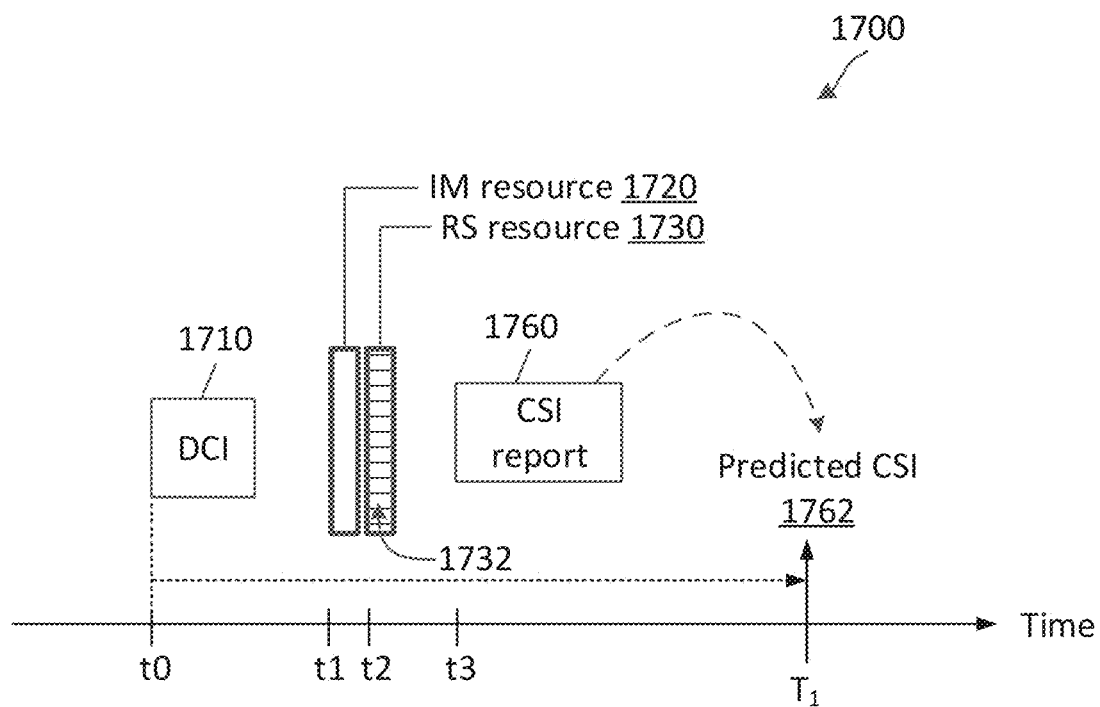
FIG. 17 is a timing diagram illustrating a channel state prediction and reporting scheme according to some aspects of the present disclosure.

FIG. 17 is a timing diagram illustrating a channel state prediction and reporting scheme 1700 according to some aspects of the present disclosure. The scheme 1700 may be employed by BSs such as the BSs 105 to configure UEs such as the UEs 115 in a network such as the network 100 for communication. In particular, the BS may request the UE to report predicted CSI as shown in the scheme 1700. In FIG. 17, the x-axis represents time in some arbitrary units. In the scheme 1700, the BS 105 may request the UE 115 to report predicted CSI and may provide the UE 115 with an interference measurement resource 1720 and a reference signal resource 1730 for measurements.

As shown, at time t0, the BS 105 transmits DCI 1710, for example, via a PDCCH. The DCI 1710 may include a trigger for a CSI report 1760. The trigger may request the UE 115 to provide predicted CSI at a future time instant $T_1$ relative to a reference time. Although FIG. 17 illustrates the BS 105 requesting a predicted CSI for one future time instant, it should be understood that in other examples the BS 105 may request for predicted CSI in any suitable number of future time instants (e.g., about 2, 3, 4, 5 or more). The DCI 1710 may include an indication or activation for an interference measurement (IM) resource 1720 (e.g., the interference measurement resources 330, 420, 1520, and/or 1620) and a reference signal resource 1730 (e.g., the reference signal resource 430). In some aspects, the interference measurement resource 1720 can be a CSI-IM resource. In some aspects, the interference measurement resource 1720 can be a Zp-CSI-RS or CSI-IM or combination thereof resource. In some aspects, the DCI 1710 may include an indication of the future time instant $T_1$. In some aspects, the future time instant $T_1$ may be relative to a reference time, for example, a reception time of the DCI 1710 as shown by the dotted arrow, a time location of the interference measurement resource 1720, or a time location of the reference signal resource 1730.

Upon receiving the DCI 1710, at time t1, the UE 115 may determine an interference measurement from the interference measurement resource 1720. For instance, the UE 115 may receive an interference signal from the interference measurement resource 1720 and determine an interference power from the received interference signal.

At time t2, the UE 115 may receive a reference signal 1732 (e.g., CSI-RS) from the reference signal resource 1730 and may determine a reference signal measurement (e.g., RSRP, RSRQ, SNR, SINR) from the received reference signal 1732.

The UE 115 may determine a predicted interference based on the interference measurement and an interference predictor. In an aspect, the interference predictor may be trained or determined, for example, utilizing mechanisms in the method 300 and the scheme 320 as discussed above in relation to FIGS. 3A-3B. In some aspects, the UE 115 may apply the interference predictor to the interference measurement to generate a predicted interference for the future time instant $T_1$. The UE 115 may determine predicted CSI 1762 for the future time instant $T_1$ by modifying the reference signal measurement based on the predicted interference, for example, utilizing mechanisms in the method 500 as discussed above in relation to FIG. 5. The predicted CSI can include a predicted CQI, a predicted RI, predicted precoding information (e.g., predicted PMI), and/or predicted beam information for the future time instant $T_1$.

In another aspect, the UE 115 may apply the interference predictor to the interference measurement to generate a predicted interference for the future time instant $T_1$ and determine a predicted interference covariance matrix from the predicted interference. The UE 115 may determine a channel matrix from the reference signal measurement. The UE 115 may determine predicted CSI 1762 by modifying the channel matrix based on the predicted covariance matrix, for example, as discussed above in relation to FIG. 6. The predicted CSI can include a predicted CQI, a predicted RI, predicted precoding information (e.g., predicted PMI), and/or predicted beam information for the future time instant $T_1$.

In yet another aspect, the UE 115 may apply the interference predictor to the interference measurement to generate a predicted interference for the future time instant $T_1$ and determine a predicted interference covariance matrix from the predicted interference. The UE 115 may determine a predicted interference eigenvalue (e.g., a maximum interference eigenvalue) from the predicted interference covariance matrix, for example, for example, as discussed above in relation to FIG. 7. The UE 115 may include the predicted interference eigenvalue in the predicted CSI 1762. In some aspects, the UE 115 may further determine predicted CSI 1762 for the future time instant $T_1$ by modifying reference signal information (e.g., configured by the BS 105) or the reference signal measurement based on the predicted interference eigenvalue.

In a further aspect, the UE 115 may determine an interference covariance matrix based on the interference measurement and determine an interference eigenvalue (e.g., a maximum interference eigenvalue) from the interference covariance matrix. The UE 115 may apply the interference predictor to the interference eigenvalue to generate a predicted interference eigenvalue for the future time instant $T_1$, for example, as discussed above in relation to FIG. 8. The UE 115 may include the predicted interference eigenvalue in the predicted CSI 1762. In some aspects, the UE 115 may further determine predicted CSI 1762 for the future time instant $T_1$ by modifying reference signal information (e.g., configured by the BS 105) or the reference signal measurement based on the predicted interference eigenvalue.

At time t3, the UE 115 transmits a CSI report 1760 including the predicted CSI 1762. The CSI report may include a predicted CQI, a predicted RI, a predicted interference eigenvalue, predicted precoding information (e.g., predicted PMI), and/or predicted beam information for the future time instant $T_1$.

In general, a BS 105 may trigger a UE 115 to report predicted CSI along with any combinations of an indication or activation of an interference measurement resource, an indication or activation of a reference signal resource, and a PDSCH scheduling grant as shown in the schemes 1300, 1400, 1500, 1600, or 1700 as discussed with respect to FIG. 13, 14, 15, 16, or 17, respectively. In some aspects, the BS 105 may trigger the UE 115 to report predicted CSI along with an indication or activation of an interference measurement resource, an indication or activation of a reference signal resource, and a PDSCH scheduling grant, for example, as discussed above in relation to FIG. 4.

Further, in some aspects, when a BS 105 requests a UE 115 for on-demand CSI reporting using the schemes 1300, 1400, 1500, 1600, 1700, the BS 105 may request for predicted CSI at one or more future time instants for one or more error metrics or BLERs. For instance, the BS 105 may configure the UE 115 with F number of sets of one or more future time instants (e.g., in the form of a list) via RRC signaling or MAC-CE signaling. Additionally, the BS 105 may configure the UE 115 with R number of error metrics or BLERs (e.g., in the form of a list) via RRC signaling or MAC-CE signaling. For the on-demand CSI reporting, the BS 105 may transmit DCI (e.g., the DCI 1310, 1410, 1510, 1610, 1710) to request the UE 115 to provide predicted CSI. The DCI may indicate a report trigger, an index referencing a certain future time instant set of the F future time instant sets, and an indication of one more error metrics of the R error metrics. In response to the on-demand CSI reporting, the UE 115 may report predicted CSI at time instant(s) of the requested certain future time instant set and for each requested error metric. As an example, the DCI may reference a future time instant set including time instants at $T_1$, $T_2$, $T_3$ and may indicate BLER X and BLER Y. Accordingly, the UE 115 may report $CSI(T_1)$, $CSI(T_2)$, $CSI(T_3)$ at time $T_1$, $T_2$, $T_3$ for BLER X and $CSI(T_1)$, $CSI(T_2)$, $CSI(T_3)$ at time $T_1$, $T_2$, $T_3$ for BLER Y.

In some aspects, a BS 105 may request and receive predicted CSI for a set of one or more future time instants (e.g., $T_1, T_2, \ldots, T_K$) from a UE 115 as shown in the schemes 1300, 1400, 1500, 1600, 1700 and may subsequently schedule the UE 115 for a PDSCH communication (e.g., the PDSCH communication 480) at a time (e.g., $T_x$) near the one or more future time instants or at one of the one or more time instants using the receive predicted CSI as discussed above in relation to FIG. 4 and FIG. 9.

Figure 18:
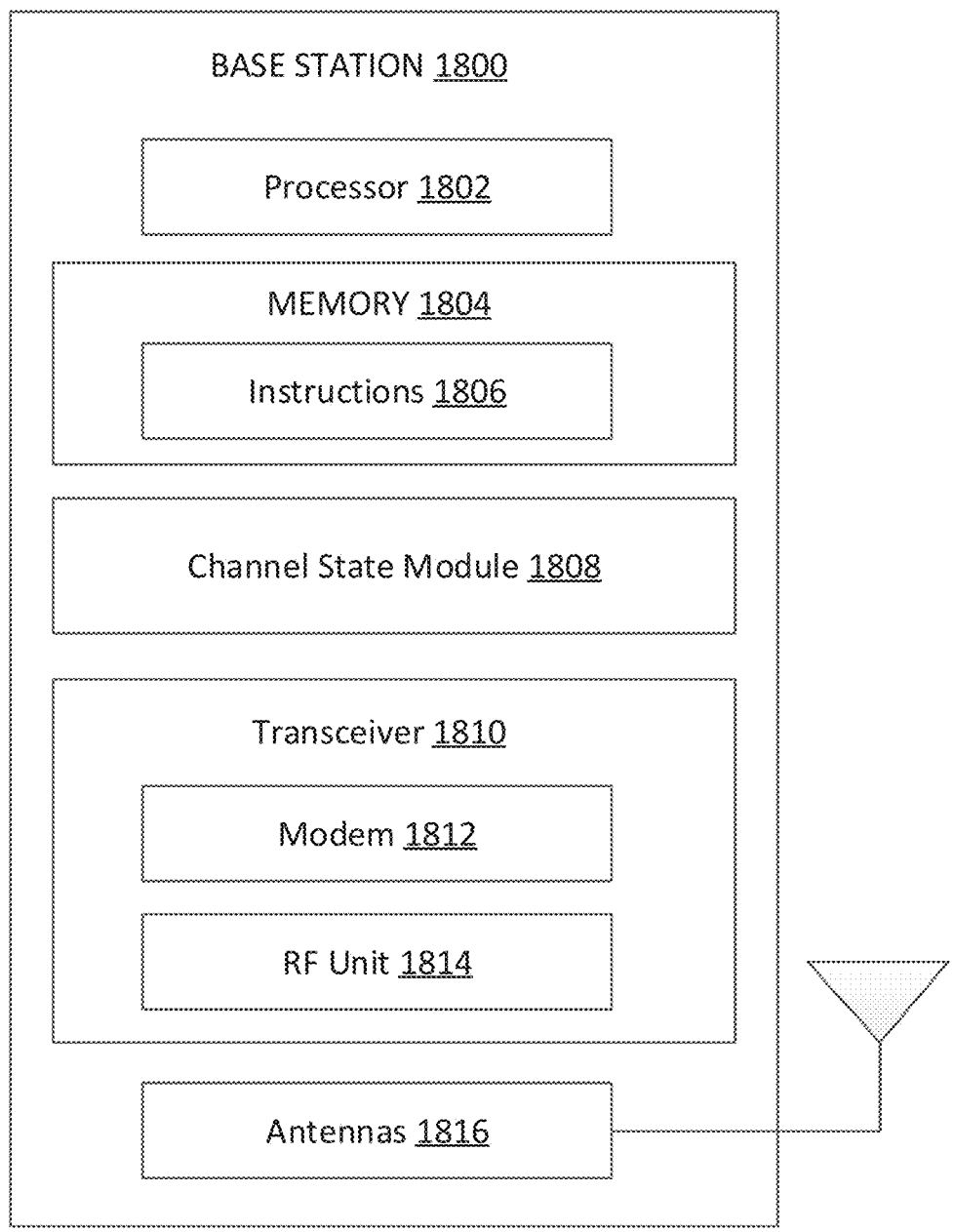
FIG. 18 is a block diagram of an exemplary base station (BS) according to some aspects of the present disclosure.

FIG. 18 is a block diagram of an exemplary BS 1800 according to some aspects of the present disclosure. The BS 1800 may be a BS 105 in the network 100 as discussed above in FIG. 1. As shown, the BS 1800 may include a processor 1802, a memory 1804, a channel state module 1808, a transceiver 1810 including a modem subsystem 1812 and an RF unit 1814, and one or more antennas 1816. These elements may be in direct or indirect communication with each other, for example via one or more buses.

The processor 1802 may have various features as a specific-type processor. For example, these may include a CPU, a DSP, an ASIC, a controller, a FPGA device, another hardware device, a firmware device, or any combination thereof configured to perform the operations described herein. The processor 1802 may also be implemented as a combination of computing devices, e.g., a combination of a DSP and a microprocessor, a plurality of microprocessors, one or more microprocessors in conjunction with a DSP core, or any other such configuration.

The memory 1804 may include a cache memory (e.g., a cache memory of the processor 1802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1804 may include a non-transitory computer-readable medium. The memory 1804 may store instructions 1806. The instructions 1806 may include instructions that, when executed by the processor 1802, cause the processor 1802 to perform operations described herein, for example, aspects of FIGS. 1-4 and 9-17. Instructions 1806 may also be referred to as code, which may be interpreted broadly to include any type of computer-readable statement(s) as discussed above.

The channel state module 1808 may be implemented via hardware, software, or combinations thereof. For example, the channel state module 1808 may be implemented as a processor, circuit, and/or instructions 1806 stored in the memory 1804 and executed by the processor 1802. In some instances, the channel state module 1808 can be integrated within the modem subsystem 1812. For example, the channel state module 1808 can be implemented by a combination of software components (e.g., executed by a DSP or a general processor) and hardware components (e.g., logic gates and circuitry) within the modem subsystem 1812.

The channel state module 1808 may communicate with various components of the BS 1800 to perform various aspects of the present disclosure, for example, aspects of FIGS. 1-4 and 9-17. For instance, the channel state module 1808 is configured to transmit, to a UE (e.g., a UE 115 or 1900), a configuration indicating a set of interference measurement resources spaced apart in time. The set of interference measurement resources (e.g., the interference measurement resources 330) is associated with an interference prediction. The channel state module 1808 is further configured to transmitting, to the UE, a request for one or more predicted channel state information (CSI) values at one or more future time instants. The channel state module 1808 is further configured to receive, from the UE, a report including the one or more predicted CSI values for the one or more future time instants. In some aspects, the one or more predicted CSI values may include a predicted CQI, a predicted RI, a predicted PMI, and/or a predicted beam information. In some aspects, the one or more predicted CSI values may be associated with wideband CSI. In some aspects, the one or more predicted CSI values may include predicted CSI for each subband within a frequency band. In some aspects, the one or more predicted CSI values may include predicted CSI for each RB within a frequency band. In some aspects, the one or more predicted CSI values may include predicted CSI for each RB group within a frequency band.

In some aspects, as part of transmitting the request for the one or more predicted CSI values, the channel state module 1808 is further configured to transmit DCI to the UE, where the DCI may include a trigger for the report. In some aspects, the DCI may further include at least one of an indication or activation of an interference measurement resource, an indication or activation of a reference signal resource, or a PDSCH scheduling grant, for example, as discussed above in relation to FIGS. 4 and 13-17. In some aspects, the DCI may further include an indication of the one or more future time instants. In some aspects, the channel state module 1808 is further configured to configure the UE with an interference eigenvalue quantization table, one or more error metrics (e.g., target BLERs) associated with the one or more future time instants, a table including multiple sets of one or more future time instants, and/or reference receive signal information for the UE to determine CQI from predicted interference eigenvalues.

In some aspects, the channel state module 1808 is further configured to determine scheduling parameters (e.g., MCS, transmission rank, precoding parameters, and/or beam information) for schedule the UE for a DL communication based on the one or more predicted CSI values in the report. In some aspects, the one or more predicted CSI values may include a predicted interference eigenvalue, and the channel state module 1808 is further configured to determine the scheduling parameters as discussed above in relation to FIGS. 9-12.

As shown, the transceiver 1810 may include the modem subsystem 1812 and the RF unit 1814. The transceiver 1810 can be configured to communicate bi-directionally with other devices, such as the UEs 115 and/or another core network element. The modem subsystem 1812 may be configured to modulate and/or encode data according to a MCS, e.g., a LDPC coding scheme, a turbo coding scheme, a convolutional coding scheme, a polar coding scheme, a digital beamforming scheme, etc. The RF unit 1814 may be configured to process (e.g., perform analog to digital conversion or digital to analog conversion, etc.) modulated/encoded data (e.g., PDCCH, PDSCH, URLLC data, RRC configuration, MAC-CE, predicted CSI reporting trigger, interference eigenvalue quantization table, reference receive signal information, indication of one or more future time instants, error metrics, multiple sets of one or more time instants, interference measurement resource configuration, reference signal resource configuration) from the modem subsystem 1812 (on outbound transmissions) or of transmissions originating from another source such as a UE 115. The RF unit 1814 may be further configured to perform analog beamforming in conjunction with the digital beamforming. Although shown as integrated together in transceiver 1810, the modem subsystem 1812 and/or the RF unit 1814 may be separate devices that are coupled together at the BS 105 to enable the BS 105 to communicate with other devices.

The RF unit 1814 may provide the modulated and/or processed data, e.g. data packets (or, more generally, data messages that may contain one or more data packets and other information), to the antennas 1816 for transmission to one or more other devices. The antennas 1816 may further receive data messages transmitted from other devices and provide the received data messages for processing and/or demodulation at the transceiver 1810. The transceiver 1810 may provide the demodulated and decoded data (e.g., PUCCH, PUSCH, HARQ ACK-NACK, predicted CSI report, predicted CQI, predicted RI, predicted PMI, predicted beam information) to the channel state module 1808 for processing. The antennas 1816 may include multiple antennas of similar or different designs in order to sustain multiple transmission links.

In an aspect, the BS 1800 can include multiple transceivers 1810 implementing different RATs (e.g., NR and LTE). In an aspect, the BS 1800 can include a single transceiver 1810 implementing multiple RATs (e.g., NR and LTE). In an aspect, the transceiver 1810 can include various components, where different combinations of components can implement different RATs.

Figure 19:
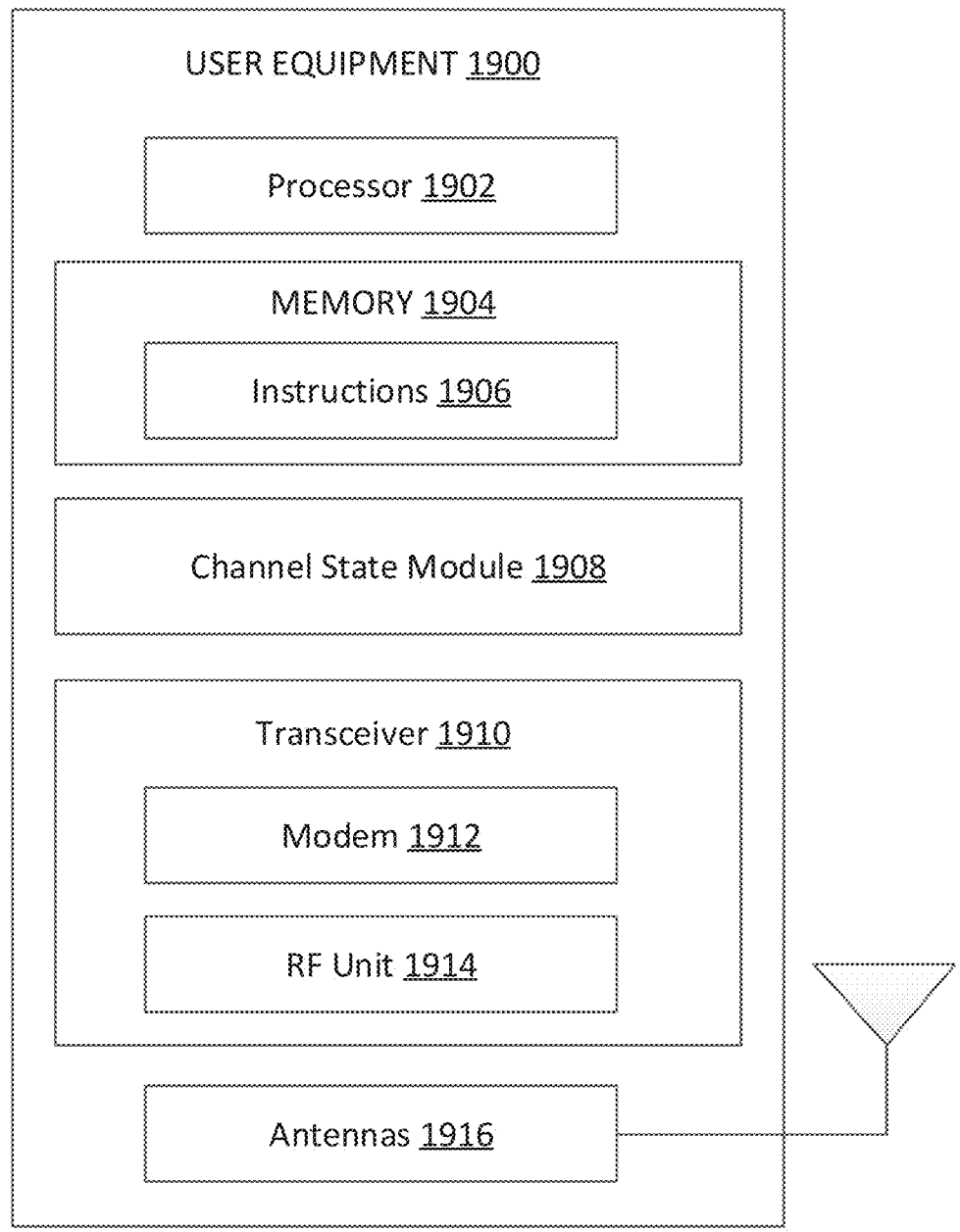
FIG. 19 is a block diagram of an exemplary user equipment (UE) according to some aspects of the present disclosure.

FIG. 19 is a block diagram of an exemplary UE 1900 according to some aspects of the present disclosure. The UE 1900 may be a UE 115 discussed above in FIG. 1. As shown, the UE 1900 may include a processor 1902, a memory 1904, a channel state module 1908, a transceiver 1910 including a modem subsystem 1912 and a radio frequency (RF) unit 1914, and one or more antennas 1916. These elements may be in direct or indirect communication with each other, for example via one or more buses.

The processor 1902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1902 may also be implemented as a combination of computing devices, e.g., a combination of a DSP and a microprocessor, a plurality of microprocessors, one or more microprocessors in conjunction with a DSP core, or any other such configuration.

The memory 1904 may include a cache memory (e.g., a cache memory of the processor 1902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1904 includes a non-transitory computer-readable medium. The memory 1904 may store, or have recorded thereon, instructions 1906. The instructions 1906 may include instructions that, when executed by the processor 1902, cause the processor 1902 to perform the operations described herein with reference to the UEs 115 in connection with aspects of the present disclosure, for example, aspects of FIGS. 1-8 and 13-17. Instructions 1906 may also be referred to as program code. The program code may be for causing a wireless communication device to perform these operations, for example by causing one or more processors (such as processor 1902) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel state module 1908 may be implemented via hardware, software, or combinations thereof. For example, the channel state module 1908 may be implemented as a processor, circuit, and/or instructions 1906 stored in the memory 1904 and executed by the processor 1902. In some instances, the channel state module 1908 can be integrated within the modem subsystem 1912. For example, the channel state module 1908 can be implemented by a combination of software components (e.g., executed by a DSP or a general processor) and hardware components (e.g., logic gates and circuitry) within the modem subsystem 1912.

The channel state module 1908 may communicate with various components of the UE 1900 to perform various aspects of the present disclosure, for example, aspects of FIGS. 1-8 and 13-17. For instance, the channel state module 1908 is configured to obtain a sequence of interference measurements, where each interference measurement in the sequence is obtained at a different measurement time instant. The channel state module 1908 is further configured to determine, based on an interference predictor associated with the sequence of interference measurements, one or more predicted channel state information (CSI) values at one or more future time instants. The channel state module 1908 is further configured to transmit, to a base station (BS), a report including the one or more predicted CSI values. In some aspects, the one or more predicted CSI values may include a predicted CQI, a predicted RI, a predicted PMI, and/or a predicted beam information. In some aspects, the one or more predicted CSI values may be associated with wideband CSI. In some aspects, the one or more predicted CSI values may include predicted CSI for each subband within a frequency band. In some aspects, the one or more predicted CSI values may include predicted CSI for each RB within a frequency band. In some aspects, the one or more predicted CSI values may include predicted CSI for each RB group within a frequency band.

In some aspects, the channel state module 1908 is further configured to receive a configuration indicating a set of interference measurement resources (e.g., the interference measurement resources 330), where the channel state module 1908 may be further configured to determine the sequence of interference measurements based at least in part on some of the set of interference measurement resources. In some aspects, the channel state module 1908 is further configured to determine the interference predictor based on the sequence of interference measurements, for example, as discussed above in relation to FIGS. 3A-3B.

In some aspects, the channel state module 1908 is further configured to determine the one or more predicted CSI values, as discussed above in relation to FIGS. 4-8. In some aspects, the channel state module 1908 is further configured to receive DCI including a report trigger from the BS and transmit the report in response to the report trigger in DCI. In some aspects, the DCI may further include at least one of an indication or activation of an interference measurement resource, an indication or activation of a reference signal resource, or a PDSCH scheduling grant, for example, as discussed above in relation to FIGS. 4 and 13-17. In some aspects, the DCI may further include an indication of the one or more future time instants. In some aspects, the channel state module 1908 is further configured to receive a configuration including an interference eigenvalue quantization table, one or more error metrics (e.g., target BLERs) associated with the one or more future time instants, a table including multiple sets of one or more future time instants, and/or reference receive signal information for determining CQI from predicted interference eigenvalues.

As shown, the transceiver 1910 may include the modem subsystem 1912 and the RF unit 1914. The transceiver 1910 can be configured to communicate bi-directionally with other devices, such as the BSs 105. The modem subsystem 1912 may be configured to modulate and/or encode the data from the memory 1904 and/or the channel state module 1908 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 1914 may be configured to process (e.g., perform analog to digital conversion or digital to analog conversion, etc.) modulated/encoded data (e.g., PUCCH, PUSCH, HARQ ACK-NACK, predicted CSI report, predicted CQI, predicted RI, predicted PMI, predicted beam information) from the modem subsystem 1912 (on outbound transmissions) or of transmissions originating from another source such as a UE 115 or a BS 105. The RF unit 1914 may be further configured to perform analog beamforming in conjunction with the digital beamforming. Although shown as integrated together in transceiver 1910, the modem subsystem 1912 and the RF unit 1914 may be separate devices that are coupled together at the UE 115 to enable the UE 115 to communicate with other devices.

The RF unit 1914 may provide the modulated and/or processed data, e.g. data packets (or, more generally, data messages that may contain one or more data packets and other information), to the antennas 1916 for transmission to one or more other devices. The antennas 1916 may further receive data messages transmitted from other devices. The antennas 1916 may provide the received data messages for processing and/or demodulation at the transceiver 1910. The transceiver 1910 may provide the demodulated and decoded data (e.g., PDCCH, PDSCH, URLLC data, RRC configuration, MAC-CE, predicted CSI reporting trigger, interference eigenvalue quantization table, reference receive signal information, indication of one or more future time instants, error metrics, multiple sets of one or more time instants, interference measurement resource configuration, reference signal resource configuration) to the channel state module 1908 for processing. The antennas 1916 may include multiple antennas of similar or different designs in order to sustain multiple transmission links. The RF unit 1914 may configure the antennas 1916.

In an aspect, the UE 1900 can include multiple transceivers 1910 implementing different RATs (e.g., NR and LTE). In an aspect, the UE 1900 can include a single transceiver 1910 implementing multiple RATs (e.g., NR and LTE). In an aspect, the transceiver 1910 can include various components, where different combinations of components can implement different RATs.

Figure 20:
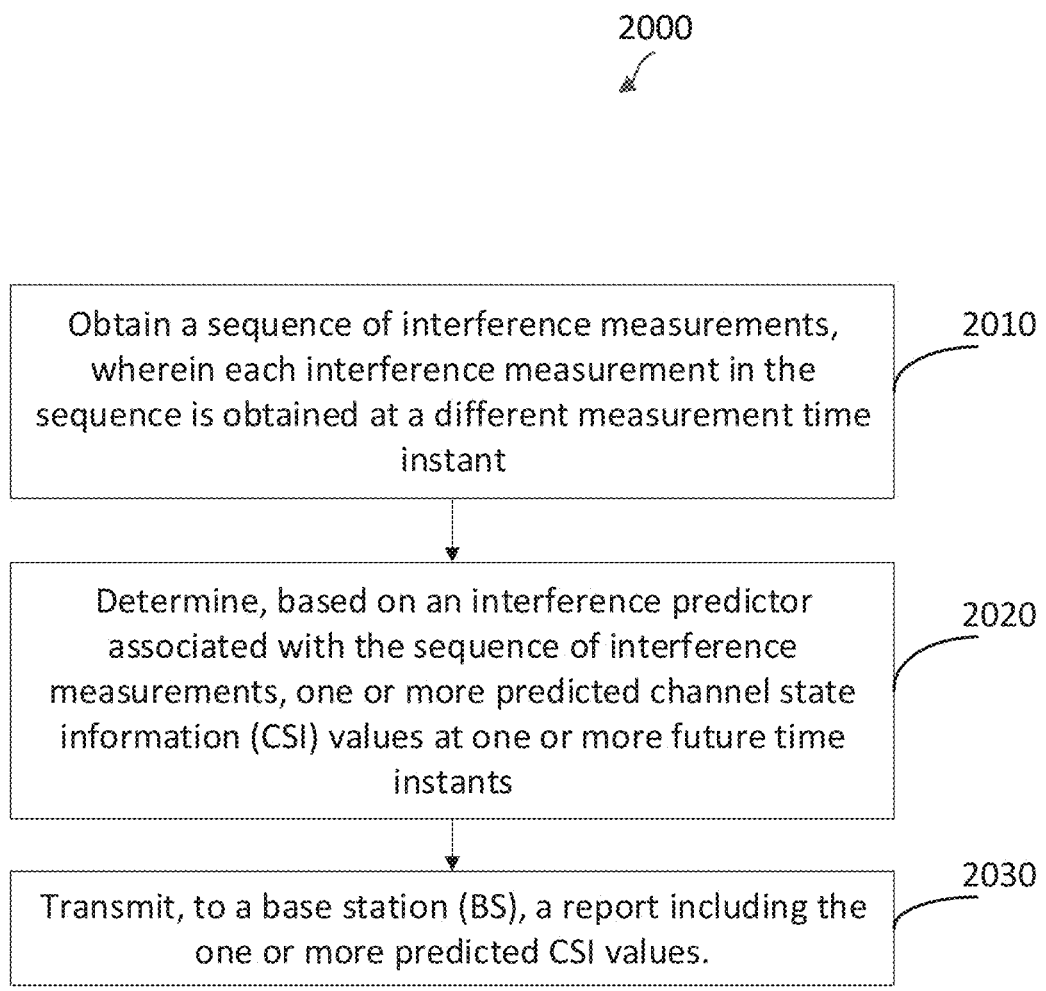
FIG. 20 is a flow diagram of a communication method according to some aspects of the present disclosure.

FIG. 20 is a flow diagram of a communication method 2000 according to some aspects of the present disclosure. Aspects of the method 1000 can be executed by a UE, such as the UEs 115 and/or 1900. A UE may comprise a processor, processing circuit, and/or any other suitable component or means for performing the steps. For example, a UE 1900 may utilize one or more components, such as the processor 1902, the memory 1904, the channel state module 1908, the transceiver 1910, the modem 1912, and the one or more antennas 1916, to execute the steps of method 2000. The method 2000 may employ similar mechanisms as discussed above with respect to FIGS. 1-8 and 12-17. The method 2000 may be employed as part of CSI prediction and reporting process as discussed herein. Further, the method 2000 may be used to improve the performance of URLLC between a BS and a UE. As illustrated, the method 2000 includes a number of enumerated steps, but aspects of the method 2000 may include additional steps before, after, and in between the enumerated steps. In some aspects, one or more of the enumerated steps may be omitted or performed in a different order.

At block 2010, a UE (e.g., the UE 115 or 1900) obtains a sequence of interference measurements. Each interference measurement in the sequence is obtained at a different measurement time instant. In some aspects, the UE may receive may obtain the sequence interference measurements based at least part on a set of interference measurement resources. In this regard, the UE may receive a configuration indicating the set of interference measurement resource from a BS (e.g., the BSs 105 or 1800). The set of interference measurement resources may be spaced apart from each other by a same amount of time, for example, as discussed above in relation to FIG. 3B. In some aspects, the set of interference measurement resources may include CSI-IM resources. In some aspects, the set of interference measurement resources may include Zp-CSI-RS or CSI-IM or combination thereof resources. In some aspects, the UE may determine each interference measurement in the sequence from one interference measurement resource of the set of interference measurement resources.

At block 2020, the UE determines, based on an interference predictor associated with the sequence of interference measurements, one or more predicted channel state information (CSI) values at one or more future time instants.

In some aspects, as part of determining the one or more predicted CSI values, the UE may determine a first predicted interference at a first future time instant of the one or more future time instants based on the interference predictor. In some aspects, the UE may further determine the first predicted interference based on a first interference measurement. In some aspects, the UE may receive a configuration indicating an interference measurement resource from the BS and may determine the first interference measurement from the interference measurement resource. In some aspects, the UE may further receive a downlink communication signal from the BS and may determine a first predicted CSI value of the one or more predicted CSI values based on the downlink communication signal and the first predicted interference. In some aspects, the downlink communication signal may include a CSI-RS. In some aspects, the downlink communication signal may include a PDSCH communication signal, and the UE may determine the first predicted CSI value based on a DMRS within the PDSCH communication signal.

In some aspects, the UE may determine the first predicted CSI value using mechanisms similar to the method 500 discussed above in relation to FIG. 5. For instance, as part determining the first predicted interference, the UE may apply the interference predictor to the first interference measurement. The UE may further determine an SINR from the downlink communication signal. The UE may further determine a first signal-to-interference-plus-noise ratio (SINR) based on the downlink communication signal. The UE may further modify the first SINR based on the first predicted interference to generate a first predicted SINR for the first future time instant. The UE may further determine the first predicted CSI value based on the first predicted SINR.

In some aspects, the UE may determine the first predicted CSI value using mechanisms similar to the method 600 discussed above in relation to FIG. 6. For instance, as part determining the first predicted interference, the UE may apply the interference predictor to the first interference measurement. As part of determining the first predicted CSI value, the UE may determine the first predicted CSI value based on a first channel matrix associated with the downlink communication signal and a covariance matrix associated with the first predicted interference. In some aspects, as part of determining the first predicted CSI value, the UE may further determine a second channel matrix based on the received downlink communication signal and determine the first channel matrix based a channel predictor and the second channel matrix.

In some aspects, the first predicted CSI value may include a predicted CQI (e.g., associated with a low code-rate CQI lookup table among multiple CQI lookup tables). In some aspects, the one or more predicted CSI values may include a predicted RI. In some aspects, the first predicted CSI value may include a predicted PMI. In some aspects, the first predicted CSI value may include predicted beam information. In some aspects, the first predicted CSI value may include predicted wideband CSI associated with a wide frequency band. In some aspects, the one or more predicted CSI values may include predicted CSI for each subband within a frequency band. In some aspects, the one or more predicted CSI values may include predicted CSI for each RB within a frequency band. In some aspects, the one or more predicted CSI values may include predicted CSI for each RB group within a frequency band.

In some aspects, the UE may determine the first predicted CSI value using mechanisms similar to the method 700 discussed above in relation to FIG. 7. For instance, as part of determining the first predicted interference, the UE may apply the interference predictor to the first interference measurement to generate the predicted interference at the first future time instant, determine a covariance matrix based on the first predicted interference, and determine a first interference eigenvalue for the first future time instant based on the covariance matrix.

In some aspects, the UE may determine the first predicted CSI value using mechanisms similar to the method 800 discussed above in relation to FIG. 8. For instance, as part of determining the first predicted interference, the UE may determine a covariance matrix based at least in part on the first interference measurement, determine an interference eigenvalue from the covariance matrix, and applying the interference predictor to the interference eigenvalue to generate the first predicted interference eigenvalue for the first future time instant.

At block 2030, the UE transmits, to a base station (BS), a report including the one or more predicted CSI values.

In some aspects, the UE may further determine the interference predictor based on at least in part on an autocorrelation between a first interference measurement and a second interference measurement of the sequence of interference measurements.

In some aspects, a first interference measurement of the sequence of interference measurements obtained at block 2010 may include a first measurement associated with a first receive antenna of the UE at a first time instant and a second measurement associated with a second receive antenna of the UE at the first time instant. Further, a second interference measurement of the sequence of interference measurements obtained at block 2010 may include a third measurement associated with the first receive antenna at a second time instant and a fourth measurement associated with the second receive antenna at the second time instant. The UE may further determine the interference predictor based at least in part on at least one of an autocorrelation between the first measurement and the third measurement, an autocorrelation between the second measurement and the fourth measurement, a cross-correlation between the first measurement and the fourth measurement, or a cross-correlation between the second measurement and the third measurement.

In some aspects, the UE may further determine the interference predictor including a set of one or more prediction filter coefficients based on the sequence of interference measurements obtained at block 2010. In some aspects, the UE may further determine the interference predictor comprising a bias value based on the sequence of interference measurements obtained at block 2010.

In some aspects, the one or more predicted CSI values may include a first predicted interference eigenvalue, and the report transmitted at block 2030 may include an indication of the first predicted interference eigenvalue. In some aspects, the UE may transmit the report at block 2030 further based on an interference eigenvalue quantization table. In some aspects, the UE may further receive a configuration indicating the interference eigenvalue quantization table from the BS. In some aspects, the UE may receive the configuration from the BS via RRC signaling. In some aspects, the UE may receive the configuration from the BS via MAC-CE signaling. In some aspects, the UE may further determine a predicted CQI based on the first predicted interference eigenvalue and reference receive signal information and include the predicted CQI in the report. In some aspects, the reference receive signal information may include a reference receive signal power. In some aspects, the reference receive signal information may include a reference signal-to-noise ratio (SNR). In some aspects, the UE may further receive a configuration indicating the reference receive signal information from the BS. In some aspects, the UE may receive the configuration from the BS via RRC signaling. In some aspects, the UE may receive the configuration from the BS via MAC-CE signaling.

In some aspects, as part of transmitting the report at block 2030, the UE may transmit, to the BS, the report including the one or more predicted CSI values, the one or more predicted CSI values including at least one of a predicted channel quality indicator (CQI) value, a predicted rank indicator (RI) value, or a predicted interference eigenvalue at a first future time instant of the one or more future time instants.

In some aspects, as part of transmitting the report at block 2030, the UE may transmit, to the BS, the report including a first predicted CSI value of the one or more predicted CSI values for a first future time instant of the one or more future time instants and a second predicted CSI value of the one or more predicted CSI values for a second future time instant of the one or more future time instants, the second future time instant being different from the first future time instant.

In some aspects, as part of transmitting the report at block 2030, the UE may transmit, to the BS, the report including the one or more predicted CSI values associated with wideband CSI.

In some aspects, as part of transmitting the report at block 2030, the UE may transmit, to the BS, the report including a first predicted CSI value of the one or more predicted CSI values for a first future time instant of the one or more future time instants and a second predicted CSI value of the one or more predicted CSI values for the first future time instant, the first predicted CSI value associated with a first frequency subband and the second predicted CSI value associated with a second frequency subband different from the first frequency subband.

In some aspects, the UE may further receive, from the BS, an indication of the one or more future time instants for reporting the one or more predicted CSI values, for example, via RRC signaling or MAC-CE signaling.

In some aspects, the UE may further receive, from the BS, DCI including a trigger for the report. In some aspects, the DCI may further include an indication of the one or more future time instants for reporting the one or more predicted CSI values. In some aspects, the DCI may further include an index referencing a first set of one or more future time instants of multiple sets of one or more future time instants, the first set of one or more future time instants corresponding to the one or more future time instants. In some aspects, the UE may further receive, from the BS, a configuration indicating the multiple sets of one or more future time instants. In some aspects, the DCI may exclude a scheduling grant for a physical downlink shared channel (PDSCH) communication signal. In some aspects, the DCI may further a scheduling grant for a physical downlink shared channel (PDSCH) communication signal. In some aspects, the one or more future time instants are with respect to a reception time of the DCI.

In some aspects, the DCI may further include an indication of an interference measurement resource and a reference signal resource. As part of determining the one or more predicted CSI values at block 2020, the UE may determine a signal-to-noise ratio (SNR) based on the reference signal resource, determine a first interference measurement based on the interference measurement resource, determine, based on the interference predictor and the first interference measurement, a predicted interference for a first future time instant of the one or more future time instants, modifying, based on the predicted interference, the SNR to generate a predicted signal-to-interference-plus-noise ratio (SINR) for the first future time instant, and determine a first predicted CSI value of the one or more predicted CSI values for the first future time instant based on the predicted SINR. In some aspects, the one or more future time instants are with respect to a time location of the interference measurement resource. In some aspects, the one or more future time instants are with respect to a time location of the reference signal resource.

In some other aspects, the DCI may exclude an indication of an interference measurement resource and a reference signal resource. As part of determining the one or more predicted CSI values at block 2020, the UE may determine, based on the interference predictor and at least one of a previous interference measurement or a previous interference eigenvalue, a predicted interference for a first future time instant of the one or more future time instants, modify, based on the predicted interference, at least one of a previous channel quality indicator (CQI) value or a previous signal-to-interference-plus-noise ratio (SINR) to generate a first predicted CSI value of the one or more predicted CSI values for the first future time instant. In some aspects, the DCI may further include a scheduling grant for a physical downlink shared channel (PDSCH) communication signal and the UE may further receive, from the BS, the PDSCH communication signal. As part of determining the one or more predicted CSI values at block 2020, the UE may further determine, based on the interference predictor and at least one of a previous interference measurement or a previous interference eigenvalue, a predicted interference for a first future time instant of the one or more future time instants, determine, based on the PDSCH communication signal, at least one of a channel quality indicator (CQI) value or a signal-to-interference-plus-noise ratio (SINR), modify, based on the predicted interference, the at least one of the CQI value or the SINR to generate a first predicted CSI value of the one or more predicted CSI values for the first future time instant.

In some other aspects, the DCI may further include an indication of an interference measurement resource and excluding an indication of a reference signal resource. As part of determining the one or more predicted CSI values at block 2020, the UE may determine a first interference measurement based on the interference measurement resource, determine, based on the interference predictor and the first interference measurement, a predicted interference for a first future time instant of the one or more future time instants, and modify, based on the predicted interference, at least one of a previous channel quality indicator (CQI) value or a previous signal-to-interference-plus-noise ratio (SINR) to generate a first predicted CSI value of the one or more predicted CSI values for the first future time instant.

In some aspects, as part of determining the one or more predicted CSI values at block 2020, the UE may determine the one or more predicted CSI values further based on one or more error metrics associated with the one or more future time instants. In some aspects, the UE may further receive, from the BS, a configuration indicating the one or more error metrics, for example, via RRC signaling or MAC-CE signaling. In some aspects, the configuration may indicate a first error metric and a second error metric of the one or more error metrics, the first error metric being associated with a first future time instant of the one or more future time instants, the second error metric being associated with a second future time instant of the one or more future time instants, the first error metric being different from the second error metric, and the first future time instant being different from the second future time instant.

Figure 21:
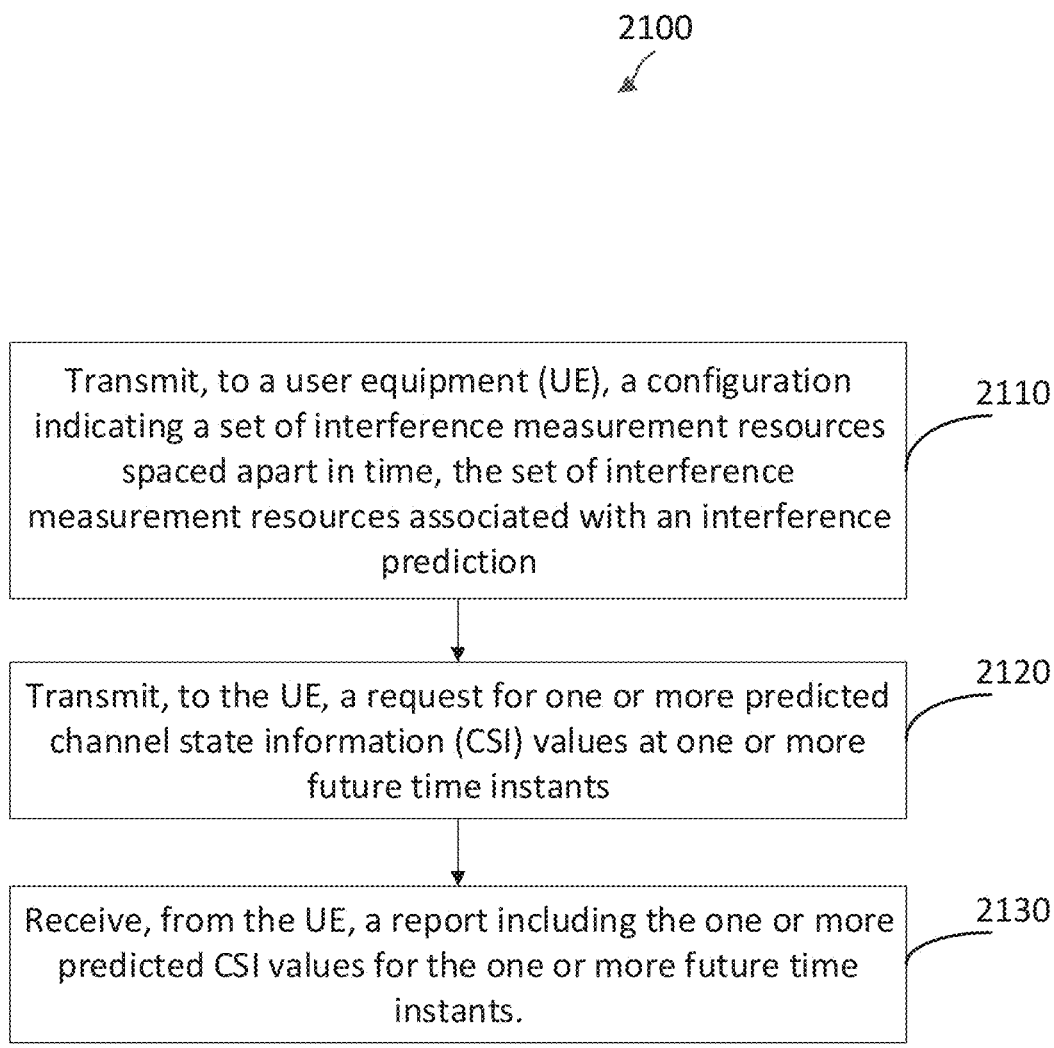
FIG. 21 is a flow diagram of a communication method according to some aspects of the present disclosure.

FIG. 21 is a flow diagram of a communication method 2100 according to some aspects of the present disclosure. Aspects of the method 2100 can be executed by a BS, such as the BSs 105 and/or 1800. A BS may comprise a processor, processing circuit, and/or any other suitable component or means for performing the steps. For example, a BS 1800 may utilize one or more components, such as the processor 1802, the memory 1804, the channel state module 1808, the transceiver 1810, the modem 1812, and the one or more antennas 1816, to execute the steps of method 2100. The method 2100 may employ similar mechanisms as discussed above with respect to FIGS. 1-4 and 9-17. The method 2100 may be employed as part of CSI prediction and reporting process as discussed herein. Further, the method 2100 may be used to improve the performance of URLLC between a BS and a UE. As illustrated, the method 2100 includes a number of enumerated steps, but aspects of the method 2100 may include additional steps before, after, and in between the enumerated steps. In some aspects, one or more of the enumerated steps may be omitted or performed in a different order.

At block 2110, a BS (e.g., a BS 105 and/or 1800) transmits, to a UE (e.g., a UE 115 and/or 1900), a configuration indicating a set of interference measurement resources spaced apart in time. The set of interference measurement resources is associated with an interference prediction. In some aspects, the set of interference measurement resources may be spaced apart from each other by a same amount of time. In some aspects, the set of interference measurement resources may include CSI-IM resource. In some aspects, the set of interference measurement resources may include Zp-CSI-RS or CSI-IM or combination thereof resource.

At block 2120, the BS transmits, to the UE, a request for one or more predicted channel state information (CSI) values at one or more future time instants.

At block 2130, the BS receives, from the UE, a report including the one or more predicted CSI values for the one or more future time instants.

In some aspects, the BS may further transmit, to the UE, a scheduling grant for a downlink communication signal, the scheduling grant including a transmission parameter, the transmission parameter being based on at least a first predicted CSI value of the one or more predicted CSI values. The BS may further transmit, to the UE based on the transmission parameter, the downlink communication signal.

In some aspects, the first predicted CSI value may include a predicted CQI value, and the BS may further determine, based at least in part on the predicted CQI value, the transmission parameter including at least a modulation coding scheme (MCS).

In some aspects, the first predicted CSI value may include a predicted interference eigenvalue, and the BS may further determine, based at least in part on the predicted interference eigenvalue, the transmission parameter including at least a modulation coding scheme (MCS). In some aspects, the BS may determine, based on a previous channel quality indicator (CQI) value, a signal to interference-plus-noise ratio (SINR), modify, based at least in part on the predicted interference eigenvalue, the SINR to generate a predicted SINR, and determine, based on the predicted SINR, the transmission parameter, for example, as discussed above in relation to FIG. 10. In some aspects, the BS may further determine, based at least in part on the predicted interference eigenvalue, a channel quality indicator (CQI) backoff value, and determine, based on a previous CQI value and the CQI backoff value, the transmission parameter, for example, as discussed above in relation to FIG. 11. In some aspects, the BS may further determine, based at least in part on the predicted interference eigenvalue, an MCS backoff value, determine, based on a previous channel quality indicator (CQI value), a previous MCS, and determine, based on the previous MCS and the MCS backoff value, the MCS, for example, as discussed above in relation to FIG. 12.

In some aspects, as part of transmitting the scheduling grant, the BS may transmit, to the UE, the scheduling grant scheduling the downlink communication signal in a time period between the a first future time instant and a second future time instant of the one or more future time instants, wherein the transmission parameter is based on the first predicted CSI value for the first future time instant and a second predicted CSI value of the one or more predicted CSI values for the second future time instant. In some aspects, the BS may further determine the transmission parameter based on an interpolation between at least the first predicted CSI value and the second predicted CSI value.

In some aspects, the report received at block 2130 may include at least a predicted channel quality indicator (CQI) value at a first future time instant of the one or more future time instants. In some aspects, the BS may further transmit, to the UE, a configuration indicating reference receive signal information, and the predicted CQI value may be based on the reference receive signal information. In some aspects, the configuration may indicate a reference receive signal power, and the predicted CQI value may be based on the reference receive signal power. In some aspects, the configuration may include a reference signal-to-noise ratio (SNR), and the predicted CQI value may be based on the reference SNR. In some aspects, the BS may transmit the configuration indicating the reference receive signal information via RRC signaling. In some aspects, the BS may transmit the configuration indicating the reference receive signal information via MAC-CE signaling.

In some aspects, the report received at block 2130 may include at least a predicted rank indicator (RI) value at a first future time instant of the one or more future time instants.

In some aspects, the report received at block 2130 may include at least an indication of a predicted interference eigenvalue at a first future time instant of the one or more future time instants. In some aspects, the report received at 2130 may be received further based on an interference eigenvalue quantization table. In some aspects, the BS may further transmit, to the UE, a configuration indicating the interference eigenvalue quantization table, for example, via RRC signaling or MAC-CE signaling.

In some aspects, the report received at block 2130 may include the one or more predicted CSI values associated with a wideband frequency band. In some aspects, the report received at block 2130 may include a first predicted CSI value of the one or more predicted CSI values for a first future time instant of the one or more future time instants and a second predicted CSI value of the one or more predicted CSI values for the first future time instant, the first predicted CSI value associated with a first subset of a plurality of resource blocks (RBs) in a frequency band, and the second predicted CSI value associated with a second subset of the plurality of RBs non-overlapping with the first subset of the plurality of RBs.

In some aspects, the BS may further transmit, to the UE, an indication of the one or more future time instants for reporting the one or more predicted CSI values, for example, via RRC signaling or MAC-CE signaling.

In some aspects, the as part of transmitting the request at block 2110, the BS may transmit, to the UE, downlink control information (DCI) including a trigger for the report. In some aspects, the DCI may further include an indication of the one or more future time instants for reporting the one or more predicted CSI values. In some aspects, the DCI may further include an index referencing a first set of one or more future time instants of multiple sets of one or more future time instants, the first set of one or more future time instants corresponding to the one or more future time instants. In some aspects, the BS may further transmit, to the UE, a configuration indicating the multiple sets of one or more future time instants. In some aspects, the DCI may exclude a scheduling grant for a physical downlink shared channel (PDSCH) communication signal. In some aspects, the DCI may further include a scheduling grant for a physical downlink shared channel (PDSCH) communication signal. In some aspects, the one or more future time instants may be with respect to a reception time of the DCI.

In some aspects, the DCI may include an indication of an interference measurement resource and a reference signal resource. In some aspects, the one or more future time instants are with respect to a time location of the interference measurement resource. In some aspects, the one or more future time instants may be with respect to a time location of the reference signal resource. In some aspects, the DCI may exclude an indication of an interference measurement resource and a reference signal resource.

In some aspects, the DCI may further include a scheduling grant for a physical downlink shared channel (PDSCH) communication signal, and the BS may further transmit, to the UE, the PDSCH communication signal, where the report may be further based on the PDSCH communication signal.

In some aspects, the DCI may further include an indication of an interference measurement resource and excluding an indication of a reference signal resource, and the BS may further transmit, to the UE, a configuration indicating one or more error metrics associated with the one or more future time instants. In some aspects, the UE may transmit the configuration indicating the one or more error metrics via RRC signaling. In some aspects, the UE may transmit the configuration indicating the one or more error metrics via MAC-CE signaling. In some aspects, the configuration may indicate a first error metric and a second error metric of the one or more error metrics, the first error metric being associated with a first future time instant of the one or more future time instants, the second error metric being associated with a second future time instant of the one or more future time instants, the first error metric being different from the second error metric, and the first future time instant being different from the second future time instant.

Further aspects of the present disclosure include the followings:

Aspect 1: A method of wireless communication performed by a user equipment (UE), the method comprising: obtaining a sequence of interference measurements, wherein each interference measurement in the sequence is obtained at a different measurement time instant; determining, based on an interference predictor associated with the sequence of interference measurements, one or more predicted channel state information (CSI) values at one or more future time instants; and transmitting, to a base station (BS), a report including the one or more predicted CSI values.

Aspect 2: The method of Aspect 1, further comprising: receiving, from the BS, a configuration indicating a set of interference measurement resources spaced apart from each other in time, wherein the obtaining the sequence of interference measurements is based at least in part on the set of interference measurement resources.

Aspect 3: The method of Aspect 2, wherein the set of interference measurement resources are spaced apart from each other by a same amount of time.

Aspect 4: The method of any of Aspects 2 or 3, wherein the set of interference measurement resources comprises at least one of zero power-channel state information-reference signal (Zp-CSI-RS) resources or channel state information-interference measurement (CSI-IM) resources.

Aspect 5: The method of any of Aspects 2 through 4, wherein the obtaining the sequence of interference measurements comprises: determining a first interference measurement of the sequence of interference measurements from a first interference measurement resource of the set of interference measurement resources; and determining a second interference measurement of the sequence of interference measurements from a second interference measurement resource of the set of interference measurement resources, the second interference measurement resource being different from the first interference measurement resource.

Aspect 6: The method of any of Aspects 1 through 5, further comprising: determining the interference predictor based on at least one of an average of the sequence of interference measurements or an autocorrelation between a first interference measurement and a second interference measurement of the sequence of interference measurements.

Aspect 7: The method of any of Aspects 1 through 6, wherein a first interference measurement of the sequence of interference measurements comprises a first measurement associated with a first receive antenna of the UE at a first time instant and a second measurement associated with a second receive antenna of the UE at the first time instant; a second interference measurement of the sequence of interference measurements comprises a third measurement associated with the first receive antenna at a second time instant and a fourth measurement associated with the second receive antenna at the second time instant; and the method further comprising: determining the interference predictor based on at least one of an average of the sequence of interference measurements, an autocorrelation between the first measurement and the third measurement, an autocorrelation between the second measurement and the fourth measurement, a cross-correlation between the first measurement and the fourth measurement, or a cross-correlation between the second measurement and the third measurement.

Aspect 8: The method of any of Aspects 1 through 7, further comprising: determining, based on the sequence of interference measurements, the interference predictor comprising a set of one or more prediction filter coefficients.

Aspect 9: The method of any of Aspects 1 through 8, further comprising: determining, based on the sequence of interference measurements, the interference predictor comprising a bias value.

Aspect 10: The method of any of Aspects 1 through 9, wherein the determining the one or more predicted CSI values comprises: determining, based on the interference predictor, a first predicted interference at a first future time instant of the one or more future time instants.

Aspect 11: The method of Aspect 10, further comprising: receiving, from the BS, a configuration indicating an interference measurement resource; and determining a first interference measurement from the interference measurement resource, wherein the determining the first predicted interference is further based on the first interference measurement.

Aspect 12: The method of Aspect 11, further comprising: receiving, from the BS, a downlink communication signal, wherein the determining the one or more predicted CSI values further comprises: determining a first predicted CSI value of the one or more predicted CSI values further based on the received downlink communication signal.

Aspect 13: The method Aspect 12, wherein: the determining the first predicted interference further comprises: applying the interference predictor to the first interference measurement; and the determining the first predicted CSI value further comprises: determining a first signal-to-interference-plus-noise ratio (SINR) based on the downlink communication signal; modifying, based on the first predicted interference, the first SINR to generate a first predicted SINR for the first future time instant; and determining, based on the first predicted SINR, the first predicted CSI value.

Aspect 14: The method of any of Aspects 12 or 13, wherein: the determining the first predicted interference further comprises: applying the interference predictor to the first interference measurement; and the determining the first predicted CSI value further comprises: determining, based on a first channel matrix associated with the downlink communication signal and a covariance matrix associated with the first predicted interference, the first predicted CSI value.

Aspect 15: The method of Aspect 14, wherein the determining the first predicted CSI value further comprises: determining a second channel matrix based on the downlink communication signal; and determining the first channel matrix based a channel predictor and the second channel matrix.

Aspect 16: The method of any of Aspects 12 through 14, wherein the downlink communication signal comprises a channel state information-reference signal (CSI-RS).

Aspect 17: The method of any of Aspects 12 through 14 or 16, wherein the downlink communication signal comprises a physical downlink share channel (PDSCH) signal comprising a demodulation reference signal (DMRS), and wherein the determining the first predicted CSI value is further based on the DMRS.

Aspect 18: The method of any of Aspects 12 through 14 or 16 through 17, wherein the first predicted CSI value comprises a predicted channel quality indicator (CQI) value.

Aspect 19: The method of Aspect 18, wherein the determining the first predicted CSI value further comprises: selecting a lower coding-rate CQI table between a first CQI table and a second CQI table; and determining, based the lower coding-rate CQI table, the predicted CQI value.

Aspect 20: The method of any of Aspects 12 through 14 or 16 through 18, wherein the first predicted CSI value comprises a predicted rank indicator (RI) value.

Aspect 21: The method of any of Aspects 12 through 14, 16 through 18, or 20, wherein the first predicted CSI value comprises a predicted precoding matrix indicator (PMI) value.

Aspect 22: The method of any of Aspects 12 through 14, 16 through 18, or 20 through 21, wherein the first predicted CSI value is associated with a wideband frequency band.

Aspect 23: The method of any of Aspects 12 through 14, 16 through 18, or 20 through 22, wherein the first predicted CSI value is associated with a first subset of a plurality of resource blocks (RBs) in a frequency band, and wherein the first subset of the plurality of RBs is less than all of the plurality of RBs.

Aspect 24: The method of Aspect 23, wherein the determining the one or more predicted CSI values further comprises: determining a second predicted CSI value of the one or more predicted CSI values, the second predicted CSI value associated with a second subset of the plurality of RBs non-overlapping with the first subset of the plurality of RBs.

Aspect 25: The method of Aspect 11, wherein the determining the first predicted interference further comprises: determining, based on a covariance matrix associated with the first interference measurement and the interference predictor, a first predicted interference eigenvalue for the first future time instant.

Aspect 26: The method of Aspect 25, wherein the determining the first predicted interference comprises: applying the interference predictor to the first interference measurement to generate the first predicted interference at the first future time instant; and determining the covariance matrix based on the first predicted interference.

Aspect 27: The method of any of Aspects 25 or 26, wherein the determining the first predicted interference comprises: determining an interference eigenvalue from the covariance matrix; and applying the interference predictor to the interference eigenvalue to generate the first predicted interference eigenvalue for the first future time instant.

Aspect 28: The method of any of Aspects 25 through 27, wherein the one or more predicted CSI values comprises the first predicted interference eigenvalue, and wherein the transmitting the report comprises: transmitting, to the BS, the report including an indication of the first predicted interference eigenvalue.

Aspect 29: The method of Aspect 28, wherein the transmitting the report is further based on an interference eigenvalue quantization table.

Aspect 30: The method Aspect 29, further comprising: receiving, from the BS, a configuration indicating the interference eigenvalue quantization table.

Aspect 31: The method of Aspect 30, wherein the receiving the configuration comprises: receiving, from the BS, the configuration indicating the interference eigenvalue quantization table via radio resource control (RRC) signaling.

Aspect 32: The method of any of Aspects 30 or 31, wherein the receiving the configuration comprises: receiving, from the BS, the configuration indicating the interference eigenvalue quantization table via medium access control-control element (MAC-CE) signaling.

Aspect 33: The method of Aspect 25, wherein: the determining the one or more predicted CSI values comprises: determining a predicted signal-to-interference-plus-noise ratio (SINR) for the first future time instant based on the first predicted interference eigenvalue and reference receive signal information; and determining, based on the predicted SINR, a predicted channel quality indicator (CQI) value; and the transmitting the report comprises: transmitting, to the BS, the one or more predicted CSI values including the predicted CQI value.

Aspect 34: The method of Aspect 33, wherein the reference receive signal information comprises a reference receive signal power.

Aspect 35: The method of any of Aspects 33 or 34, wherein the reference receive signal information comprises a reference signal-to-noise ratio (SNR).

Aspect 36: The method of any of Aspects 33 through 35, further comprising: receiving, from the BS, a configuration indicating the reference receive signal information.

Aspect 37: The method of Aspect 36, wherein the receiving the configuration comprises: receiving, from the BS, the configuration indicating the reference receive signal information via radio resource control (RRC) signaling.

Aspect 38: The method of any of Aspects 36 or 37, wherein the receiving the configuration comprises: receiving, from the BS, the configuration indicating the reference receive signal information via medium access control-control element (MAC-CE) signaling.

Aspect 39: The method of any of Aspects 1 through 38, wherein the transmitting the report comprises: transmitting, to the BS, the report including the one or more predicted CSI values, the one or more predicted CSI values including at least one of a predicted channel quality indicator (CQI) value, a predicted rank indicator (RI) value, a predicted PMI value, or a predicted interference eigenvalue at a first future time instant of the one or more future time instants.

Aspect 40: The method of any of Aspects 1 through 39, wherein the transmitting the report comprises: transmitting, to the BS, the report including a first predicted CSI value of the one or more predicted CSI values for a first future time instant of the one or more future time instants and a second predicted CSI value of the one or more predicted CSI values for a second future time instant of the one or more future time instants, the second future time instant being different from the first future time instant.

Aspect 41: The method of Aspect 40, wherein the transmitting the report comprises: transmitting, to the BS, the report including the one or more predicted CSI values associated with wideband CSI.

Aspect 42: The method of any of Aspects 1 through 41, wherein the transmitting the report comprises: transmitting, to the BS, the report including a first predicted CSI value of the one or more predicted CSI values for a first future time instant of the one or more future time instants and a second predicted CSI value of the one or more predicted CSI values for the first future time instant, the first predicted CSI value associated with a first frequency subband and the second predicted CSI value associated with a second frequency subband different from the first frequency subband.

Aspect 43: The method of any of Aspects 1 through 42, further comprising: receiving, from the BS, an indication of the one or more future time instants for reporting the one or more predicted CSI values.

Aspect 44: The method of Aspect 43, wherein the receiving the indication of the one or more future time instants comprises: receiving, from the BS, the indication of the one or more future time instants via radio resource control (RRC) signaling.

Aspect 45: The method of Aspect 44, wherein the receiving the indication of the one or more future time instants comprises: receiving, from the BS, the indication of the one or more future time instants via medium access control-control element (MAC-CE) signaling.

Aspect 46: The method of any of Aspects 1 through 45, further comprising: receiving, from the BS, downlink control information (DCI) including a trigger for the report.

Aspect 47: The method of Aspect 46, wherein the receiving the DCI further comprises: receiving, from the BS, the DCI further including an indication of the one or more future time instants for reporting the one or more predicted CSI values.

Aspect 48: The method of Aspect 47, wherein the receiving the DCI comprises: receiving, from the BS, the DCI further including an index referencing a first set of one or more future time instants of multiple sets of one or more future time instants, the first set of one or more future time instants corresponding to the one or more future time instants.

Aspect 49: The method of Aspect 48, further comprising: receiving, from the BS, a configuration indicating the multiple sets of one or more future time instants.

Aspect 50: The method of Aspect 46, wherein the receiving the DCI comprises: receiving, from the BS, the DCI excluding a scheduling grant for a physical downlink shared channel (PDSCH) communication signal.

Aspect 51: The method of any of Aspects 46 or 50, wherein the receiving the DCI comprises: receiving, from the BS, the DCI further including a scheduling grant for a physical downlink shared channel (PDSCH) communication signal.

Aspect 52: The method of any of Aspects 46, 50 or 51, wherein the one or more future time instants are with respect to a reception time of the DCI.

Aspect 53: The method of any of Aspects 46 or 50 through 52, wherein: the receiving the DCI comprises: receiving, from the BS, the DCI including an indication of an interference measurement resource and a reference signal resource; and the determining the one or more predicted CSI values comprises: determining a signal-to-noise ratio (SNR) based on the reference signal resource; determining a first interference measurement based on the interference measurement resource; determining, based on the interference predictor and the first interference measurement, a predicted interference for a first future time instant of the one or more future time instants; modifying, based on the predicted interference, the SNR to generate a predicted signal-to-interference-plus-noise ratio (SINR) for the first future time instant; and determining a first predicted CSI value of the one or more predicted CSI values for the first future time instant based on the predicted SINR.

Aspect 54: The method of Aspect 53, wherein the one or more future time instants are with respect to a time location of the interference measurement resource.

Aspect 55: The method of any of Aspects 53 or 54, wherein the one or more future time instants are with respect to a time location of the reference signal resource.

Aspect 56: The method of any of Aspects 46, or 50 through 53, wherein: the receiving the DCI comprises: receiving, from the BS, the DCI excluding an indication of an interference measurement resource and a reference signal resource; and the determining the one or more predicted CSI values comprises: determining, based on the interference predictor and at least one of a previous interference measurement or a previous interference eigenvalue, a predicted interference for a first future time instant of the one or more future time instants; and modifying, based on the predicted interference, at least one of a previous channel quality indicator (CQI) value or a previous signal-to-interference-plus-noise ratio (SINR) to generate a first predicted CSI value of the one or more predicted CSI values for the first future time instant.

Aspect 57: The method of Aspect 56, wherein: the receiving the DCI comprises: receiving, from the BS, the DCI further including a scheduling grant for a physical downlink shared channel (PDSCH) communication signal; and the method further comprises: receiving, from the BS, the PDSCH communication signal; and the determining the one or more predicted CSI values comprises: determining, based on the interference predictor and at least one of a previous interference measurement or a previous interference eigenvalue, a predicted interference for a first future time instant of the one or more future time instants; determining, based on the PDSCH communication signal, at least one of a channel quality indicator (CQI) value or a signal-to-interference-plus-noise ratio (SINR); and modifying, based on the predicted interference, the at least one of the CQI value or the SINR to generate a first predicted CSI value of the one or more predicted CSI values for the first future time instant.

Aspect 58: The method of any of Aspects 46, 50 through 53, or 56, wherein: the receiving the DCI comprises: receiving, from the BS, the DCI further including an indication of an interference measurement resource and excluding an indication of a reference signal resource; and the determining the one or more predicted CSI values comprises: determining a first interference measurement based on the interference measurement resource; determining, based on the interference predictor and the first interference measurement, a predicted interference for a first future time instant of the one or more future time instants; and modifying, based on the predicted interference, at least one of a previous channel quality indicator (CQI) value or a previous signal-to-interference-plus-noise ratio (SINR) to generate a first predicted CSI value of the one or more predicted CSI values for the first future time instant.

Aspect 59: The method of any of Aspects 1 through 58, wherein the determining the one or more predicted CSI values comprises: determining the one or more predicted CSI values further based on one or more error metrics associated with the one or more future time instants.

Aspect 60: The method of Aspect 59, further comprising: receiving, from the BS, a configuration indicating the one or more error metrics.

Aspect 61: The method of any of Aspect 60, wherein the receiving the configuration comprises: receiving, from the BS, the configuration indicating the one or more error metrics via radio resource control (RRC) signaling.

Aspect 62: The method of any of Aspects 60 or 61, wherein the receiving the configuration comprises: receiving, from the BS, the configuration indicating the one or more error metrics via medium access control-control element (MAC-CE) signaling.

Aspect 63: The method of any of Aspects 60 through 62, wherein the receiving the configuration comprises: receiving, from the BS, the configuration indicating a first error metric and a second error metric of the one or more error metrics, the first error metric being associated with a first future time instant of the one or more future time instants, the second error metric being associated with a second future time instant of the one or more future time instants, the first error metric being different from the second error metric, and the first future time instant being different from the second future time instant.

Aspect 64: A method of wireless communication performed by a base station (BS), the method comprising: transmitting, to a user equipment (UE), a configuration indicating a set of interference measurement resources spaced apart in time, the set of interference measurement resources associated with an interference prediction; transmitting, to the UE, a request for one or more predicted channel state information (CSI) values at one or more future time instants; and receiving, from the UE, a report including the one or more predicted CSI values for the one or more future time instants.

Aspect 65: The method of Aspect 64, wherein the set of interference measurement resources are spaced apart from each other by a same amount of time.

Aspect 66: The method of Aspect 64 or 65, wherein the set of interference measurement resources comprises at least one of zero power-channel state information-reference signal (ZP-CSI-RS) resources or channel state information-interference measurement (CSI-IM) resources.

Aspect 67: The method of any of Aspects 64 through 66, further comprising: transmitting, to the UE, a scheduling grant for a downlink communication signal, the scheduling grant including a transmission parameter, the transmission parameter being based on at least a first predicted CSI value of the one or more predicted CSI values; and transmitting, to the UE based on the transmission parameter, the downlink communication signal.

Aspect 68: The method of Aspect 67, wherein the first predicted CSI value comprises a predicted CQI value, and wherein the method further comprises: determining, based at least in part on the predicted CQI value, the transmission parameter including at least a modulation coding scheme (MCS).

Aspect 69: The method of any of Aspects 67 or 68, wherein the first predicted CSI value comprises a predicted interference eigenvalue, and wherein the method further comprises: determining, based at least in part on the predicted interference eigenvalue, the transmission parameter including at least a modulation coding scheme (MCS).

Aspect 70: The method of Aspect 69, further comprising: determining, based on a previous channel quality indicator (CQI) value, a signal-to-interference-plus-noise ratio (SINR); modifying, based at least in part on the predicted interference eigenvalue, the SINR to generate a predicted SINR; and determining, based on the predicted SINR, the transmission parameter.

Aspect 71: The method of any of Aspects 69 or 70, further comprising: determining, based at least in part on the predicted interference eigenvalue, a channel quality indicator (CQI) backoff value; and determining, based on a previous CQI value and the CQI backoff value, the transmission parameter.

Aspect 72: The method of any of Aspects 69 through 71, further comprising: determining, based at least in part on the predicted interference eigenvalue, an MCS backoff value; and determining, based on a previous channel quality indicator (CQI value), a previous MCS; and determining, based on the previous MCS and the MCS backoff value, the MCS.

Aspect 73: The method of Aspect 67, wherein the transmitting the scheduling grant further comprises: transmitting, to the UE, the scheduling grant scheduling the downlink communication signal in a time period between a first future time instant and a second future time instant of the one or more future time instants, wherein the transmission parameter is based on the first predicted CSI value for the first future time instant and a second predicted CSI value of the one or more predicted CSI values for the second future time instant.

Aspect 74: The method of Aspect 73, further comprising: determining the transmission parameter based on an interpolation between at least the first predicted CSI value and the second predicted CSI value.

Aspect 75: The method of any of Aspects 64 through 74, wherein the receiving the report comprises: receiving, from the UE, the report including the one or more predicted CSI values, the one or more predicted CSI values including at least a predicted channel quality indicator (CQI) value at a first future time instant of the one or more future time instants.

Aspect 76: The method of Aspect 75, further comprising: transmitting, to the UE, a configuration indicating reference receive signal information, the predicted CQI value being based on the reference receive signal information.

Aspect 77: The method of Aspect 76, wherein the transmitting the configuration comprises: transmitting, to the UE, the configuration indicating a reference receive signal power, the predicted CQI value being based on the reference receive signal power.

Aspect 78: The method of any of Aspects 76 or 77, wherein the transmitting the configuration comprises: transmitting, to the UE, the configuration indicating a reference signal-to-noise ratio (SNR), the predicted CQI value being based on the reference SNR.

Aspect 79: The method of any of Aspects 76 through 78, wherein the transmitting the configuration comprises: transmitting, to the UE, the configuration indicating the reference receive signal information via radio resource control (RRC) signaling.

Aspect 80: The method of any of Aspects 76 through 79, wherein the transmitting the configuration comprises: transmitting, to the UE, the configuration indicating the reference receive signal information via medium access control-control element (MAC-CE) signaling.

Aspect 81: The method of any of Aspects 64 through 80, wherein the receiving the report comprises: receiving, from the UE, the report including the one or more predicted CSI values, the one or more predicted CSI values including at least a predicted rank indicator (RI) value at a first future time instant of the one or more future time instants.

Aspect 82: The method of any of Aspects 64 through 80, wherein the receiving the report comprises: receiving, from the UE, the report including the one or more predicted CSI values, the one or more predicted CSI values including at least an indication of a predicted interference eigenvalue at a first future time instant of the one or more future time instants.

Aspect 83: The method of Aspect 82, wherein the receiving the report is further based on an interference eigenvalue quantization table.

Aspect 84: The method of Aspect 83, further comprising: transmitting, to the UE, a configuration indicating the interference eigenvalue quantization table.

Aspect 85: The method of Aspect 84, wherein the transmitting the configuration comprises: transmitting, to the UE, the configuration indicating the interference eigenvalue quantization table via radio resource control (RRC) signaling.

Aspect 86: The method of any of Aspects 84 or 85, wherein the receiving the configuration comprises: transmitting, to the UE, the configuration indicating the interference eigenvalue quantization table via medium access control-control element (MAC-CE) signaling.

Aspect 87: The method of any of Aspects 64 through 86, wherein the receiving the report comprises: receiving, from the UE, the report including the one or more predicted CSI values associated with a wideband frequency band.

Aspect 88: The method of any of Aspects 64 through 87, wherein the receiving the report comprises: receiving, from the UE, the report including a first predicted CSI value of the one or more predicted CSI values for a first future time instant of the one or more future time instants and a second predicted CSI value of the one or more predicted CSI values for the first future time instant, the first predicted CSI value associated with a first subset of a plurality of resource blocks (RBs) in a frequency band, and the second predicted CSI value associated with a second subset of the plurality of RBs non-overlapping with the first subset of the plurality of RBs.

Aspect 89: The method of any of Aspects 64 through 88, further comprising: transmitting, to the UE, an indication of the one or more future time instants for reporting the one or more predicted CSI values.

Aspect 90: The method of Aspect 89, wherein the transmitting the indication of the one or more future time instants comprises: transmitting, to the UE, the indication of the one or more future time instants via radio resource control (RRC) signaling.

Aspect 91: The method of any of Aspects 89 or 90, wherein the transmitting the indication of the one or more future time instants comprises: transmitting, to the UE, the indication of the one or more future time instants via medium access control-control element (MAC-CE) signaling.

Aspect 92: The method of any of Aspects 64 through 91, wherein the transmitting the request comprises: transmitting, to the UE, downlink control information (DCI) including a trigger for the report.

Aspect 93: The method of Aspect 92, wherein the transmitting the DCI comprises: transmitting, to the UE, the DCI further including an indication of the one or more future time instants for reporting the one or more predicted CSI values.

Aspect 94: The method of any of Aspects 92 or 93, wherein the transmitting the DCI comprises: transmitting, to the UE, the DCI further including an index referencing a first set of one or more future time instants of multiple sets of one or more future time instants, the first set of one or more future time instants corresponding to the one or more future time instants.

Aspect 95: The method of Aspect 94, further comprising: transmitting, to the UE, a configuration indicating the multiple sets of one or more future time instants.

Aspect 96: The method of any of Aspects 92 through 94, wherein the transmitting the DCI comprises: transmitting, to the UE, the DCI excluding a scheduling grant for a physical downlink shared channel (PDSCH) communication signal.

Aspect 97: The method of any of Aspects 92 through 94 or 97, wherein the transmitting the DCI comprises: transmitting, to the UE, the DCI further including a scheduling grant for a physical downlink shared channel (PDSCH) communication signal.

Aspect 98: The method of any of Aspects 92 through 94 or 96 through 97, wherein the one or more future time instants are with respect to a reception time of the DCI.

Aspect 99: The method of any of Aspects 92 through 94 or 96 through 98, wherein the transmitting the DCI comprises: transmitting, to the UE, the DCI including an indication of an interference measurement resource and a reference signal resource.

Aspect 100: The method of Aspect 99, wherein the one or more future time instants are with respect to a time location of the interference measurement resource.

Aspect 101: The method of any of Aspects 99 or 100, wherein the one or more future time instants are with respect to a time location of the reference signal resource.

Aspect 102: The method of any of Aspects 92 through 94 or 96 through 99, wherein the transmitting the DCI comprises: transmitting, to the UE, the DCI excluding an indication of an interference measurement resource and a reference signal resource.

Aspect 103: The method of any of Aspects 92 through 94, 96 through 99, or 102, wherein the transmitting the DCI comprises: transmitting, to the UE, the DCI further including a scheduling grant for a physical downlink shared channel (PDSCH) communication signal; and the method further comprises: transmitting, to the UE, the PDSCH communication signal, wherein the report is further based on the PDSCH communication signal.

Aspect 104: The method of any of Aspects 92 through 94, 96 through 99, or 103, wherein the transmitting the DCI comprises: transmitting, to the UE, the DCI further including an indication of an interference measurement resource and excluding an indication of a reference signal resource.

Aspect 105: The method of any of Aspects 64 through 104, further comprising: transmitting, to the UE, a configuration indicating one or more error metrics associated with the one or more future time instants.

Aspect 106: The method of Aspect 105, wherein the transmitting the configuration comprises: transmitting, to the UE, the configuration indicating the one or more error metrics via radio resource control (RRC) signaling.

Aspect 107: The method of any of Aspects 105 or 106, wherein the transmitting the configuration comprises: transmitting, to the UE, the configuration indicating the one or more error metrics via medium access control-control element (MAC-CE) signaling.

Aspect 108: The method of any of Aspects 105 through 107, wherein the transmitting the configuration comprises: transmitting, to the UE, the configuration indicating a first error metric and a second error metric of the one or more error metrics, the first error metric being associated with a first future time instant of the one or more future time instants, the second error metric being associated with a second future time instant of the one or more future time instants, the first error metric being different from the second error metric, and the first future time instant being different from the second future time instant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   obtaining a sequence of interference measurements, wherein each interference measurement in the sequence is obtained at a different measurement time instant; and
   transmitting, to a base station (BS), a report including a plurality of predicted channel state information (CSI) values at a plurality of future time instants, the plurality of predicted CSI values being based at least in part on an interference predictor associated with the sequence of interference measurements.

2. The method of claim 1, further comprising:
   receiving, from the BS, a configuration indicating a set of interference measurement resources spaced apart from each other in time,
   wherein the obtaining the sequence of interference measurements is based at least in part on the set of interference measurement resources.

3. The method of claim 2, wherein the set of interference measurement resources are spaced apart from each other by a same amount of time.

4. The method of claim 2, wherein the set of interference measurement resources comprises at least one of zero power-channel state information-reference signal (ZP-CSI-RS) resources or channel state information-interference measurement (CSI-IM) resources.

5. The method of claim 2, wherein the obtaining the sequence of interference measurements comprises:
   determining a first interference measurement of the sequence of interference measurements from a first interference measurement resource of the set of interference measurement resources; and
   determining a second interference measurement of the sequence of interference measurements from a second interference measurement resource of the set of interference measurement resources, the second interference measurement resource being different from the first interference measurement resource.

6. The method of claim 1, further comprising:
   determining the interference predictor based on at least one of an average of the sequence of interference measurements or an autocorrelation between a first interference measurement and a second interference measurement of the sequence of interference measurements.

7. The method of claim 1, wherein:
   a first interference measurement of the sequence of interference measurements comprises a first measurement associated with a first receive antenna of the UE at a first time instant and a second measurement associated with a second receive antenna of the UE at the first time instant;
   a second interference measurement of the sequence of interference measurements comprises a third measurement associated with the first receive antenna at a second time instant and a fourth measurement associated with the second receive antenna at the second time instant; and
   the method further comprising:
   determining the interference predictor based on at least one of an average of the sequence of interference measurements, an autocorrelation between the first measurement and the third measurement, an autocorrelation between the second measurement and the fourth measurement, a cross-correlation between the first measurement and the fourth measurement, or a cross-correlation between the second measurement and the third measurement.

8. The method of claim 1, further comprising:
   determining, based on the sequence of interference measurements, the interference predictor comprising a set of one or more prediction filter coefficients.

9. The method of claim 1, further comprising receiving, from the BS, a request for the plurality of predicted CSI values via at least one of:
   radio resource control (RRC) signaling;
   medium access control-control element (MAC-CE) signaling;

downlink control information (DCI); or a DCI scheduling one or more of a physical downlink shared channel (PDSCH) transmission.

10. The method of claim 1, wherein the plurality of predicted CSI values comprises at least one of:

a channel quality indicator (CQI);

a modulation and coding scheme (MCS);

a rank indicator (RI);

a precoding matrix indicator (PMI);

a spectral efficiency; or beam information.

11. A method of wireless communication performed by a base station (B S), the method comprising:

transmitting, to a user equipment (UE), a configuration indicating a set of interference measurement resources spaced apart in time, the set of interference measurement resources associated with an interference prediction;

transmitting, to the UE, a request for a plurality of predicted channel state information (CSI) values at a plurality of future time instants; and receiving, from the UE, a report including the one or more plurality of predicted CSI values for the plurality of future time instants.

12. The method of claim 11, wherein the set of interference measurement resources are spaced apart from each other by a same amount of time.

13. The method of claim 11, wherein the set of interference measurement resources comprises at least one of zero power-channel state information-reference signal (ZP-CSI-RS) resources or channel state information-interference measurement (CSI-IM) resources.

14. The method of claim 11, wherein the transmitting the request includes transmitting the request via at least one of:

radio resource control (RRC) signaling;

medium access control-control element (MAC-CE) signaling;

downlink control information (DCI); or a DCI scheduling one or more of a physical downlink shared channel (PDSCH) transmission.

15. The method of claim 11, wherein the plurality of predicted CSI values comprises at least one of:

a channel quality indicator (CQI);

a modulation and coding scheme (MCS);

a rank indicator (RI);

a precoding matrix indicator (PMI);

a spectral efficiency; or beam information.

16. A user equipment (UE), comprising:

a memory; and one or more processors, coupled to the memory, wherein the memory stores instructions that are executable by the one or more processors, individually or in any combination, to cause the UE to:

obtain a sequence of interference measurements, wherein each interference measurement in the sequence is obtained at a different measurement time instant; and transmit, to a base station (B S), a report including a plurality of predicted channel state information (CSI) values at a plurality of future time instants, the plurality of predicted CSI values being based at least in part on an interference predictor associated with the sequence of interference measurements.

17. The UE of claim 16, wherein the one or more processors are further configured, individually or in any combination, to cause the UE to:

receive, from the BS, a configuration indicating a set of interference measurement resources spaced apart from each other in time; and obtain the sequence of interference measurements based at least in part on the set of interference measurement resources.

18. The UE of claim 17, wherein the set of interference measurement resources are spaced apart from each other by a same amount of time.

19. The UE of claim 17, wherein the set of interference measurement resources comprises at least one of zero power-channel state information-reference signal (ZP-CSI-RS) resources or channel state information-interference measurement (CSI-IM) resources.

20. The UE of claim 17, wherein the one or more processors are further configured, individually or in any combination, to cause the UE to:

determine a first interference measurement of the sequence of interference measurements from a first interference measurement resource of the set of interference measurement resources; and determine a second interference measurement of the sequence of interference measurements from a second interference measurement resource of the set of interference measurement resources, the second interference measurement resource being different from the first interference measurement resource.

21. The UE of claim 16, wherein the one or more processors are further configured, individually or in any combination, to cause the UE to:

determine the interference predictor based on at least one of an average of the sequence of interference measurements or an autocorrelation between a first interference measurement and a second interference measurement of the sequence of interference measurements.

22. The UE of claim 16, wherein:

a first interference measurement of the sequence of interference measurements comprises a first measurement associated with a first receive antenna of the UE at a first time instant and a second measurement associated with a second receive antenna of the UE at the first time instant;

a second interference measurement of the sequence of interference measurements comprises a third measurement associated with the first receive antenna at a second time instant and a fourth measurement associated with the second receive antenna at the second time instant; and the one or more processors are further configured, individually or in any combination, to cause the UE to:

determine the interference predictor based on at least one of an average of the sequence of interference measurements, an autocorrelation between the first measurement and the third measurement, an autocorrelation between the second measurement and the fourth measurement, a cross-correlation between the first measurement and the fourth measurement, or a cross-correlation between the second measurement and the third measurement.

23. The UE of claim 16, wherein the one or more processors are further configured, individually or in any combination, to cause the UE to:

determine, based on the sequence of interference measurements, the interference predictor comprising a set of one or more prediction filter coefficients.

24. The UE of claim 16, wherein the one or more processors are further configured, individually or in any combination, to cause the UE to receive, from the BS, a request for the plurality of predicted CSI values via at least one of:

- radio resource control (RRC) signaling;
- medium access control-control element (MAC-CE) signaling;
- downlink control information (DCI); or
- a DCI scheduling one or more of a physical downlink shared channel (PDSCH) transmission.

25. The UE of claim 16, wherein the plurality of predicted CSI values comprises at least one of:

- a channel quality indicator (CQI);
- a modulation and coding scheme (MCS);
- a rank indicator (RI);
- a precoding matrix indicator (PMI);
- a spectral efficiency; or
- beam information.

26. A base station (BS), comprising:

- a memory; and
- one or more processors, coupled to the memory, wherein the memory stores instructions that are executable by the one or more processors, individually or in any combination, to cause the BS to:
  - transmit, to a user equipment (UE), a configuration indicating a set of interference measurement resources spaced apart in time, the set of interference measurement resources associated with an interference prediction;
  - transmit, to the UE, a request for a plurality of predicted channel state information (CSI) values at a plurality of future time instants; and
  - receive, from the UE, a report including the plurality of predicted CSI values for the plurality of future time instants.

27. The BS of claim 26, wherein the set of interference measurement resources are spaced apart from each other by a same amount of time.

28. The BS of claim 26, wherein the set of interference measurement resources comprises at least one of zero power-channel state information-reference signal (ZP-CSI-RS) resources or channel state information-interference measurement (CSI-IM) resources.

29. The BS of claim 26, wherein the one or more processors are further configured, individually or in any combination, to cause the BS to transmit the request via at least one of:

- radio resource control (RRC) signaling;
- medium access control-control element (MAC-CE) signaling;
- downlink control information (DCI); or
- a DCI scheduling one or more of a physical downlink shared channel (PDSCH) transmission.

30. The BS of claim 26, wherein the plurality of predicted CSI values comprises at least one of:

- a channel quality indicator (CQI);
- a modulation and coding scheme (MCS);
- a rank indicator (RI);
- a precoding matrix indicator (PMI);
- a spectral efficiency; or
- beam information.

* * * * *